United States Patent [19]

Imazeki

[11] Patent Number: 4,636,796

[45] Date of Patent: Jan. 13, 1987

[54] RADIO DIRECTION FINDING SYSTEM

[75] Inventor: Kazuyoshi Imazeki, Tokyo, Japan

[73] Assignee: General Research of Electronics, Inc., Tokyo, Japan

[21] Appl. No.: 621,031

[22] Filed: Jun. 15, 1984

[51] Int. Cl.$^4$ ............................................. G01S 5/04
[52] U.S. Cl. .................................. 342/443; 342/434; 342/417
[58] Field of Search ............... 343/434, 443, 435, 438, 343/439, 451, 417

[56] References Cited

U.S. PATENT DOCUMENTS

| | | | |
|---|---|---|---|
| 4,071,845 | 1/1978 | Gross | 343/443 |
| 4,107,692 | 8/1978 | Hutcheon et al. | 343/434 |
| 4,148,034 | 4/1979 | Cooney | |
| 4,219,821 | 8/1980 | Selim | |
| 4,263,597 | 4/1981 | Bentley et al. | 343/434 |
| 4,302,759 | 11/1981 | Mori et al. | 343/436 |
| 4,394,777 | 7/1983 | Wren | 455/99 |
| 4,438,438 | 3/1984 | Arens et al. | 343/451 |
| 4,514,810 | 4/1985 | Ito et al. | 343/451 |

OTHER PUBLICATIONS

Pilot Instruction Manual: Model 804RA-7, Marine VHF Direction Finder, 1977.

An Evaluation of Shore - Based Radio Direction Finding, U.S. Dept. of Transportation, Sep. 1978.

Primary Examiner—Theodore M. Blum
Attorney, Agent, or Firm—Trexler, Bushnell & Wolter, Ltd.

[57] ABSTRACT

A radio direction finding system comprises a receiving portion for receiving a radio signal and a direction determining portion coupled to the receiving portion for developing a direction signal corresponding to the direction of arrival of a received radio signal. A memory is also provided for storing direction data corresponding to the direction of arrival of at least one received radio signal, and a control circuit is coupled intermediate the direction determining portion and the memory for producing direction data corresponding to the direction signal for storage by said memory. In accordance with a further aspect of the invention, an indicator is provided for actuation by the control circuit to produce an observable indication of the direction of arrival of a received radio signal, and the direction finding system further includes an EPIRB detector portion for producing an EPIRB reception signal in response to reception of an EPIRB signal. The control circuit is responsive to the EPIRB detection signal for energizing an indicator to produce an indication of the direction of arrival of the EPIRB signal in place of any other indication of direction.

15 Claims, 7 Drawing Figures

RADIO DIRECTION FINDING SYSTEM

BACKGROUND OF THE INVENTION

The present invention is directed to radio direction finding systems, and more particularly to a novel and improved radio direction finding system including a novel memory feature for storing directional data corresponding to the direction of arrival of a plurality of radio signals for display upon command.

While the invention may find utility in a variety of applications, the disclosure will be facilitated by particular reference to a radio direction finding system and in particular, a marine automatic direction finding (ADF) system. A direction finding system generally comprises a radio receiver including circuits for determining the direction of arrival of a received radio signal and an indicator or display for producing a display or an indication of this directional information. It will be appreciated that determination of the direction of arrival of the signal correspondingly permits determination of the direction of the source of the transmission of the radio signal relative to the receiver.

Such direction finding devices have developed in the prior art over a number of years. Initially, at least two receivers at different locations were utilized to receive the same signal, whereupon an operator could determine the direction of the originating source of transmission of a received radio signal by triangulation methods. Other prior art devices utilized different antenna configurations and antenna arrays to determine the direction of arrival of a received radio frequency signal. Some such systems utilize two or more relatively simple antennas, while some require physically large and expensive antenna arrays, which are either manually or electronically switched. In either case, the antenna or antennas were coupled to signal processing circuits to extract directional information from the received signals. A display of the processed received information was then obtained in a variety of different ways, such as utilizing electromagnetic coils to operate a directional compass, auto compasses, cathode ray tube displays, or the like.

Moreover, the prior art has been mainly concerned with determining the direction of arrival of but a single received radio signal for immediate display only. Accordingly, if a signal were of brief duration, or a notation was not made of direction during the display thereof, the direction of arrival of a given signal might be irrevocably lost. Hence, to monitor the directions of two or more signals, many prior art devices require that notations be made as to the direction of the first signal to be monitored before commencing to monitor the direction of the second or other further signals.

Additionally, it is often desirable to receive and monitor the direction of emergency signals received on the emergency channel and sometimes known as the emergency position indicating radio beacon (EPIRB). Many direction finding systems of the prior art have failed to make provision for specialized additional decoding and monitoring of the direction of such emergency or "EPIRB" signals, or to give priority to such monitoring.

OBJECTS AND SUMMARY OF THE INVENTION

Accordingly, it is a general object of the invention to provide a novel and improved radio direction finding system.

A more specific object is to provide a radio direction finding system which is capable of storing or memorizing data or information corresponding to the direction of arrival of at least one radio signal for display when desired.

A further object is to provide a radio direction finding system which is further capable of decoding an EPIRB signal and displaying the direction of arrival thereof, and giving priority thereto over the display of directions of arrival of other received radio signals.

Briefly, and in accordance with the foregoing objects, the present invention provides a radio direction finding system comprising antenna means for receiving a radio signal; direction determining means coupled to said antenna means for developing a direction signal corresponding to the direction of arrival of a received radio signal; memory means for storing direction data corresponding to the direction of arrival of at least one received radio signal; and control circuit means coupled intermediate said direction determining means and said memory means for producing direction data corresponding to said direction signal for storage by said memory means.

In accordance with a further aspect of the invention, the direction finding system further includes indicator means for actuation by said control circuit means to provide an observable indication of the direction of arrival of a received radio signal, and EPIRB detector means for producing an EPIRB reception signal in response to reception of an EPIRB signal; said control circuit means being responsive to said EPIRB detection signal for energizing the indicator means to produce an indication of the direction of arrival of the EPIRB signal in place of any other indication of direction.

BRIEF DESCRIPTION OF THE DRAWINGS

The features of the present invention which are believed to be novel are set forth with particularity in the appended claims. The organization and manner of operation of the invention together with further objects and advantages thereof, may best be understood with reference to the following description taken in connection with the accompanying drawings in the several figures of which like reference numerals identify like elements, and in which:

DETAILED DESCRIPTION OF THE ILLUSTRATED EMBODIMENT

Figure 1:
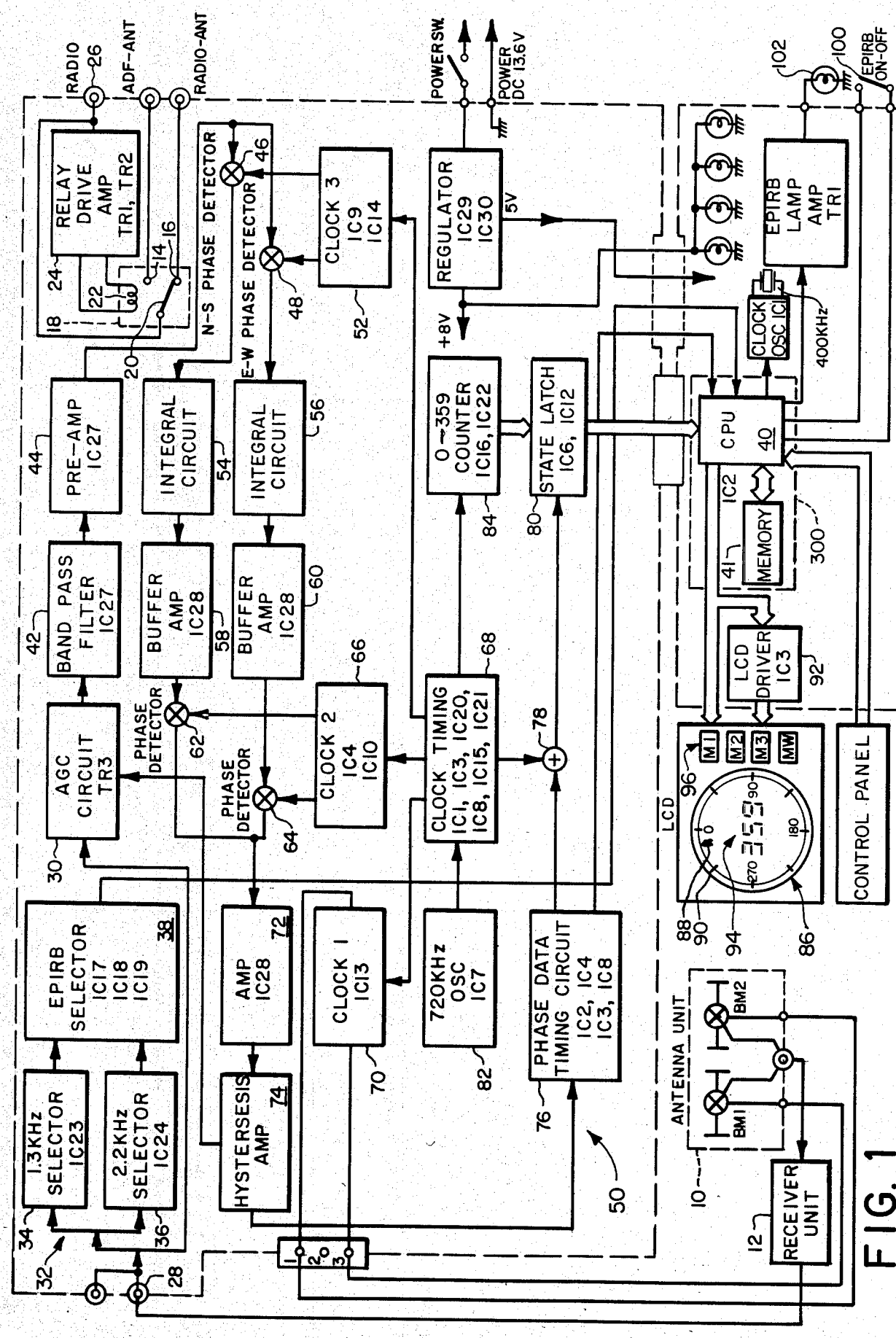
FIG. 1 is a block diagram of an automatic direction finding system utilizing apparatus in accordance with the invention.

Referring now to the drawings and initially to FIG. 1, a radio direction finder system in accordance with a preferred form of the invention is shown in block diagrammatic form. Initially, the system includes an antenna unit 10 which preferably takes the form of an Adcock antenna. An Adcock antenna is well known in the art and generally comprises spaced vertical open antennas which in principle respond only to the vertical component of polarization of an incident wave. More specifically, the antenna unit 10, as best viewed in FIG. 6, preferably comprises a crossed Adcock configuration comprising a frame 600 which mounts a pair of two-element Adcock antennas 602, 604. Each two-element Adcock antenna comprises two vertical elements 606, 608 and 610, 612 spaced not more than one-half wavelength apart, and preferably no more than one-quarter wavelength apart so that the two elements generally form an "H" with the frame 600. These two, two-element Adcock antennas 602, 604 are mounted by frame 600 so that they define mutually orthogonal planes to thereby form a crossed Adcock configuration.

In the illustrated embodiment, each antenna element 606, 608, 610 and 612 comprises a pair of oppositely projecting antenna stubs 606a, 606b, etc., mounted to the frame 600. The frame 600 is mounted to a mast 620 of a ship (not shown) in the illustrated embodiment, so that one Adcock pair 602 is oriented substantially parallel to the keel-line of the ship and the other Adcock pair 604 is oriented substantially perpendicular thereto. In the illustrated embodiment the antenna element 606 and 608 are referred to as north (N) and south (S) elements, while antenna elements 610 and 612 are referred to as east (E) and west (W) elements. It will be understood that the directions north, south, east and west are defined in relation to the heading of the ship upon which the antenna is mounted, this heading being taken as 0 degrees or "north". Hence, measurement of the direction of arrival of a received radio signal will be indicated as from 0 degrees to 359 degrees relative to the heading of the ship, this heading being taken as 0 degrees. When the compass heading of the ship is known, the compass direction of the source of the signal may therefore be readily determined.

The Adcock antenna unit 10 feeds received radio signals to receiver unit 12 which preferably comprises a marine FM radio receiver unit. An additional conventional FM radio antenna (not shown) and the ADF antenna 10 preferably are alternatively selectable as inputs to the radio receiver unit 12 as indicated generally at the upper right-hand portion of FIG. 1. In this regard, the outputs of the ADF antenna 10 and a conventional FM radio antenna feed a pair of contacts 14, 16 of a relay 18. A movable contactor 20 of the relay 18 then selects one of these two antennas in response to the energized or de-energized condition of a relay coil 22. The relay coil 22 is in turn controlled by a relay drive amp circuit 24 which may in turn be controlled for example by a switch on a control panel for selecting one of the normal radio reception or direction finding reception of radio signals. The movable contactor 20 feeds the selected antenna signal to the radio receiver unit 12 at an antenna input thereof indicated diagrammatically at 26.

An audio output of the receiver, indicated diagrammatically at 28, feeds an input portion of the direction finding or direction determining means or circuits 50 at an AGC circuit 30. This audio output 28 also feeds an EPIRB detection circuit designated generally 32 and including a 1.3 KHz selector circuit 34, a 2.2 KHz selector circuit 36, and an EPIRB selector circuit 38. These circuits serve to detect or decode an EPIRB signal. The output of the last EPIRB selector circuit 38 comprises an EPIRB reception signal which is fed to control circuit means comprising CPU 40.

In accordance with a feature of the invention, the direction determining means or circuit 50 is coupled to the receiving means including antenna 10 and receiver 12, for developing a direction signal corresponding to the direction of arrival of a received radio signal. Memory means 41 are provided for storing direction data corresponding to the direction of arrival of at least one received radio signal. The control circuit means or CPU 40 is coupled intermediate the direction determining means or circuit 50 and the memory means 41 for producing direction data corresponding to the direction signal for storage by the memory means 41. In the illustrated embodiment, the CPU 40 and memory means 41 form parts of a microcomputer 300, which is more fully illustrated in FIG. 4.

Referring now to the direction determining means or circuits 50, it will be noted that these circuits will be activated or energized only when it is desired to monitor the direction of arrival of received radio signals, that is, when the direction finding function and the ADF antenna 10 are selected. The automatic gain control (AGC) circuit 30 feeds the receiver audio output through a bandpass filter circuit 42 which delivers the filtered signal to a pre-amplifier (PRE-AMP) circuit 44. These circuits and the circuits which follow generally comprise the direction determining means 50 for developing a directional signal corresponding to the direction of arrival of a received radio signal. It will be noted that indications are given in each of the blocks of the block diagram of FIG. 1 of the major circuit components shown in the circuit schematic of FIG. 2 which perform the functions of each of the blocks. In this regard, for example, the AGC circuit block 30 indicates TR3, which refers to the like-designated field-effect transistor (FET) TR3 of FIG. 3A. Similarly, the bandpass filter 42 and PRE-AMP 44, each designate an integrated circuit, IC27, which is designated by the like reference characters IC27 in the circuit schematic of FIG. 3B.

The pre-amplifier circuit 44 feeds respective north-south (N-S) and east-west (E-W) phase detector circuit components 46 and 48. In the illustrated embodiment these "phase detectors" 46 and 48 each comprise an integrated circuit bilateral switch. Control terminals of the respective bilateral switches receive a synchronizing or control signal from a clock circuit 52 here designated as Clock 3. The outputs of the respective phase detectors are fed through respective integral circuits 54, 56 and buffer amps 58, 60 to a pair of further similar phase detectors 62 and 64 which preferably also comprise bilateral switches. Control elements of these latter phase detectors 62 and 64 are controlled by a synchronizing or control signal from a second clock circuit 66 here designated as Clock 2. The two clock circuits 52 and 66 are controlled from a clock timing circuit 68 which also controls a further clock circuit 70 here designated as the Clock 1 circuit.

This latter clock circuit 70 feeds a synchronizing or control signal to the antenna unit 10, which signal is synchronized in a predetermined fashion by the clock timing circuit 68 with the control signals produced by the clock circuits 52 and 66. Briefly, the control signal to the antenna unit 10 acts as a "commutating" signal for effectively sequentially selecting each of the antenna elements of the antenna unit 10. In this regard, it will be remembered that the antenna unit 10 comprises a crossed Adcock unit comprising two spaced apart pairs of generally vertically oriented antenna elements, the respective pairs being arranged in orthogonal planes.

In operation, the clock circuit 70 selects the antenna elements of the antenna unit in a predetermined order or sequence, and the respective clock circuits 52 and 66 control the passage of the received signals through the respective phase detectors 46, 48 and 62, 64 in a predetermined synchronized fashion with respect to anetnna element selection, to produce an output or direction signal which bears a predetermined relationship to the direction of incidence of a radio signal at the antenna unit 10. This output or direction signal is fed out by way of a further amplifier (AMP) circuit 72 and a hysteresis amplifier (AMP) circuit 74. The latter hysteresis amplifier circuit 74 also produces a gain control signal which is fed back to the AGC circuit 30. The hysteresis amplifier also feeds a phase data timing circuit 76 which is coupled with the clock timing circuit 68 at a summing junction 78. Hence, the phase data timing circuit and clock timing circuit cooperate to produce a control signal for latching a state latch circuit 80 in a predetermined fashion, based upon the direction of arrival or incidence of the incoming radio signal upon the antenna unit 10.

The clock timing circuit 68 also receives a master clock or oscillator signal from a 720 kilohertz oscillator 82, it being noted that 720 is a multiple of 360, the number of degrees in a circle and also the number of possible angles or directions of incidence of a received radio signal. The clock timing circuit 68 also feeds a 0-through-360 timing signal or count to a 0-through-359 counter circuit 84 which in turn feeds its count data or information to the state latch 80. Accordingly, it will be seen that the phase data and timing circuit and preceding elements develop a control signal for latching the state latch 80 to a number which corresponds to the angle or compass bearing of the direction of arrival of a received radio signal with respect to antenna 10. Thereupon, the state latch 80 latches a count from the counter 84 to thereby comprise a direction signal corresponding to the direction of arrival of a received radio signal. Hence, the latched count of zero through 359 directly corresponds with a compass bearing or direction of incidence or arrival of the radio signal at the antenna 10. This latched count or signal is delivered to the CPU or control circuit means 40.

In accordance with a feature of the invention, indicator means in the form of a display designated generally by the reference numeral 86 is selectively energizable for producing an observable indication of the direction of arrival of a received radio signal. The control circuit means or CPU 40 is coupled with the indicator means or display 86 and is responsive to the direction signal received from the latch 80 of the direction determining circuit 50 for energizing the indicator means or display 86 to produce a corresponding direction indication.

Figure 5:
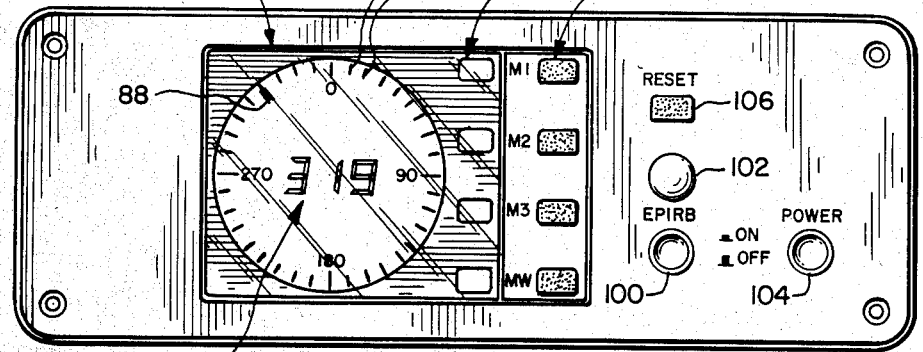
FIG. 5 is a front elevation of a display and control panel in accordance with a preferred embodiment of the invention.

Preferably, the display 86, as also seen in FIG. 5, includes an analog display in the form of thirty-six liquid crystal display (LCD) elements generally in the form of arrows or arrowheads and designated in FIG. 5 by the reference numeral 88. These LCD elements 88 are equally spaced and arrayed in a circle, and are additionally provided with fixed indicia 90 on the face of the display. Preferably, LCD elements 88 are located to indicate 10 degree increments in direction, and the indicia 90 run from zero degrees to 360 degrees with markings every 10 degrees to coincide with arrows 88. Hence, the CPU 40 will energize an appropriate one of the LCD elements or arrowheads 88, by way of an intervening LCD driver circuit 92, to indicate the direction of arrival or compass bearing of the received signal relative to the direction or bearing of the antenna unit 10.

Figure 2:
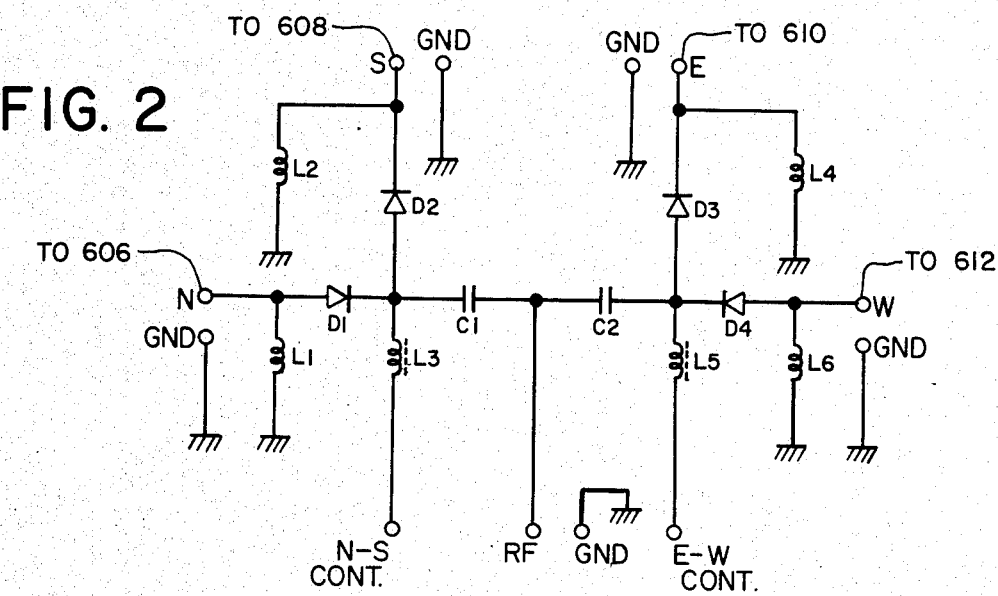
FIG. 2 is a schematic circuit diagram illustrating details of an antenna circuit in accordance with a preferred embodiment of the invention.
Figure 6:
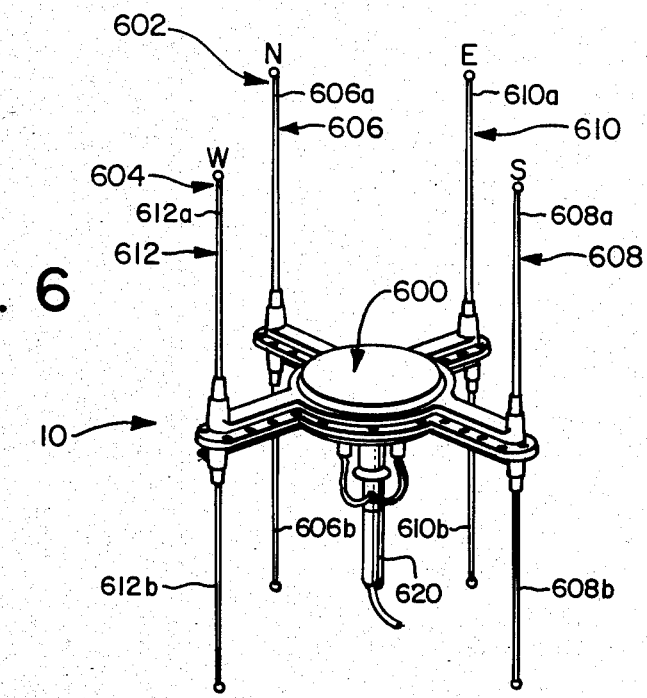
FIG. 6 is a perspective view of an antenna in accordance with a preferred embodiment of the invention.

In this regard, the antenna unit 10 as shown in FIG. 2 and FIG. 6, has one of its Adcock pairs designated as north (N) and south (S) and the other pair designated as east (E) and west (W) elements, respectively. It will be recalled that the illustrated embodiment is that of a direction finding system for marine use, whereby the antenna unit 10 is preferably mounted to a mast 620 of a boat or ship (not shown). The orientation of the antenna relative to the ship is preferably such that the "north" antenna 606 faces the bow of the ship and the "south" antenna 608 faces the stern with the plane defined by the north and south antennas being substantially parallel to the keel-line of the ship. It will be remembered that the "east" and "west" antenna elements 610 and 612 are fixed in a substantially orthogonal plane with respect to the north and south antenna elements, whereby the east and west antenna elements will define a plane at right angles to the keel-line of the ship.

Figure 4:
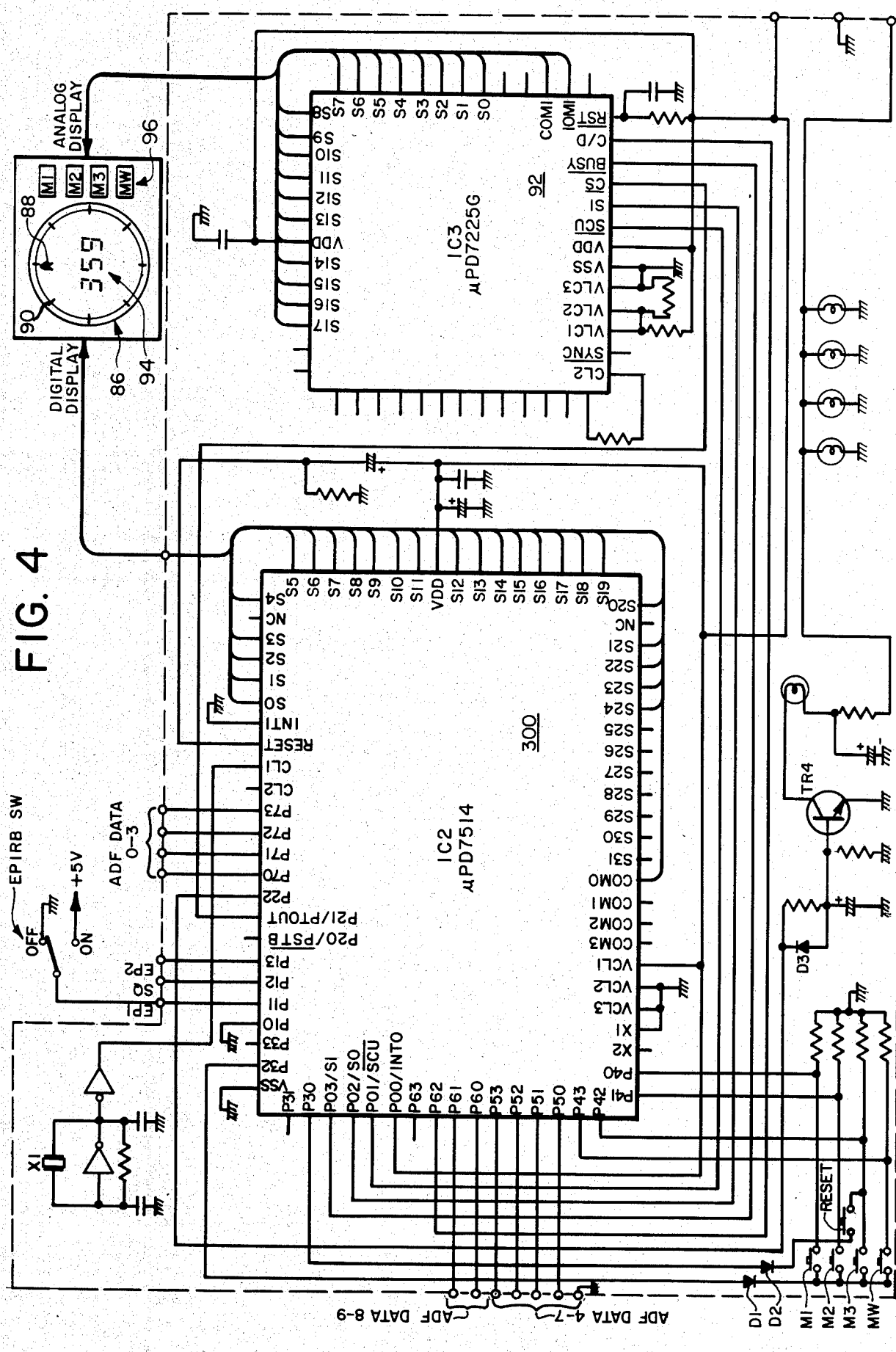
FIG. 4 is a schematic circuit diagram illustrating details of further circuits in accordance with the preferred embodiment of the invention.

In accordance with a further feature of the invention, the control circuit means or CPU 40 includes selectively actuatable write control means for causing the memory means 41 to store the direction data received from the state latch 80 of the direction determining means or circuit 50. Referring briefly to FIG. 4, the control circuit or CPU 40 and memory 41 preferably comprise a single chip microcomputer circuit of the type generally designated uPD 7514. This microcomputer circuit includes read/write memory therein comprising the memory means 41. The control circuit means or CPU 40 further includes selectively actuatable read control means for reading out stored direction data from the memory means 41 and for causing the indicator means 86 to produce a direction indication corresponding to the direction data which is read out.

The display or indicator means 86 also includes a digital display in the form of three 7-segment elements designated generally by reference numeral 94. In the illustrated embodiment these comprise 7-segment LED elements. These elements 94 are energized from the control circuit means or CPU 40 to provide an additional, digital indication of the direction of arrival or bearing of the received radio signal relative to the direction or bearing of the ship on which the antenna 10 is located.

Referring again to the control and display panel of FIG. 5, it will be seen that the display 86 additionally includes four windows 96 (preferably liquid crystal display elements) bearing the indicia M1, M2, M3 and MW. Adjacent these four windows 96 are a set of four selector buttons or push-buttons bearing corresponding indicia and designated generally by reference numeral 98. In conjunction with the memory feature just mentioned, the illustrated embodiment provides three memory locations identified by these three designations M1, M2 and M3 for storing or memorizing direction data corresponding to the direction of arrival of a received radio signal. Hence, the directions of arrival of as many as three separate radio signals may be stored or memorized. The fourth indicator and corresponding control button controls a memory write function and hence the designation MW. One of the three memory locations may be selected for display of the direction information contained therein by actuation of its corresponding selector button 98. Hence, the selector buttons designated M1, M2 and M3 are provided for selectively actuating the read control means of control circuit means for reading out the storage data from the corresponding memory locations. When selected in this fashion, the memorized direction information will be displayed upon the display 86 in place of the direction information for any radio signal which is currently being received. The memory currently selected will be indicated by lighting of the associated window 96 (M1, M2 or M3).

Any of the three memory locations may also be "written" into, that is, have direction data information entered therein for storage by first depressing the memory write (MW) button and then selecting a memory location by depressing the corresponding push-button 98, while a received signal direction is being displayed on display 86. The memory write button actuates the write control means of the control circuit means, as mentioned above, for causing the memory means to store direction data. This memory writing function will automatically erase or remove any direction data currently in a given memory location as it writes or enters the new direction data therein.

Referring again to the monitoring and control panel of FIG. 5, it will be noticed that an EPIRB on/off switch 100 is also provided for selecting the EPIRB monitoring function described above. An EPIRB indicator lamp 102 will be lighted when the direction being indicated in the display or indicator 86 is the direction of arrival of an incoming EPIRB signal. Additional controls include a power on/off switch 104 for the unit, which effectively selects the direction finding (ADF) function when "on", and the conventional radio receiver (RCV) alone when "off". Power switch 104 also energizes or de-energizes the relay drive amp 24 for coupling one of the ADF antenna and FM radio antenna to the radio receiver antenna input. A reset push-button switch 106 is also provided for cancelling any direction indication in the display 86 so that a further direction indication for a received radio signal may be indicated thereon.

Figure 3A:
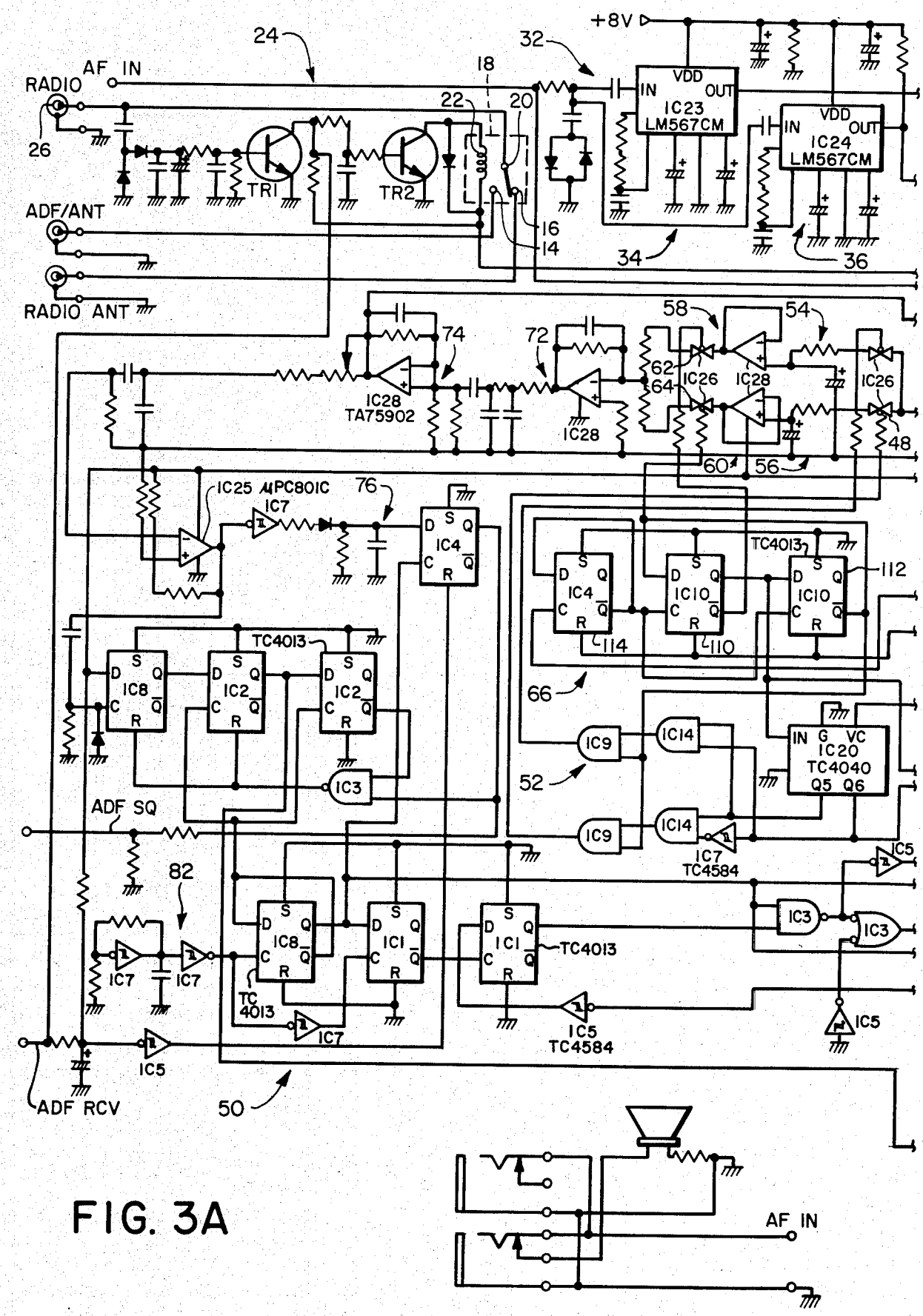
FIGS. 3A and 3B taken together form a schematic circuit diagram illustrating further details of a preferred embodiment of the invention.
Figure 3B:
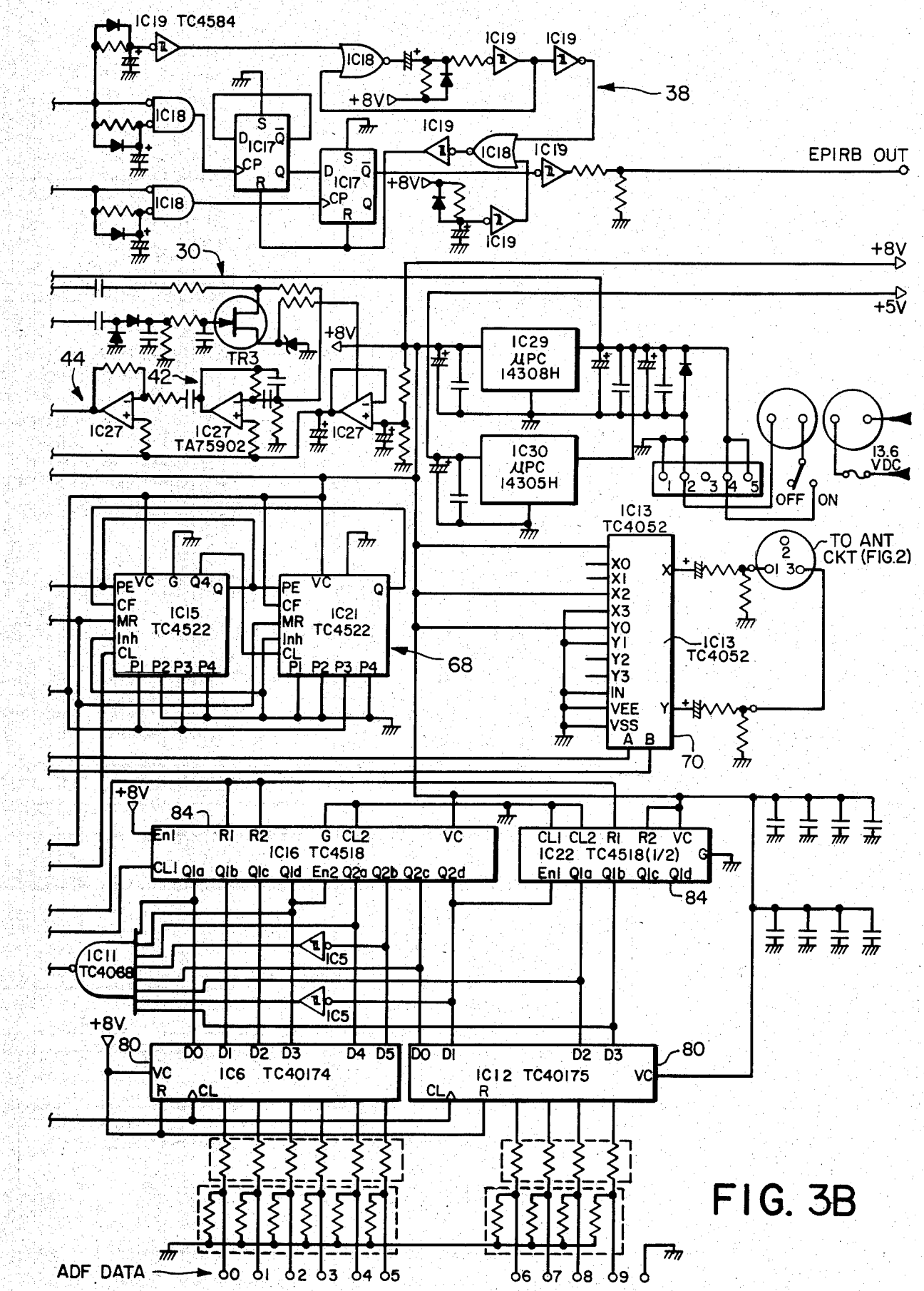

Referring briefly to FIGS. 3A and 3B, details of a preferred embodiment of the EPIRB circuit 32 and direction detecting circuit 50 of FIG. 1 are illustrated. Briefly, the EPIRB selector circuits 34 and 36 comprise a pair of 567-type tone decoder/phase-locked loop (PLL) circuits designated as IC23 and IC24. These two PLL's are utilized for synchronous lock detection and the ability to drive the following circuits when the input is a sustained frequency within the detection band. In this regard, the detection band for IC23 is set at 1.3 KHz and the detection band for IC24 is set at 2.2 KHz by selection of the values of the resistors and capacitors coupled therewith. In operation, to monitor for an EPIRB signal, the EPIRB switch 100 should be actuated to the on position to light the EPIRB lamp 102. This also signals the CPU 40 to energize the display when an EPIRB signal is received, giving display of this EPIRB direction priority over any other direction currently being displayed. If signals at both 1.3 KHz and 2.2 KHz are received for approximately 2 seconds, they are converted to an EPIRB reception or control signal by the circuits 34, 36 and 38 making up the EPIRB detection circuit 32. This EPIRB reception signal is fed to the CPU or control circuit 40, for causing a display of the direction of arrival of the EPIRB signal.

Referring briefly to the direction detecting means or circuits 50, it will be seen that the AGC circuit comprises an FET TR3 (see FIG. 3B). This circuit feeds a first operational amplifier of IC27 of the bandpass filter circuit 42. It will be noted that the integrated circuit IC27 is a quad operational amplifier of the type generally designated TA75902. A second operational amplifier of IC27 forms the preamp circuit 44.

Two channels of phase detection are utilized, one associated with each of the north-south and east-west antenna pairs. The bilateral switches 46 and 48 of the first pair of phase detectors as well as the bilateral switches 62 and 64 of the second stage of phase detection comprise integrated circuit IC26 which is a quad bilateral switch. As previously mentioned, the respective phase detectors or bilateral switches have control terminals which receive respective synchronizing or phase detection signals from the respective clock circuits 52 and 66.

In particular, the phase detectors 46 and 48 receive such a synchronizing or control signal from the outputs of the respective AND gates of IC9 indicated generally by reference numeral 52. The second phase detectors 62 and 64 receive control signals respectively from the $\overline{Q}$ output of a first flip-flop 110 of IC10 and the $\overline{Q}$ output of a second flip-flop 112 of IC10. The intervening integral circuits 54 and 56 and buffer amplifiers 58 and 60 which comprise operational amplifiers of a second quad op-amp circuit IC28 are also illustrated intermediate the phase detector pairs 46, 48 and 62, 64. The integrated circuit IC28 preferably comprises a quad op-amp of the type generally designated TA75902. Further operational amplifiers of IC28 form the amplifier circuit 72 and the hysteresis amplifier 74.

An additional buffer amplifier IC25 is interposed between the output of the hysteresis amp 74 and the phase data timing circuit 76. These circuits convert the phase detected signal from the phase detectors 46, 48 and 62, 64 to direct current voltages representing both the north-south and east-west vector components of the direction of arrival of the incoming or received signal. These vector components are determined relative to the heading or bearing of the ship and corresponding position of the antenna 10 as described above.

The phase data timing circuit 76 carries out further decoding of the direction information included in the direct current voltages, which are combined at amplifier 72. The circuit 76 cooperates with the clock timing circuit 68 and latch 80 as previously described to latch a count from zero to 359 from the clock timing circuit corresponding to the relative bearing or angle of incidence or arrival of the received radio signal with respect to the bearing or heading of the ship and orientation of antenna as mentioned above.

As also previously mentioned, the four elements of the antenna unit 10, which it will be noted are located at substantially 90 degree intervals about a circle when mounted as described above, are effectively commutated by the "clock 1" circuit 70. This circuit 70 comprises an analog differential 4-channel multiplexer/demultiplexer of the type generally designated TC4052, here utilized as a multiplexer. The X and Y outputs of this multiplexer are coupled with respective north-south (N-S CONT.) and east-west (E-W CONT.) connections to the antennas as illustrated in FIG. 2. The sequence of X and Y output signals is such as to effectively achieve rotation or commutation of the Adcock antenna elements.

Further in this regard, it will be noted that IC20 comprises a 12-stage ripple counter which counts the frequency at an input IN thereof and which has its Q6 output coupled to the B control input of the de-multiplexer 70. The A control input of multiplexer 70 is fed from the Q output of the flip-flop 110 mentioned above. It will be noted that the Q6 output of IC20 together with the Q5 output thereof also provide the control signals by way of the two AND gates of IC9 to the respective control inputs of the first phase detectors 46 and 48. Moreover, since the input (IN) of IC20 is also fed from the Q output of the flip-flop 110, a predetermined phase relation or synchronization exists between the control signals at Q5 and Q6 of IC20 and the control signals from the outputs of flip-flops 110 and 112 which drive the control inputs of the second phase detectors 62 and 64.

The clock timing circuit 68 also includes integrated circuit counters IC15 and IC21 which are programmable 4-bit BCD counters of the type generally designated TC4522. These counters are here wired as 2-bit programmable dividers for driving the clock input of a further flip-flop 114 of IC4 which is coupled as an input circuit with respect to flip-flops 110 and 112 of IC10.

Referring briefly to FIG. 4, the LCD driver 92 comprises an integrated circuit of the type generally designated uPD 7225G. The microcomputer 300 comprises a single chip microcomputer of the type generally designated uPD7514.

What has been shown and described herein is a novel and improved radio direction finding system. While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

An exemplary program or software listing for the CPU 40 of microcomputer 300 is reproduced on the following pages.

```
E STNO ADRS  OBJECT   M  SOURCE STATEMENT

1                  ;---------------------------------------
   2                  ;
   3                  ;
   4                  ;
   5                  ;
   6                  ;
   7                  ;
   8                  ;
   9                  ;
  10                  ;
  11                  ;               (C) 1983
  12                  ;         GENERAL RESEARCH OF ELECTRONICS, INC.
  13                  ;
  14                  ;---------------------------------------
  15                  ;RAM ALLOCATION SETTING
  16     0009                 SEG2C   EQU     9H
  17     000C                 SEG2F   EQU     0CH
  18                  ;
  19     0038                 FLG1    EQU     38H
  20     0039                 FLG2    EQU     39H
  21     003A                 FLG3    EQU     3AH
  22     003B                 FLG4    EQU     3BH
  23     003C                 FLG5    EQU     3CH
  24     003D                 FLG6    EQU     3DH
  25                  ;
  26     003E                 IVEC    EQU     3EH
  27     003F                 NVEC    EQU     3FH
  28                  ;
  29     0020                 CHN1    EQU     20H
  30     0021                 CHN2    EQU     21H
  31     00AE                 IND1    EQU     0AEH    ;INDICATOR1
  32     00AF                 IND2    EQU     0AFH    ;          2
  33                  ;
  34     0024                 CHN1L   EQU     24H     ;CURRENT CH LO DIGIT
  35     0025                 CHN1H   EQU     25H     ;           HI
  36     0034                 CHN2L   EQU     34H     ;LAST CH LO DIGIT
  37     0035                 CHN2H   EQU     35H     ;        HI
  38                  ;
```

```
     39      0032              DTNUM1   EQU    32H     ;CH # BUFFER FOR LIST RE
D
     40      0033              DTNUM2   EQU    33H     ;
HI
     41                ;
     42      004F              KZ       EQU    4FH     ;KEY INPUT BUFFER
     43                ;
     44      0026              TIMLOC   EQU    26H     ;START LOC OF TIMER COUN
ERS
     45                ;TIMER COUNTER LOCATION (TIME UNIT=12.8MSEC)
     46      0026              TIM0     EQU    26H     ;TIMER#0-100MSEC(SPECIAL
     47      0027              TIM1     EQU    27H     ;TIMER#1-100MSEC
     48      0028              TIM2     EQU    28H     ;TIMER#2-150MSEC
     49      0029              TIM3     EQU    29H     ;BUZZER TIMER 70MSEC
     50      002A              TIM4     EQU    2AH     ;TIMER#4
     51                ;
     52      002B              TIM5     EQU    2BH     ;TIMER#5 LO

** UPD7514    ASSEMBLE LIST **                        ADF1      )

(                              )

E STNO ADRS  OBJECT    M    SOURCE STATEMENT 53      002C              TIM5A    EQU    2CH     ;TIMER#5 HI-500MSEC
     54                ;
     55      002D              TIM6     EQU    2DH     ;TIMER#6 LO
     56      002E              TIM6A    EQU    2EH     ;TIMER#6 MID
     57      002F              TIM6B    EQU    2FH     ;TIMER#6 HI-5000MSEC
     58                ;
     59      004C              SHFLG    EQU    4CH     ;HEADDING OF PLL DATA
     60      004D              KSS      EQU    4DH     ;KEY HISTERISIS REGISTER
     61      004E              CHFLG    EQU    4EH     ;CH ATTRIBUTE FLAG
     62                ;
     63      0044              CHDT1    EQU    44H     ;CH DATA FROM ROM.LIST
     64      0045              CHDT2    EQU    45H     ;
     65      0046              CHDT3    EQU    46H     ;
     66                ;
     67      0048              PLL1     EQU    48H     ;PLL DATA FOR SEND
     68      0049              PLL2     EQU    49H     ;
     69      004A              PLL3     EQU    4AH     ;
     70      004B              PLL4     EQU    4BH     ;
     71                ;
     72      0050              WORK1    EQU    50H     ;WORK AREA
     73      0051              WORK2    EQU    51H     ;
     74      0052              WORK3    EQU    52H     ;
     75      0053              WORK4    EQU    53H     ;
     76      0054              WORK5    EQU    54H     ;
     77      0055              WORK11   EQU    55H     ;
     78      0056              WORK6    EQU    56H     ;
     79                ;
     80      0058              TZ       EQU    58H     ;TIMER MODULO TEMPOLARY
     81      005C              ACCY     EQU    5CH     ;SECURE ACC WHILE INT1
     82      005D              ACCZ     EQU    5DH     ;SECURE ACC WHILE INTT
     83      005E              TEMPO    EQU    5EH     ;ADDR POINTER FOR KEY COD
E LIST
     84      005F              BROFST   EQU    5FH     ;BRANCH OFFSET FOR JT BRA
NCH
     85                ;ADF PARAMETERS
     86      0099              DMF      EQU    99H     ;DIRECTION MEMORY FLG
     87      009A              SWF      EQU    9AH     ;DATA SWAP FLAG
     88      009B              SPC      EQU    9BH     ;D.I.P SW DATA
     89      009C              C        EQU    9CH     ;CMP SPEC
     90      009D              DMFS     EQU    9DH     ;FLASHING DATA OF DMF
     91                ;
     92      0080              DCH11    EQU    80H     ;CHANNEL DATA MEMO
     93      0081              DCH12    EQU    81H
     94      0082              DCH21    EQU    82H
     95      0083              DCH22    EQU    83H
     96      0084              DCH31    EQU    84H
```

```
97         0085            DCH32   EQU     85H
 98                    ;
 99         0088            DDR2    EQU     88H       ;DIAL DATA LO
100         0089            DDR3    EQU     89H
101                    ;
102         0090            DDM11   EQU     90H
103         0091            DDM12   EQU     91H       ;DIRECTION MEMORY
104         0092            DDM13   EQU     92H
105         0093            DDM21   EQU     93H
106         0094            DDM22   EQU     94H
107         0095            DDM23   EQU     95H
108         0096            DDM31   EQU     96H
109         0097            DDM32   EQU     97H
110         0098            DDM33   EQU     98H
111                    ;
112         008A            DDZ1    EQU     8AH       ;ADF DATA BUFFER
113         008B            DDZ2    EQU     8BH
114         008C            DDZ3    EQU     8CH
115                    ;
116         008D            DD1     EQU     8DH       ;ADF DATA LO
117         008E            DD2     EQU     8EH       ;ADF DATA MID
118         008F            DD3     EQU     8FH       ;ADF DATA HI
119                    ;
120                    ;PORT ALLOCATION SETTING
121         0000            PORT0   EQU     0         ;PORT#0
122         0001            PORT1   EQU     1         ;PORT#1
123         0003            KSPB    EQU     3         ;              FOR FUNC. KEYS
124         0004            KOP     EQU     4         ;KEY SIGNAL INPUT PORT#
125                    ;OTHER PARAMETERS
126         0009            BASE1   EQU     9         ;UPPER 4-BITS OF BRANCH ADDR
127         0000            BASE2   EQU     0         ;MIDDLE 4-BITS OF BRANCH ADDR
128         000C            KCAM    EQU     0CH       ;START ADDR PARAMETER
129         00F0            SOTIM   EQU     0F0H      ;WATCH PERIODE FOR SO SIGNAL
130                                                   ;0-LONGEST,FF-SHORTEST
131                    ;----------------------------------------
132                    ;     COLD START ENTRY POINT (RESET CYCLE)
133                    ;----------------------------------------
134         0000            ORG     0
135 0000 3F87       INIT1:  DI      7         ;DISABLE WHOLE INTERRUPTS
136 0002 4E70               LHLI    70H       ;CLR CH SELECTION MEMORYS
137 0004 10         MD1:    LAI     0
138 0005 55                 XAM     HL+
139 0006 84                 GJMP    MD1
140 0007 7A                 XAH               ;L=0
141 0008 0F                 AISC    0FH       ;DEC ACC
142 0009 00                 NOP
143 000A 7A                 XAH
144 000B 3E75               SKHEI   5         ;H=5?
145 000D 84                 GJMP    MD1       ;
146 000E 2A24               GJMP    INIT2
147                    ;----------------------------------------
148                    ;     INTT INTERRUPT HANDLING
149                    ;----------------------------------------
150         0010            ORG     10H
151 0010 2839               JMP     WATCH
152                    ;----------------------------------------
153                    ;           N-DATA OUT
154                    ;----------------------------------------
155 0012 3F80       NOUTE:  DI      0H
157 0016 3E8E               PSHDE
158 0013 3544       LA301:  CALL    TIM4S     ;MUTE TIMER
159 001A 4D86               ORP     6,8H      ; MUTE ON
160 001C 3E00               LEI     0H
161 001E 10                 LAI     0H
162 001F 01         LA34:   AISC    1H
163 0020 9F                 GJMP    LA34
164 0021 49                 IES
```

```
165  0022  9F                 GJMP   LA34
166  0023  1E                 LAI    0EH           ; A<--0EH
167  0024  3FEF               OP     0FH           ; SYSTEM CK MODE<--0EH
168  0026  384C               LADR   SHFLG         ; A<--SHFLG
169  0028  74                 SKABT  0H            ; A(BIT0)=1? +920 IF1
W  170  0029  202D             JMP    LA8           ; JUMP LA8
171  002B  13                 LAI    3H            ; +920
172  002C  B2                 GJMP   LA6
173  002D  15          LA8:   LAI    5H            ;NOT +920
174  002E  B2                 GJMP   LA6
175                      ;
176        0030              ORG    30H
177                      ;----------------------------------
178                      ;      INT1 HANDLER ( CHANNEL SELECT )
179                      ;----------------------------------
180  0030  2F8D               GJMP   SELECT
181                      ;
182  0032  4E50        LA6:   LHLI   WORK1         ; HL<--WORK1
183  0034  57                 ST                   ; (HL)<--A KAI
184  0035  10                 LAI    0H            ; A<--0 JOUI
185  0036  3F3E               TAMSIO.              ; SIO DATA SET
186  0038  3F33               SIO                  ; START SIO(1ST SIO)
187  003A  384A               LADR   PLL3
188  003C  79                 SC
189  003D  E0                 CALT   BS1
190  003E  78                 RC
191  003F  E0                 CALT   BS1
192  0040  57                 ST                   ;WORK1<--JOUI
193  0041  384A               LADR   PLL3
194  0043  E0                 CALT   BS1
195  0044  3849               LADR   PLL2
196  0046  E0                 CALT   BS1
197  0047  4E56               LHLI   WORK6
198  0049  57                 ST
199  004A  384A               LADR   PLL3
200  004C  E1                 CALT   BS2
201  004D  3856               LADR   WORK6
202  004F  E0                 CALT   BS1           ;A---KAI
203  0050  4E50               LHLI   WORK1
204  0052  56                 XAM    HL            ;A<--JOUI,WORK1<--KAI
205  0053  3F3E               TAMSIO
206  0055  3F33               SIO                  ;START SIO(2ND SIO)
207  0057  3849               LADR   PLL2
208  0059  4E50               LHLI   WORK1
209  005B  57                 ST
210  005C  69                 RMB    1H
211  005D  6A                 RMB    2H
212  005E  3850               LADR   WORK1
213  0060  E3                 CALT   BS4
214  0061  57                 ST
215  0062  3849               LADR   PLL2
216  0064  E1                 CALT   BS2
217  0065  3850               LADR   WORK1
218  0067  E0                 CALT   BS1
219  0068  57                 ST
220  0069  3848               LADR   PLL1
221  006B  56                 XAM    HL            ;A<--JOUI,WORK1<--KAI
222  006C  3F3E               TAMSIO
223  006E  3F33               SIO                  ;START SIO(3RD SIO)
224  0070  1A                 LAI    0AH
225  0071  01          LA7:   AISC   1H            ; A<--A+1
226  0072  B1                 GJMP   LA7           ; JUMP LA7
227  0073  4D12               ORP    2,1H          ; STROBE OUT(P20)
228  0075  00                 NOP
229  0076  00                 NOP
230  0077  4CE2               ANP    2,0EH         ; P20-->L
231  0079  352F               CALL   TIMOS         ;SPECIAL 100MSEC TIMER STARTS
232  007B  3E8F               POPDE
233  007D  3E9F               POPHL
234  007F  3F90               EI     0H
235  0081  43                 RTPSW
```

```
236 0082 3264          CLT501: CALL    LA58
237 0084 3271                  CALL    LA62
238 0086 53                    RT
239 0087 59           CLT502:  ILS
240 0088 59           CLT503:  ILS
241 0089 59                    ILS
242 008A 49                    IES
243 008B 49                    IES
244 008C 00                    NOP
245 008D 53                    RT
246 008E 3F3E         CLT504:  TAMSIO
247 0090 EF                    CALT    INTSCN  ;EI THEN DI
248 0091 3F33                  SIO
249 0093 379E                  CALL    LA50
250 0095 53                    RT
251 0096 2766         CLT505:  GJMP    DPSIOE
252 0098 2297         CLT506:  GJMP    LA63E
253 009A 2760         CLT507:  GJMP    SB10E
254 009C 275B         CLT508:  GJMP    SB9E
255 009E 2556         CLT509:  GJMP    TIM6SE
256                   ;-------------------------------------
257                   ;       ADF DATA INITIALIZE
258                   ;-------------------------------------
259 00A0 10           INITAD: LAI     0
260 00A1 4E8A                 LHLI    DDZ1
261 00A3 57           ME5:    ST
262 00A4 59                   ILS
263 00A5 A3                   GJMP    ME5
264 00A6 10                   LAI     0
265 00A7 4E9A                 LHLI    SWF
266 00A9 57                   ST
267 00AA E6                   CALT    CHDISP
268 00AB EA                   CALT    ADISP
269 00AC 30B2                 CALL    OPRSGN
270 00AE E9                   CALT    DDISP
271 00AF DE                   CALT    CFLG4   ;
272 00B0 68                   RMB     0       ;RESET DDFLG
273 00B1 53                   RT
274                   ;-------------------------------------
275                   ;       OPERATION INDICATER SIGN
276                   ;-------------------------------------
277 00B2 4E8D         OPRSGN: LHLI    DD1
278 00B4 1C                   LAI     0CH     ;CHR<R>
279 00B5 57                   ST
280 00B6 59                   ILS
281 00B7 1B                   LAI     0BH     ;CHR<P>
282 00B8 57                   ST
283 00B9 59                   ILS
284 00BA 1A                   LAI     0AH     ;CHR<O>
285 00BB 57                   ST
286 00BC F6                   CALT    DCLR    ;DIAL CLEAR
287 00BD 53                   RT
288                   ;-------------------------------------
289                   ;       SELECTION SUBROUTINE ENTRY
290                   ;-------------------------------------
291 00BE 2F8D         SUBSEL: GJMP    SELECT
292                   ;-------------------------------------
293                   ;       CALT TABLE
294                   ;-------------------------------------
295           00D0            ORG     0D0H
296 00D0 5F           BRSUB:  DET     CLT0
297 00D1 40           CHNV:   DET     CLT3
298 00D2 44           BUZZR:  DET     CLT4
299                   ;
300 00D3 7F           SBT1:   DET     CLT6
301 00D4 8D           SBT4:   DET     CLT71
302 00D5 9A           SBT6:   DET     CLT72
303 00D6 6C           PFLGX:  DET     CLT103
304 00D7 7C           WFLGX:  DET     CLT601
305                   ;
306 00D8 76           SB04:   DET     CLT73
```

```
307                      ;
308 00D9 60               CFLG1:   DET     CLT8
309 00DA 63               KFLGX:   DET     CLT9
310 00DB 66               KFLG0:   DET     CLT10
311                      ;
312 00DC 69               CFLG2:   DET     CLT11
313 00DD 79               CFLG3:   DET     CLT20
314 00DE 4D               CFLG4:   DET     CLT25
315 00DF 50               CFLG6:   DET     CLT30
316                      ;
317 00E0 73               BS1:     DET     CLT201   ;ROTATE 1BIT
318 00E1 72               BS2:     DET     CLT202   ;       2
319 00E2 71               BS3:     DET     CLT203   ;       3
320 00E3 70               BS4:     DET     CLT204   ;       4
321                      ;
322 00E4 80               ADSUB:   DET     CLT301
323 00E5 82               CHDAT:   DET     CLT302
324 00E6 84               CHDISP:  DET     CLT303
325 00E7 86               NCOMP:   DET     CLT306
326 00E8 88               NOUT:    DET     CLT307
327                      ;
328 00E9 8A               DDISP:   DET     CLT401
329 00EA 8B               ADISP:   DET     CLT402
330 00EB 22               DDSET:   DET     CLT501
331 00EC 27               INCLE:   DET     CLT502
332 00ED 28               INCLEA:  DET     CLT503
333 00EE 2E               DCSSB:   DET     CLT504
334 00EF 57               INTSCN:  DET     CLT31
335 00F0 36               DPSIO:   DET     CLT505
336 00F1 38               LA63:    DET     CLT506
337 00F2 3A               SB10:    DET     CLT507
338 00F3 3C               SB9:     DET     CLT508
339 00F4 3E               TIM6S:   DET     CLT509
340 00F5 53               TIM5S:   DET     CLT510
341 00F6 55               DCLR:    DET     CLT511
342                      ;----------------------------------------
343                      ;        TABLE CALLING SUBROUTINES
344                      ;----------------------------------------
345        0100                   ORG     100H
346                      ;
347                      ;CHANGE NODE VECTOR        (CALT CHNV)
348 0100 4E3F             CLT3:    LHLI    NVEC    ;NODE VECTOR ADDR
349 0102 57                        ST
350 0103 53                        RT
351                      ;
352                      ;BUZZAR ACTIVATE ROUTINE           (CALT BUZZR)
353 0104 4D42             CLT4:    ORP     2,4H    ;PORT22-->H
354 0106 DC                        CALT    CFLG2
355 0107 6A                        RMB     2       ;TIMER#3 FLAG RST
356 0108 4E29                      LHLI    TIM3    ;HL<--TIM3
357 010A 1B                        LAI     0BH     ;A<--0BH
358 010B 57                        ST              ;TIM3<--0BH SET
359 010C 53                        RT
360                      ;
361                      ;FLG#4ACCESS     (CALT CFLG4)
362 010D 4E3B             CLT25:   LHLI    FLG4    ;FLG#4 LOC
363 010F 53                        RT
364                      ;FLG#6 ACCESS    (CALT CFLG6)
365 0110 4E3D             CLT30:   LHLI    FLG6    ;FLG#6 LOC
366 0112 53                        RT
367 0113 254B             CLT510:  GJMP    TIM5SE
368 0115 22AA             CLT511:  GJMP    DCLRE
369                      ;
370 0117 3F90             CLT31:   EI      0
371 0119 3F80                      DI      0
372 011B 53                        RT
373        011F                    ORG     11FH
374                      ;
375                      ;BRANCH OFFSET PREPARE       (CALT BRSUB)
376 011F 78               CLT0:    RC              ;ONE BIT SHIFT TO LEFT FILLING 0 IN 1-ST
```

```
BIT
 377 0120 E3                    CALT    BS4
 378 0121 4E5F                  LHLI    BROFST  ;BRANCH OFFSET DATA ADDR
 379 0123 57                    ST
 380 0124 53                    RT
 381 0125 10                    LAI     0
 382 0126 59                    ILS
 383 0127 57                    ST
 384 0128 53                    RT
 385          0180               ORG    180H
 386                         ;
 387                         ;FLAG#1 ACCESS   (CALT CFLG1)
 388 0180 4E38           CLT8:   LHLI    FLG1    ;FLG#1 LOC
 389 0182 53                     RT
 390                         ;
 391                         ;KEYBOARD FLAG RESET
 392 0183 D9             CLT9:   CALT    CFLG1
 393 0184 68                     RMB     0
 394 0185 53                     RT
 395                         ;
 396                         ;KEY-BOARD FLAG SET   (CALT KFLG0)
 397 0186 D9             CLT10:  CALT    CFLG1
 398 0187 6C                     SMB     0
 399 0188 53                     RT
 400                         ;
 401                         ;FLAG#2 ACCESS   (CALT CFLG2)
 402 0189 4E39           CLT11:  LHLI    FLG2    ;FLG#2 LOC
 403 018B 53                     RT
 404                         ;
 405                         ;P FLAG#2 RESET   (CALT PFLGX)
 406 018C 4EAF           CLT103: LHLI    IND2
 407 018E 6B                     RMB     3
 408 018F 53                     RT
 409                         ;
 410 0190 E0             CLT204: CALT    BS1
 411 0191 E0             CLT203: CALT    BS1
 412 0192 E0             CLT202: CALT    BS1
 413 0193 3FB3           CLT201: RAR
 414 0195 53                     RT
 415                         ;
 416                         ;ROM LIST READ & DISPLAY REFRESH  (CALT SB04)
 417 0196 E5             CLT73:  CALT    CHDAT   ;ROM LIST READ
 418 0197 E6                     CALT    CHDISP  ;LCD CHDISP REFRESH
 419 0198 53                     RT
 420                         ;
 421                         ;FLAG#3 ACCESS   (CALT CFLG3)
 422 0199 4E3A           CLT20:  LHLI    FLG3    ;FLG#3 LOC
 423 019B 53                     RT
 424                         ;
 425 019C D9             CLT601: CALT    CFLG1   ;WFLG CLR
 426 019D 6A                     RMB     2
 427 019E 53                     RT
 428                         ;
 429          019F              ORG    19FH
 430                         ;
 431                         ;CHANGE LAST CH MEMORY  (CALT SBT1)
 432 019F 4E24           CLT6:   LHLI    CHN1L   ;CURRENT CH LO DIGIT LOC
 433 01A1 52                     LAM     HL      ;READ CURRENT CH
 434 01A2 4E34                   LHLI    CHN2L   ;LAST CH HI DIGIT LOC
 435 01A4 57                     ST              ;STORE TO LAST CH MEM LO-DIGIT
 436 01A5 4E25                   LHLI    CHN1H   ;CURRENT CH HI DIGIT LOC
 437 01A7 52                     LAM     HL      ;READ CURRENT CH HI-DIGIT
 438 01A8 4E35                   LHLI    CHN2H   ;LAST CH HI DIGIT LOC
 439 01AA 57                     ST
 440 01AB 53                     RT
 441                         ;-----------------------
 442                         ;         CHANNEL DATA
 443                         ;-----------------------
 444 01AC 3E9E           CHDATE: PSHHL
 445 01AE 3E8E                   PSHDE
 446 01B0 4E51                   LHLI    WORK2         ; HL<---WORK2
```

```
447  01B2  373C              CALL     SB3
448  01B4  31DF              CALL     LA9
449  01B6  3945              XADR     CHDT2        ; A<--->CHDT2
450  01B8  56                XAM      HL           ; A<--->(HL)
451  01B9  3944              XADR     CHDT1        ; A<--->CHDT1
452  01BB  373C              CALL     SB3
453  01BD  3F6C              SKAEI    OCH          ; A=OCH? (SKIP)
454  01BF  90                GJMP     LA10         ; JUMP LA10
455  01C0  01                AISC     1H           ; A<---A+1H
456  01C1  3742              CALL     SB4
457  01C3  373C              CALL     SB3
458  01C5  02                AISC     2H           ; A<---A+2H
459  01C6  31DF              CALL     LA9
460  01C8  1F                LAI      OFH          ; A<---OFH
461  01C9  374A              CALL     SB5
462  01CB  3E8F              POPDE
463  01CD  3E9F              POPHL
464  01CF  43                RTPSW
465  01D0  04        LA10:   AISC     4H           ; A<---A+4H
466  01D1  3742              CALL     SB4
467  01D3  373C              CALL     SB3
468  01D5  08                AISC     8H           ; A<---A+8H
469  01D6  31DF              CALL     LA9
470  01D8  374A              CALL     SB5
471  01DA  3E8F              POPDE
472  01DC  3E9F              POPHL
473  01DE  43                RTPSW
474  01DF  28F0      LA9:    JMP      LA32
475  01E1  43        LA11:   RTPSW
476                          ;
477        0200              ORG      200H
478  0200  248B      CLT301: GJMP     ADSUBE
479  0202  21AC      CLT302: GJMP     CHDATE
480  0204  2FDD      CLT303: GJMP     CHDSPE
481  0206  2580      CLT306: GJMP     NCOMPE
482  0208  2012      CLT307: GJMP     NOUTE
483                          ;
484  020A  A7        CLT401: GJMP     DDISPE
485  020B  229D      CLT402: GJMP     ADISPE
486                          ;
487                          ;STORE CHN1L/H TO DTNUM1/2  (CALT SBT4)
488  020D  4E24      CLT71:  LHLI     CHN1L
489  020F  52                LAM      HL           ;CHN1L LOAD
490  0210  4E32              LHLI     DTNUM1
491  0212  57                ST                    ;STORE TO DTNUM1
492  0213  4E25              LHLI     CHN1H
493  0215  52                LAM      HL           ;CHN1H LOAD
494  0216  4E33              LHLI     DTNUM2
495  0218  57                ST                    ;STORE TO DTNUM2
496  0219  53                RT
497                          ;
498                          ;STORE DTNUM1/2 TO CHN1L/H  (CALT SBT6)
499  021A  4E32      CLT72:  LHLI     DTNUM1
500  021C  52                LAM      HL           ;DTNUM1 LOAD
501  021D  4E24              LHLI     CHN1L
502  021F  57                ST                    ;STORE TO CHN1L
503  0220  4E33              LHLI     DTNUM2
504  0222  52                LAM      HL           ;DTNUM2 LOAD
505  0223  4E25              LHLI     CHN1H
506  0225  57                ST                    ;STORE TO CHN1H
507  0226  53                RT
508                          ;--------------------------------------
509                          ;       DIRECTION DATA DISPLAY
510                          ;--------------------------------------
511  0227  4F00      DDISPE: LDEI     00H
512  0229  388D              LADR     DD1
513  022B  EB                CALT     DDSET
514  022C  388E              LADR     DD2
515  022E  3F60              SKAEI    0H
516  0230  2243              GJMP     LA64
517  0232  388F              LADR     DD3
```

```
518 0234 3F60           SKAEI   0H
519 0236 2243           GJMP    LA64
520 0238 1F             LAI     0FH
521 0239 EB             CALT    DDSET
522 023A 1F             LAI     0FH
523 023B EB             CALT    DDSET
524 023C 3F44           SKI     4         ;CHK INT1 RQ
525 023E 2242           GJMP    LAX1      ;NO RQST
526 0240 30BE           CALL    SUBSEL
527 0242 97     LAX1:   GJMP    LA66
528 0243 388E   LA64:   LADR    DD2
529 0245 EB             CALT    DDSET
530 0246 3F44           SKI     4         ;CHK INT1 RQ
531 0248 8B             GJMP    LAX2      ;NO RQST
532 0249 30BE           CALL    SUBSEL
533 024B 388F   LAX2:   LADR    DD3
534 024D 3F60           SKAEI   0H
535 024F 91             GJMP    LA65
536 0250 1F             LAI     0FH
537 0251 EB     LA65:   CALT    DDSET
538 0252 3F44           SKI     4         ;CHK INT1 RQ
539 0254 97             GJMP    LA66      ;NO RQST
540 0255 30BE           CALL    SUBSEL
541 0257 3899   LA66:   LADR    DMF
542 0259 4E53           LHLI    WORK4
543 025B 57             ST                ;WORK4<--(DMF)
544 025C 3271           CALL    LA62
545 025E 3F44           SKI     4         ;CHK INT1 RQ
546 0260 A3             GJMP    LAX3      ;NO RQST
547 0261 30BE           CALL    SUBSEL
548 0263 53     LAX3:   RT
549 0264 4E52   LA58:   LHLI    WORK3
550 0266 57             ST                ;WORK3<--DD1/2/3
551 0267 11             LAI     1H
552 0268 326E           CALL    LA59      ;WORK3<--EFG
553 026A 4E53           LHLI    WORK4
554 026C 57             ST                ;WORK4<--ABCD
555 026D 53             RT
556 026E 2A20   LA59:   GJMP    LA60
557 0270 53     LA61:   RT
558 0271 10     LA62:   LAI     0H
559 0272 67             SKMBT   3H        ;A=1?/DM=1?
560 0273 05             AISC    5H
561 0274 01             AISC    1H
562 0275 F1             CALT    LA63
563 0276 10             LAI     0H
564 0277 66             SKMBT   2H        ;B=1?/M3=1?
565 0278 05             AISC    5H
566 0279 01             AISC    1H
567 027A F1             CALT    LA63
568 027B 10             LAI     0H
569 027C 65             SKMBT   1H        ;C=1?/M2=1?
570 027D 05             AISC    5H
571 027E 01             AISC    1H
572 027F F1             CALT    LA63
573 0280 10             LAI     0H
574 0281 64             SKMBT   0H        ;D=1?/M1=1?
575 0282 05             AISC    5H
576 0283 01             AISC    1H
577 0284 F1             CALT    LA63
578 0285 4E52           LHLI    WORK3
579 0287 10             LAI     0H
580 0288 67             SKMBT   3H        ;E=1?
581 0289 05             AISC    5H
582 028A 01             AISC    1H
583 028B F1             CALT    LA63
584 028C 10             LAI     0H
585 028D 66             SKMBT   2H        ;F=1?
586 028E 05             AISC    5H
587 028F 01             AISC    1H
588 0290 F1             CALT    LA63
```

```
589  0291  10              LAI     0H
590  0292  65              SKMBT   1H        ;G=1?
591  0293  05              AISC    5H
592  0294  01              AISC    1H
593  0295  F1              CALT    LA63
594  0296  53              RT
595  0297  45      LA63E:  XAM     DE
596  0298  49              IES               ;SKIP IF E=0
597  0299  53              RT
598  029A  11              LAI     1H
599  029B  4A              XAD
600  029C  53              RT
601                ;--------------------------------
602                ;      ANALOGUE DISPLAY
603                ;--------------------------------
604  029D  F6      ADISPE: CALT    DCLR      ;DIAL CLR
605  029E  36C9            CALL    DADR      ;DOT ADDR
606  02A0  3E3A            LHI     0AH       ;SUB DISP AREA BASE ADDR
607  02A2  3854            LADR    WORK5
608  02A4  3E9A            TAL
609  02A6  383C            LADR    FLG5
610  02A8  57              ST
611  02A9  53              RT
612                ;
613  02AA  10      DCLRE:  LAI     0
614  02AB  AD              GJMP    NS11
615  02AC  1F      DSET:   LAI     0FH
616  02AD  3E3A    NS11:   LHI     0AH       ;FILL A0H-A3H
617  02AF  3E10            LLI     0
618  02B1  57      NS12:   ST
619  02B2  59              ILS
620  02B3  00              NOP
621  02B4  3E59            SKLEI   9
622  02B6  B1              GJMP    NS12
623  02B7  53              RT
624                ;--------------------------------
625                ;      DIRECTION DATA COMPENSATION
626                ;--------------------------------
627  02B8  389C    DRCOMP: LADR    C
628  02BA  3E8A            TAE
629  02BC  76              SKABT   2         ;CHK +/-
630  02BD  22CD            GJMP    NP14      ;0 - +6 DEG
631                ;                          -8 - -2DEG
632  02BF  32FD    NP12:   CALL    DCDDZ     ;DEC 1 DEG
633  02C1  32FD            CALL    DCDDZ     ;DEC 1 DEG
634  02C3  49              IES
635  02C4  22BF            GJMP    NP12      ;<E> NOT 0
636  02C6  3326            CALL    DDFIX
637  02C8  91              GJMP    NP13
638  02C9  32D2    NP11:   CALL    INDDZ     ;INC 1 DEG
639  02CB  32D2            CALL    INDDZ     ;INC 1 DEG
640  02CD  48      NP14:   DES
641  02CE  89              GJMP    NP11      ;<E> NOT 0FH
642  02CF  3326            CALL    DDFIX
643  02D1  53      NP13:   RT
644                ;--------------------------------
645                ;      INC DDZ BY 1 DEG
646                ;--------------------------------
647  02D2  3D8A    INDDZ:  IDRS    DDZ1      ;INC
648  02D4  388A            LADR    DDZ1
649  02D6  3F6A            SKAEI   0AH       ;SHIFT?
650  02D8  BC              GJMP    NP31      ;NO SHIFT
651  02D9  10              LAI     0
652  02DA  4E8A            LHLI    DDZ1      ;SHIFT IN 1ST DIGIT
653  02DC  57              ST
654  02DD  3D8B            IDRS    DDZ2      ;INC 2ND DIGIT
655  02DF  388B            LADR    DDZ2
656  02E1  3F6A            SKAEI   0AH       ;SHIFT?
657  02E3  AA              GJMP    NP32      ;NO MORE SHIFT
658  02E4  10              LAI     0         ;
659  02E5  4E8B            LHLI    DDZ2      ;SHIFT IN 2ND DIGIT
```

```
660 02E7 57             ST
661 02E8 3D8C           IDRS    DDZ3        ;INC 3RD DIGIT
662 02EA 388C    NP32:  LADR    DDZ3
663 02EC 3F63           SKAEI   03H         ;OVFLO?
664 02EE BC             GJMP    NP31        ;NO
665 02EF 388B           LADR    DDZ2        ;
666 02F1 3F66           SKAEI   06H         ;OVFLO?
667 02F3 BC             GJMP    NP31        ;NO
668 02F4 10             LAI     0
669 02F5 4E8A           LHLI    DDZ1
670 02F7 57             ST
671 02F8 59             ILS
672 02F9 57             ST
673 02FA 59             ILS
674 02FB 57             ST
675 02FC 53     NP31:   RT
676             ;------------------------------------
677             ;       DEC DDZ BY 1 DEG
678             ;------------------------------------
679 02FD 3C8A   DCDDZ:  DDRS    DDZ1
680 02FF 00             NOP
681 0300 388A           LADR    DDZ1
682 0302 3F6F           SKAEI   0FH
683 0304 A5             GJMP    NP41        ;NO SHIFT
684 0305 19             LAI     09H         ;SHIFT
685 0306 4E8A           LHLI    DDZ1
686 0308 57             ST
687 0309 3C8B           DDRS    DDZ2        ;DEC 2ND DIGIT
688 030B 00             NOP
689 030C 388B           LADR    DDZ2
690 030E 3F6F           SKAEI   0FH         ;SHIFT?
691 0310 A5             GJMP    NP41        ;NO SHIFT
692 0311 19             LAI     09H         ;SHIFT
693 0312 4E8B           LHLI    DDZ2
694 0314 57             ST
695 0315 3C8C           DDRS    DDZ3        ;DEC 3RD DIGIT
696 0317 00             NOP
697 0318 388C           LADR    DDZ3
698 031A 3F6F           SKAEI   0FH         ;MINUS DATA
699 031C A5             GJMP    NP41        ;NOT MINUS
700 031D 15             LAI     5
701 031E 4E8B           LHLI    DDZ2
702 0320 57             ST
703 0321 13             LAI     3
704 0322 4E8C           LHLI    DDZ3
705 0324 57             ST
706 0325 53     NP41:   RT
707             ;------------------------------------
708             ;       COPY DDZ TO DD
709             ;------------------------------------
710 0326 4E8D   DDFIX:  LHLI    DD1
711 0328 388A           LADR    DDZ1
712 032A 57             ST
713 032B 59             ILS
714 032C 388B           LADR    DDZ2
715 032E 57             ST
716 032F 59             ILS
717 0330 388C           LADR    DDZ3
718 0332 57             ST
719 0333 53             RT
720             ;------------------------------------
721             ;       COMPENSATION DATA SET
722             ;------------------------------------
723 0334 4E9B   CMPDAT: LHLI    SPC
724 0336 66             SKMBT   2
725 0337 BD             GJMP    NP21
726 0338 4E9C           LHLI    C
727 033A 57             ST
728 033B 6F             SMB     3
729 033C 53             RT
730 033D 4E9C   NP21:   LHLI    C
```

```
731  033F 57              ST
732  0340 68              RMB    3
733  0341 53              RT
734                ;----------------------------------
735                ;       5/4 ROUNDING OF 1ST DIGIT
736                ;----------------------------------
737                ;
738  0342 4E8B    DROUND: LHLI   DDR2
739  0344 388E            LADR   DD2
740  0346 57              ST
741  0347 59              ILS
742  0348 388F            LADR   DD3
743  034A 57              ST
744  034B 4E8D            LHLI   DD1
745  034D 1C              LAI    0CH
746  034E 3FB2            ANL
747  0350 3F60            SKAEI  0
748  0352 94              GJMP   NP51        ;NOT 0-3
749  0353 53      NP52:   RT
750  0354 388D    NP51:   LADR   DD1
751  0356 3F64            SKAEI  4
752  0358 9A              GJMP   NP53        ;NOT 4
753  0359 93              GJMP   NP52        ;EQ 4
754  035A 3D8B    NP53:   IDRS   DDR2
755  035C 3888            LADR   DDR2
756  035E 3F66            SKAEI  6
757  0360 AD              GJMP   NP54        ;NOT 6
758  0361 383F            LADR   DD3
759  0363 3F63            SKAEI  3
760  0365 93              GJMP   NP52        ;NOT 3
761  0366 4E88            LHLI   DDR2
762  0368 10              LAI    0
763  0369 57              ST
764  036A 59              ILS
765  036B 57              ST
766  036C 93              GJMP   NP52
767  036D 3F6A    NP54:   SKAEI  0AH         ;SHIFT INTO 3RD DIGIT
768  036F 93              GJMP   NP52        ;NO SHIFT
769  0370 3D89            IDRS   DDR3
770  0372 00              NOP
771  0373 4E88            LHLI   DDR2
772  0375 10              LAI    0           ;CLR LWR DIGIT
773  0376 57              ST
774  0377 93              GJMP   NP52        ;SHIFT
775                ;----------------------------------
776                ;       COPY RIGHT DEMO
777                ;----------------------------------
778  0378 4E8D    CPYRGT: LHLI   DD1
779  037A 16              LAI    6
780  037B 57              ST
781  037C 59              ILS
782  037D 14              LAI    4
783  037E 57              ST
784  037F 59              ILS
785  0380 13              LAI    3
786  0381 57              ST
787  0382 E9              CALT   DDISP
788  0383 16              LAI    6           ;ERASE SEGMENTS
789  0384 4E09            LHLI   SEG2C
790  0386 57              ST
791  0387 4E0C            LHLI   SEG2F
792  0389 57              ST
793  038A F0              CALT   DPSIO
794  038B 53              RT
795                ;
796                ;----------------------------------
797                ;CHANNEL INITIALIZE TO 16-CH ALL
798  038C 4E32    SBT0:   LHLI   DTNUM1
799  038E 1F              LAI    0FH
800  038F 57              ST
801  0390 4E33            LHLI   DTNUM2
```

```
802 0392 10              LAI     0
803 0393 57              ST
804 0394 D5              CALT    SBT6
805 0395 D3              CALT    SBT1
806 0396 D8              CALT    SBO4        ;ROM LIST ACCESS & DISPLAY
807 0397 53              RT
808                ;------------------------------------------
809                ;           FLOW CONTROL SUBROUTINES
810                ;------------------------------------------
811                ;------------------------------------------
812                ;      BRANCH FROM DRECTORY ROUTINE
813                ;------------------------------------------
814 0398 383F    BR0:    LADR    NVEC        ;LOAD NODE-VECTOR
815 039A D0              CALT    BRSUB
816 039B 10              LAI     BASE2       ;FILL ACC BY JUMP ADDR BASE
817 039C 53              RT
818                ;------------------------------------------
819                ;      BRANCH FROM NRN NODE ROUTINE
820                ;------------------------------------------
821 039D 383E    BR1:    LADR    IVEC        ;LOAD INPUT-VECTOR
822 039F 77              SKABT   3           ;IF(ACC>7)THEN SKIP
823 03A0 A4              GJMP    NC11
824 03A1 D0              CALT    BRSUB
825 03A2 12              LAI     BASE2+2H    ;FILL ACC BY JUMP ADDR BASE
826 03A3 A6              GJMP    NC12
827 03A4 D0      NC11:   CALT    BRSUB
828 03A5 11              LAI     BASE2+1    ;FILL ACC BY JUMP ADDR BASE
829 03A6 53      NC12:   RT
830                ;------------------------------------------
831                ;      BRANCH FROM WRN NODE ROUTINE
832                ;------------------------------------------
833 03A7 383E    BR2:    LADR    IVEC        ;LOAD INPUT-VECTOR
834 03A9 77              SKABT   3
835 03AA AE              GJMP    NC21
836 03AB D0              CALT    BRSUB
837 03AC 14              LAI     BASE2+4
838 03AD B0              GJMP    NC22
839 03AE D0      NC21:   CALT    BRSUB
840 03AF 13              LAI     BASE2+3    ;FILL ACC BY JUMP ADDR BASE
841 03B0 53      NC22:   RT
842                ;------------------------------------------
843                ;      BRANCH FROM ARN NODE ROUTINE
844                ;------------------------------------------
845 03B1 383E    BR3:    LADR    IVEC        ;LOAD INPUT-VECTOR
846 03B3 77              SKABT   3
847 03B4 B8              GJMP    NC31
848 03B5 D0              CALT    BRSUB
849 03B6 16              LAI     BASE2+6
850 03B7 BB              GJMP    NC32
851 03B8 D0      NC31:   CALT    BRSUB
852 03B9 15              LAI     BASE2+5    ;FILL ACC BY JUMP ADDR BASE
853 03BA 53              RT
854 03BB 53      NC32:   RT
855                ;      BRANCH FROM SRN NODE ROUTINE
856                ;------------------------------------------
857 03BC 383E    BR4:    LADR    IVEC        ;LOAD INPUT-VECTOR
858 03BE 77              SKABT   3
859 03BF 83              GJMP    NC41
860 03C0 D0              CALT    BRSUB
861 03C1 18              LAI     BASE2+8
862 03C2 85              GJMP    NC42
863 03C3 D0      NC41:   CALT    BRSUB
864 03C4 17              LAI     BASE2+7    ;FILL ACC BY JUMP ADDR BASE
865 03C5 53      NC42:   RT
866                ;------------------------------------------
867                ;      BRANCH FROM PRN NODE ROUTINE
868                ;------------------------------------------
869 03C6 383E    BR5:    LADR    IVEC        ;LOAD INPUT VECTOR
870 03C8 77              SKABT   3           ;IF(ACC>7)THEN SKIP
871 03C9 8D              GJMP    NC51
```

```
 872 03CA  D0              CALT    BRSUB
 873 03CB  1A              LAI     BASE2+0AH      ;FILL ACC BY JUMP ADDR BASE
 874 03CC  8F              GJMP    NC52
 875 03CD  D0      NC51:   CALT    BRSUB
 876 03CE  19              LAI     BASE2+9        ;FILL ACC BY JUMP ADDR BASE
 877 03CF  53      NC52:   RT
 878                 ;----------------------------------------
 879                 ;       BRANCH FROM DWN NODE ROUTINE
 880                 ;----------------------------------------
 881 03D0  383E    BR6:    LADR    IVEC           ;LOAD INPUT VECTOR
 882 03D2  77              SKABT   3              ;IF(ACC>7)THEN SKIP
 883 03D3  97              GJMP    NC61
 884 03D4  D0              CALT    BRSUB
 885 03D5  1C              LAI     BASE2+0CH      ;FILL ACC BY JUMP ADDR BASE
 886 03D6  99              GJMP    NC62
 887 03D7  D0      NC61:   CALT    BRSUB
 888 03D8  1B              LAI     BASE2+0BH      ;FILL ACC BY JUMP ADDR BASE
 889 03D9  53.     NC62:   RT
 890                 ;----------------------------------------
 891                 ;       BRANCH FROM ASN NODE ROUTINE
 892                 ;----------------------------------------
 893 03DA  383E    BR7:    LADR    IVEC           ;LOAD INPUT VECTOR
 894 03DC  77              SKABT   3
 895 03DD  A0              GJMP    NC71
 896 03DE  3750            CALL    SB6
 897 03E0  D0      NC71:   CALT    BRSUB
 898 03E1  1D              LAI     BASE2+0DH      ;FILL ACC BY JUMP ADDR BASE
 899 03E2  53              RT
 900                 ;----------------------------------------
 901                 ;       BRANCH FROM SSN NODE ROUTINE
 902                 ;----------------------------------------
 903 03E3  383E    BR8:    LADR    IVEC           ;LOAD INPUT VECTOR
 904 03E5  77              SKABT   3
 905 03E6  A9              GJMP    NC81
 906 03E7  3750            CALL    SB6
 907 03E9  D0      NC81:   CALT    BRSUB
 908 03EA  1E              LAI     BASE2+0EH      ;FILL ACC BY JUMP ADDR BASE
 909 03EB  53              RT
 910                 ;----------------------------------------
 911                 ;       KEY BOARD ENCODE ROUTINES
 912                 ;----------------------------------------
 913                 ;SET LOWER 3-BIT OF FUNCTION KEY CODE TABLE ADDR
 914 03EC  3755    KCALR1: CALL    SB7
 915 03EE  17              LAI     7
 916 03EF  3FB2            ANL                    ;MSB CLR
 917 03F1  57              ST                     ;STORE TO TEMPO AGAIN
 918 03F2  53              RT
 919                 ;FILL KZ WITH KEYCODE
 920 03F3  2AF0    KZR:    GJMP    RKL            ;ROM LIST ACCESS
 921                 ;----------------------------------------
 922 03F5  4E4F    MT1:    LHLI    KZ             ;STORE TO KZ
 923 03F7  57              ST
 924 03F8  53              RT
 925                 ;----------------------------------------
 926                 ;       MEMORY FLAG ACCESS ROUTINE
 927                 ;----------------------------------------
 928 03F9  4E3D    MFACC:  LHLI    FLG6           ;CHECK INT/USA MODE
 929 03FB  66              SKMBT   2              ;INT FLAG CHK
 930 03FC  2401            GJMP    SL1            ;US.MODE
 931 03FE  3E07            LEI     7              ;INT.MODE
 932 0400  83              GJMP    SL2
 933 0401  3E06    SL1:    LEI     6
 934 0403  4E33    SL2:    LHLI    DTNUM2
 935 0405  13              LAI     3
 936 0406  3FB2            ANL
 937 0408  78              RC
 938 0409  E3              CALT    BS4
 939 040A  4E32            LHLI    DTNUM1 ;
```

```
940 040C 66              SKMBT   2
941 040D 91              GJMP    SL3     ;BIT2 OF DTNUM2 IS 0
942 040E 79              SC
943 040F E0              CALT    BS1
944 0410 93              GJMP    SL4
945 0411 78      SL3:    RC
946 0412 E0              CALT    BS1
947 0413 67      SL4:    SKMBT   3       ;CHK BIT3 OF DTNUM2
948 0414 98              GJMP    SL5     ;BIT3 IS 0
949 0415 79              SC              ;BIT3 IS 1
950 0416 E0              CALT    BS1
951 0417 9A              GJMP    SL6
952 0418 78      SL5:    RC
953 0419 E0              CALT    BS1
954 041A E1      SL6:    CALT    BS2
955 041B 3EAA            TAD
956 041D 4E32            LHLI    DTNUM1  ;BIT NUMBER IDENTIFY
957 041F 13              LAI     3
958 0420 3FB2            ANL
959 0422 4A              XAD             ;ACC <--> D
960 0423 3E9A            TAL             ;ACC --> L
961 0425 3E8B            TEA             ;E --> ACC
962 0427 3EBA            TAH             ;ACC --> H
963 0429 53              RT
964                      ;----------------------------------------
965                      ;    CHANNEL SELECTION MEMORY FLG SET
966                      ;----------------------------------------
967 042A 33F9    CMEM:   CALL    MFACC   ;MEMORY FLG ACCESS
968 042C 3EAB            TDA             ;D---> ACC
969 042E E0              CALT    BS1
970 042F 5A              SKC             ;CHK BIT 0 OF DTNUM1
971 0430 BA              GJMP    SP1     ;TARGET BIT IS 0 OR 2
972 0431 E0              CALT    BS1             ;TARGET BIT IS 1 OR 3
973 0432 5A              SKC
974 0433 B7              GJMP    SP2     ;TARGET BIT IS 1
975 0434 6F              SMB     3       ;TARGET BIT IS 3
976 0435 2442            GJMP    SP3
977 0437 6D      SP2:    SMB     1
978 0438 2442            GJMP    SP3
979 043A E0      SP1:    CALT    BS1
980 043B 5A              SKC
981 043C 2440            GJMP    SP4     ;TARGET BIT IS 0
982 043E 6E              SMB     2       ;TARGET BIT IS 2
983 043F 82              GJMP    SP3
984 0440 6C      SP4:    SMB     0
985 0441 82              GJMP    SP3
986 0442 53      SP3:    RT
987                      ;----------------------------------------
988                      ;    SELECTED CHANNEL MOMORY FLG CLR
989                      ;----------------------------------------
990 0443 33F9    CDEL:   CALL    MFACC   ;MEMORY FLG ACCESS
991 0445 3EAB            TDA             ;
992 0447 E0              CALT    BS1
993 0448 5A              SKC             ;
994 0449 91              GJMP    SQ1     ;
995 044A E0              CALT    BS1             ;
996 044B 5A              SKC
997 044C 8F              GJMP    SQ2     ;
998 044D 6B              RMB     3       ;
999 044E 98              GJMP    SQ3
1000 044F 69     SQ2:    RMB     1
1001 0450 98             GJMP    SQ3
1002 0451 E0     SQ1:    CALT    BS1
1003 0452 5A             SKC
1004 0453 96             GJMP    SQ4     ;
1005 0454 6A             RMB     2       ;
1006 0455 98             GJMP    SQ3
1007 0456 68     SQ4:    RMB     0
1008 0457 98             GJMP    SQ3
1009 0458 53     SQ3:    RT
1010                     ;----------------------------------------
```

```
1011                     ;       CHECK SELECTED CHANNEL MEMORY FLG
1012                     ;----------------------------------------
1013  0459  3833   CCHK:   LADR    DTNUM2
1014  045B  3F6C           SKAEI   0CH             ;WX BAND ?
1015  045D  A1             GJMP    SR21            ;NORMAL BAND
1016  045E  78             RC                      ;WX BAND
1017  045F  248A           GJMP    SR3
1018  0461  33F9   SR21:   CALL    MFACC           ;MEMORY FLG ACCESS
1019  0463  3EAB           TDA                     ;
1020  0465  E0             CALT    BS1
1021  0466  5A             SKC                     ;
1022  0467  B9             GJMP    SR1             ;
1023  0468  E0             CALT    BS1                     ;
1024  0469  5A             SKC
1025  046A  B2             GJMP    SR2             ;
1026  046B  67             SKMBT   3
1027  046C  AF             GJMP    SR5             ;BIT3 IS 0
1028  046D  79             SC                      ;BIT3 IS 1
1029  046E  B0             GJMP    SR6
1030  046F  78     SR5:    RC
1031  0470  248A   SR6:    GJMP    SR3
1032  0472  65     SR2:    SKMBT   1
1033  0473  B6             GJMP    SR7             ;BIT1 IS 0
1034  0474  79             SC                      ;BIT1 IS 1
1035  0475  B7             GJMP    SR8
1036  0476  78     SR7:    RC
1037  0477  248A   SR8:    GJMP    SR3
1038  0479  E0     SR1:    CALT    BS1
1039  047A  5A             SKC
1040  047B  2484           GJMP    SR4             ;
1041  047D  66             SKMBT   2
1042  047E  2482           GJMP    SR9             ;BIT2 IS 0
1043  0480  79             SC                      ;BIT2 IS 1
1044  0481  83             GJMP    SR10
1045  0482  78     SR9:    RC
1046  0483  8A     SR10:   GJMP    SR3
1047  0484  64     SR4:    SKMBT   0
1048  0485  88             GJMP    SR11            ;BIT0 IS 0
1049  0486  79             SC                      ;BIT0 IS 1
1050  0487  89             GJMP    SR12
1051  0488  78     SR11:   RC
1052  0489  8A     SR12:   GJMP    SR3
1053  048A  53     SR3:    RT
1054                     ;----------------------------------------
1055                     ;       SCAN CHANNEL ADVANCE
1056                     ;----------------------------------------
1057  048B  4E32   ADSUBE: LHLI    DTNUM1
1058  048D  52             LAM     HL
1059  048E  01             AISC    1
1060  048F  98             GJMP    PB1             ;DTNUM1 NOT 0
1061  0490  78             RC
1062  0491  57             ST
1063  0492  4E33           LHLI    DTNUM2
1064  0494  52             LAM     HL
1065  0495  01             AISC    1
1066  0496  A9             GJMP    PB3             ;DTNUM2 NOT 0
1067  0497  A9             GJMP    PB3
1068  0498  57     PB1:    ST
1069  0499  4E32           LHLI    DTNUM1
1070  049B  51             LAM     HL+
1071  049C  3F6D           SKAEI   0DH
1072  049E  AB             GJMP    PB2             ;NOT 0DH
1073  049F  52     PB5:    LAM     HL
1074  04A0  3F63           SKAEI   3
1075  04A2  AA             GJMP    PB4             ;NOT 3
1076                     ;                       DTNUM1/2=39H(US) OR 3DH(INT)
1077  04A3  10             LAI     0
1078  04A4  4E32           LHLI    DTNUM1
1079  04A6  57             ST
1080  04A7  4E33           LHLI    DTNUM2
1081  04A9  57     PB3:    ST
```

```
1082 04AA 53          PB4:    RT
1083 04AB 4E3D        PB2:    LHLI    FLG6    ;CHK IFLG
1084 04AD 62                  SKMBF   2
1085 04AE AA                  GJMP    PB4     ;INT MODE
1086 04AF 58                  DLS
1087 04B0 4E32                LHLI    DTNUM1  ;USA MODE
1088 04B2 51                  LAM     HL+
1089 04B3 3F69                SKAEI   9
1090 04B5 AA                  GJMP    PB4     ;NOT 9
1091 04B6 9F                  GJMP    PB5     ; EQ 9
1092                  ;----------------------------------------
1093                  ;       CHANNEL UP SHIFT ROUTINE
1094                  ;----------------------------------------
1095 04B7 E4          UPSFT:  CALT    ADSUB
1096 04B8 4E3D                LHLI    FLG6    ;CHK INTFLG
1097 04BA 62                  SKMBF   2
1098 04BB 24CF                GJMP    NE1     ;INT MODE
1099 04BD 3833                LADR    DTNUM2  ;RESTORATION CHECK
1100 04BF 3F60                SKAEI   0
1101 04C1 91                  GJMP    NE2     ;NOT 0
1102 04C2 3832                LADR    DTNUM1
1103 04C4 3F60                SKAEI   0
1104 04C6 8F                  GJMP    NE1     ;NOT 0 (NO PROBLEM)
1105 04C7 1C                  LAI     0CH     ;DTNUM1/2=00
1106                                          ;SHIFT INTO WRN NODE
1107 04C8 4E33                LHLI    DTNUM2
1108 04CA 57                  ST
1109 04CB 11                  LAI     1
1110 04CC 4E32                LHLI    DTNUM1
1111 04CE 57                  ST
1112 04CF D5          NE1:    CALT    SBT6
1113 04D0 53          NE3:    RT
1114 04D1 00          NE2:    NOP
1115 04D2 3F6C                SKAEI   0CH
1116 04D4 8F                  GJMP    NE1     ;NOT 0
1117 04D5 3832                LADR    DTNUM1
1118 04D7 3F6A                SKAEI   0AH
1119 04D9 8F                  GJMP    NE1     ;NOT 0AH
1120 04DA 10                  LAI     0       ;DTNUM1/2=0CAH
1121                                          ;SHIFT INTO NRN NODE
1122 04DB 4E33                LHLI    DTNUM2
1123 04DD 57                  ST
1124 04DE 4E32                LHLI    DTNUM1
1125 04E0 57                  ST
1126 04E1 8F                  GJMP    NE1
1127                  ;----------------------------------------
1128                  ;       CHANNEL DOWN SHIFT ROUTINE
1129                  ;----------------------------------------
1130 04E2 4E32        DNSFT:  LHLI    DTNUM1
1131 04E4 52                  LAM     HL
1132 04E5 0F                  AISC    0FH     ;DEC ACC
1133 04E6 B5                  GJMP    NF2     ;DTNUM1 WAS 0
1134 04E7 3F60                SKAEI   0
1135 04E9 B1                  GJMP    NF5
1136 04EA 57                  ST
1137 04EB 3833                LADR    DTNUM2
1138 04ED 3F6C                SKAEI   0CH
1139 04EF B3                  GJMP    NF1
1140 04F0 BD                  GJMP    NF6
1141 04F1 78          NF5:    RC      ;
1142 04F2 57          NF4:    ST
1143 04F3 D5          NF1:    CALT    SBT6
1144 04F4 53                  RT
1145 04F5 57          NF2:    ST
1146 04F6 4E33                LHLI    DTNUM2
1147 04F8 52                  LAM     HL
1148 04F9 0F                  AISC    0FH     ;DEC ACC
1149 04FA 250F                GJMP    NF3     ;DTNUM1/2 WAS 00
1150                                          ;SHIFT INTO WRN NODE
1151 04FC B1                  GJMP    NF5
1152 04FD 13          NF6:    LAI     3       ;DTNUM1/2 IS 0C0H
```

```
1153                                              ;SHIFT INTO NRN
1154 04FE 4E33             LHLI    DTNUM2
1155 0500 57               ST
1156 0501 1C               LAI     0CH
1157 0502 4E32             LHLI    DTNUM1
1158 0504 57               ST
1159 0505 4E3D             LHLI    FLG6    ;INT FLG CHK
1160 0507 62               SKMBF   2
1161 0508 24F3             GJMP    NF1     ;INT MODE
1162 050A 18               LAI     8
1163 050B 4E32             LHLI    DTNUM1
1164 050D 24F2             GJMP    NF4
1165 050F 4E3D    NF3:     LHLI    FLG6    ;CHK INTFLG
1166 0511 62               SKMBF   2
1167 0512 24FD             GJMP    NF6
1168 0514 4E33             LHLI    DTNUM2
1169 0516 1C               LAI     0CH
1170 0517 57               ST
1171 0518 4E32             LHLI    DTNUM1
1172 051A 19               LAI     9
1173 051B 24F2             GJMP    NF4
1174                ;----------------------------------------
1175                ;      SEND TEST DATA OF PLL
1176                ;----------------------------------------
1177                ;SEND PLL WITH DISPLAY
1178 051D 3733    PLLTST:  CALL    OUT3
1179 051F 3536    PS2:     CALL    TIM1S   ;TIM1 100MSEC STARTS
1180 0521 353D             CALL    TIM2S   ;TIM2 150MSEC STARTS
1181 0523 3F90    PS1:     EI      0
1182 0525 4E39             LHLI    FLG2
1183 0527 64               SKMBT   0       ;TIM1  CHK
1184 0528 A3               GJMP    PS1     ;YET
1185 0529 53               RT              ;EXPIRED
1186                ;SEND PLL W/O DISPLAY
1187 052A 3738    PLTST2:  CALL    OUT5
1188 052C DD               CALT    CFLG3
1189 052D 6E               SMB     2       ;SURPRESS TIMER#0
1190 052E 9F               GJMP    PS2
1191                ;----------------------------------------
1192                ;       TIMER STARTER ROUTINES
1193                ;----------------------------------------
1194                ;TIMER#0-100MSEC-SPECIAL PURPOSE
1195 052F 4E26    TIM0S:   LHLI    TIM0
1196 0531 18               LAI     8
1197 0532 57               ST
1198 0533 DD               CALT    CFLG3
1199 0534 6A               RMB     2
1200 0535 53               RT
1201                ;TIMER#1-100MSEC
1202 0536 4E27    TIM1S:   LHLI    TIM1
1203 0538 18               LAI     8
1204 0539 57               ST
1205 053A DC               CALT    CFLG2
1206 053B 68               RMB     0
1207 053C 53               RT
1208                ;TIMER#2         150MSEC
1209 053D 4E28    TIM2S:   LHLI    TIM2
1210 053F 16               LAI     6
1211 0540 57               ST
1212 0541 DC               CALT    CFLG2
1213 0542 69               RMB     1
1214 0543 53               RT
1215                ;TIMER#4         12.8-25.6 MSEC
1216 0544 4E2A    TIM4S:   LHLI    TIM4
1217 0546 1E               LAI     0EH
1218 0547 57               ST
1219 0548 DC               CALT    CFLG2
1220 0549 6B               RMB     3
1221 054A 53               RT
1222                ;TIMER#5         500MSEC
1223 054B 4E2C    TIM5SE:  LHLI    TIM5A   ;UPR 4BITS
```

```
1224 054D 1D              LAI    0DH
1225 054E 57              ST
1226 054F 4E2B            LHLI   TIM5    ;LWR 4BITS
1227 0551 1A              LAI    0AH
1228 0552 57              ST
1229 0553 DD              CALT   CFLG3
1230 0554 68              RMB    0
1231 0555 53              RT
1232               ;TIMER#6         5000 MSEC
1233 0556 4E2F    TIM6SE: LHLI   TIM6B   ;UPR 4BITS
1234 0558 1E              LAI    0EH
1235 0559 57              ST
1236 055A 4E2E            LHLI   TIM6A   ;MIDDLE 4BITS
1237 055C 1E              LAI    0EH
1238 055D 57              ST
1239 055E 4E2D            LHLI   TIM6    ;LWR 4BITS
1240 0560 1A              LAI    0AH
1241 0561 57              ST
1242 0562 DD              CALT   CFLG3
1243 0563 69              RMB    1
1244 0564 53              RT
1245              ; MEMORY FLG CHECK
1246 0565 00      MCHK:   NOP
1247 0566 10              LAI    0H
1248 0567 4E3D            LHLI   FLG6
1249 0569 62              SKMBF  2H       ; USA?
1250 056A 01              AISC   1H
1251 056B 06              AISC   6H
1252 056C 3EBA            TAH
1253 056E 3E10            LLI    0H
1254 0570 51      LA37:   LAM    HL+
1255 0571 B6              GJMP   LA38
1256 0572 3F60            SKAEI  0H
1257 0574 BA              GJMP   LA39
1258 0575 BD              GJMP   LA40
1259 0576 3F60    LA38:   SKAEI  0H
1260 0578 BA              GJMP   LA39
1261 0579 B0              GJMP   LA37
1262 057A DE      LA39:   CALT   CFLG4
1263 057B 6D              SMB    1
1264 057C 53              RT
1265 057D DE      LA40:   CALT   CFLG4
1266 057E 69              RMB    1
1267 057F 53              RT
1268              ;----------------------
1269              ;           N-COMP
1270              ;----------------------
1271 0580 3F80    NCOMPE: DI     0H
1272 0582 3E9E            PSHHL
1273 0584 3E8E            PSHDE
1274 0586 3844            LADR   CHDT1           ; A<---CHDT1
1275 0588 3948            XADR   PLL1            ; A<--->PLL1
1276 058A 3845            LADR   CHDT2           ; A<---CHDT2
1277 058C 3949            XADR   PLL2            ; A<--->PLL2
1278 058E 3846            LADR   CHDT3           ; A<---CHDT3
1279 0590 394A            XADR   PLL3            ; A<--->PLL3
1280 0592 15              LAI    5H              ; A<---5H
1281 0593 394B            XADR   PLL4            ; A<---PLL4
1282 0595 383D            LADR   FLG6            ; A<---FLG6
1283 0597 76              SKABT  2H              ; A(BIT2)=1? 1=INT
W 1284 0598 25B9          JMP    LA3             ; JUMP LA3 IF USA
1285 059A 384E            LADR   CHFLG           ; A<---CHFLG
1286 059C 76              SKABT  2H              ; A(BIT2)=1? +2E0H
1287 059D 25C0            JMP    LA4             ; JUMP LA4 IF NE=0
1288 059F 78      LA2:    RC                     ; C<---0
1289 05A0 4E48            LHLI   PLL1            ; HL<---PLL1
1290 05A2 10              LAI    0H              ; A<---0H
1291 05A3 3762            CALL   SB11
1292 05A5 4E49            LHLI   PLL2            ; HL<---PLL2
1293 05A7 1E              LAI    0EH             ; A<---0EH
1294 05A8 3762            CALL   SB11
```

```
1295 05AA 4E4A           LHLI   PLL3        ; HL<---PLL3
1296 05AC 12             LAI    2H          ; A<---2H
1297 05AD 3762           CALL   SB11
1298 05AF 4E4B           LHLI   PLL4        ; HL<---PLL4
1299 05B1 10             LAI    0H          ; A<---0
1300 05B2 7C             ACSC               ; A,C<--C+(HL)+A
1301 05B3 57             ST                 ; (HL)<---A
1302 05B4 4E4C           LHLI   SHFLG       ; HL<---SHFLG
1303 05B6 6C             SMB    0H          ; (HL)BIT0<---1
1304 05B7 25C3           GJMP   LA5         ; JUMP LA5
1305 05B9 384E   LA3:    LADR   CHFLG       ; A<---CHFLG
1306 05BB 77             SKABT  3H          ; A(BIT3)=1?+2E0H
1307 05BC 25C0           GJMP   LA4         ; JUMP LA4 IF NF=0
W 1308 05BE 259F           JMP    LA2         ; JUMP LA2 IF NF=1
1309 05C0 4E4C   LA4:    LHLI   SHFLG       ; HL<---SHFLG
1310 05C2 68             RMB    0H          ; SHFLG RST
1311 05C3 3E8F   LA5:    POPDE
1312 05C5 3E9F           POPHL
1313 05C7 3F90           EI     0H
1314 05C9 43             RTPSW
1315                ;----------------------------------------
1316                ;     DOT FLG CONTROLER
1317                ;----------------------------------------
1318 05CA 3459   DOTCON: CALL   CCHK
1319 05CC 5A             SKC
1320 05CD 92             GJMP   NL1         ;NOT SELECTED CH
1321 05CE 4EAE           LHLI   IND1
1322 05D0 6E             SMB    2           ;DOT ON
1323 05D1 95             GJMP   NL2
1324 05D2 4EAE   NL1:    LHLI   IND1
1325 05D4 6A             RMB    2           ;DOT OFF
1326 05D5 53     NL2:    RT
1327                ;----------------------------------------
1328                ;     BIPASS ROUTINE FOR DWN RECEIVE LOCAL NODE
1329                ;----------------------------------------
1330 05D6 383E   BPS1:   LADR   IVEC        ;CHK INPUT VECTER
1331 05D8 3F65           SKAEI  5           ;
1332 05DA 9C             GJMP   NA61        ;NO
1333 05DB A2             GJMP   NA6         ;ENTRY
1334 05DC 3F6B   NA61:   SKAEI  0BH         ;
1335 05DE A0             GJMP   NA64        ;NO
1336 05DF A2             GJMP   NA6         ;ENTRY
1337 05E0 78     NA64:   RC                 ;NO ENTRY
1338 05E1 A3             GJMP   NA65
1339 05E2 79     NA6:    SC                 ;ENTRY OF EFFECTIVE KEYS
1340 05E3 53     NA65:   RT
1341                ;----------------------------------------
1342                ;     EPIRB FLG CONTROL
1343                ;----------------------------------------
1344 05E4 3FC1   EFLGC:  IP     PORT1
1345 05E6 75             SKABT  1           ;CHK EPIRB SW
1346 05E7 B8             GJMP   NM11        ;EPIRB SW OFF
1347 05E8 76             SKABT  2           ;EPIRB SW ON THEN CHK SQ
1348 05E9 B7             GJMP   NM12        ;SQ OFF THEN DONT CARE
1349 05EA 77             SKABT  3           ;SQ ON THEN CHK EPIRB SIG
1350 05EB B7             GJMP   NM12        ;EPIRB OFF THEN DONT CARE
1351 05EC DF             CALT   CFLG6       ;EPIRB SIG IS ON
1352 05ED 60             SKMBF  0
1353 05EE B7             GJMP   NM12        ;EFLG ALREADY ON
1354 05EF 6C             SMB    0           ;THEN SET EFLG
1355 05F0 DB             CALT   KFLG0
1356 05F1 10             LAI    0
1357 05F2 D1             CALT   CHNV        ;NODE >> NRN
1358 05F3 4E3E           LHLI   IVEC
1359 05F5 10             LAI    0           ;VIRTUAL KEY ENTRY
1360 05F6 57             ST
1361 05F7 53     NM12:   RT
1362 05F8 DF     NM11:   CALT   CFLG6
1363 05F9 64             SKMBT  0           ;CHK EFLG
1364 05FA B7             GJMP   NM12        ;EFLG IS OFF
1365 05FB 68             RMB    0           ;CLR EFLG
```

```
1366 05FC DB                CALT    KFLG0       ;SET KFLG
1367 05FD 4E3E              LHLI    IVEC
1368 05FF 13                LAI     3           ;DUMMY DATA
1369 0600 57                ST
1370 0601 25F7              GJMP    NM12
1371                  ;----------------------------------------
1372 0603 DF        IFLG0:  CALT    CFLG6
1373 0604 6E                SMB     2
1374 0605 53                RT
1375                  ;----------------------------------------
1376                  ;     DIRECTION DATA MEMORY
1377                  ;----------------------------------------
1378 0606 4E9A       DRMEM:  LHLI    SWF
1379 0608 52                LAM     HL
1380 0609 4E90              LHLI    DDM11       ;INIT.STORE LOCATION
1381 060B 4F80              LDEI    DCH11
1382 060D 3FB3              RAR
1383 060F 5A                SKC
1384 0610 92                GJMP    NM33
1385 0611 9F                GJMP    NM34        ;M1 IS SELECTED
1386 0612 EC        NM33:   CALT    INCLE
1387 0613 3FB3              RAR
1388 0615 5A                SKC
1389 0616 98                GJMP    NM32
1390 0617 9F                GJMP    NM34        ;M2 IS SELECTED
1391 0618 EC        NM32:   CALT    INCLE
1392 0619 3FB3              RAR
1393 061B 5A                SKC
1394 061C 9E                GJMP    NM31
1395 061D 9F                GJMP    NM34        ;M3 IS SELECTED
1396 061E 53        NM31:   RT                  ;NO SELECTION
1397 061F 388D      NM34:   LADR    DD1
1398 0621 57                ST                  ;STORE LO DIGIT
1399 0622 59                ILS
1400 0623 388E              LADR    DD2
1401 0625 57                ST                  ;STORE MID DIGIT
1402 0626 59                ILS
1403 0627 388F              LADR    DD3
1404 0629 57                ST                  ;STORE HI DIGIT
1405 062A 4B                XAE                 ;E <--> L
1406 062B 7B                XAL
1407 062C 4A                XAD                 ;D --> H
1408 062D 7A                XAH
1409 062E 3820              LADR    CHN1        ;CH# LO
1410 0630 57                ST
1411 0631 59                ILS
1412 0632 3821              LADR    CHN2        ;CH# HI
1413 0634 57                ST
1414 0635 389A              LADR    SWF
1415 0637 4E99              LHLI    DMF
1416 0639 3FB6              ORL
1417 063B 57                ST                  ;DMF UPDATE
1418 063C 9E                GJMP    NM31
1419                  ;----------------------------------------
1420                  ;     DIRECTION DATA SWAP
1421                  ;----------------------------------------
1422 063D 4E99      SWAP:   LHLI    DMF
1423 063F 17                LAI     7
1424 0640 3FB2              ANL                 ;CLR MSB
1425 0642 4E9A              LHLI    SWF
1426 0644 3FB2              ANL                 ;CHK COINCIDENCE
1427 0646 3F60              SKAEI   0
1428 0648 8A                GJMP    NM40        ;MEMORY THERE
1429 0649 A2                GJMP    NM41        ;MEMORY NOT THERE
1430 064A 4E9A      NM40:   LHLI    SWF
1431 064C 52                LAM     HL
1432 064D 4E90              LHLI    DDM11       ;SWAP ADDR INITIALIZE
1433 064F 4F80              LDEI    DCH11       ;CH MEM ADDR
1434 0651 3FB3              RAR
1435 0653 5A                SKC
1436 0654 96                GJMP    NM43
```

```
1437 0655 A3              GJMP    NM44    ;M1 IS SELECTED
1438 0656 EC      NM43:   CALT    INCLE
1439 0657 3FB3            RAR
1440 0659 5A              SKC
1441 065A 9C              GJMP    NM42
1442 065B A3              GJMP    NM44    ;M2 IS SELECTED
1443 065C EC      NM42:   CALT    INCLE
1444 065D 3FB3            RAR
1445 065F 5A              SKC
1446 0660 A2              GJMP    NM41
1447 0661 A3              GJMP    NM44    ;M3 IS SELECTED
1448 0662 53      NM41:   RT              ;NO SELECTION
1449 0663 388D    NM44:   LADR    DD1
1450 0665 56              XAM     HL
1451 0666 3E9E            PSHHL
1452 0668 4E8D            LHLI    DD1
1453 066A 57              ST              ;LO DIGIT SWAPPED
1454 066B 3E9F            POPHL
1455 066D 59              ILS
1456 066E 388E            LADR    DD2
1457 0670 56              XAM     HL
1458 0671 3E9E            PSHHL
1459 0673 4E8E            LHLI    DD2
1460 0675 57              ST              ;MID DIGIT SWAPPED
1461 0676 3E9F            POPHL
1462 0678 59              ILS
1463 0679 388F            LADR    DD3
1464 067B 56              XAM     HL
1465 067C 3E9E            PSHHL
1466 067E 4E8F            LHLI    DD3
1467 0680 57              ST              ;HI DIGIT SWAPPED
1468 0681 3E9F            POPHL
1469 0683 3820            LADR    CHN1
1470 0685 45              XAM     DE      ;SWAP CH LO
1471 0686 4E20            LHLI    CHN1
1472 0688 57              ST
1473 0689 3821            LADR    CHN2
1474 068B 49              IES
1475 068C 45              XAM     DE      ;SWAP CH HI
1476 068D 4E21            LHLI    CHN2
1477 068F 57              ST
1478 0690 4E9A            LHLI    SWF
1479              ;
1480 0692 63              SKMBF   3       ;CHK MSB OF SWF
1481 0693 9A              GJMP    NM45
1482 0694 18              LAI     8
1483 0695 3FB6            ORL             ;SET MSB OF SWF
1484 0697 57              ST
1485 0698 2662            GJMP    NM41
1486 069A 17      NM45:   LAI     7
1487 069B 3FB2            ANL             ;RESET MSB OF SWF
1488 069D 57              ST
1489 069E 2662            GJMP    NM41
1490              ;------------------------------------
1491              ;       ADF DATA INTAKE
1492              ;------------------------------------
1493 06A0 4E9A    ADF:    LHLI    SWF
1494 06A2 63              SKMBF   3
1495 06A3 26C8            GJMP    NM71    ;UNDER SWAPPING
1496 06A5 3F44            SKI     4       ;SKIP IF INT1RQ IS THERE
1497 06A7 AA              GJMP    NM72    ;NO REQUEST
1498 06A8 30BE            CALL    SUBSEL  ;SELECTION HANDLER
1499 06AA 3FC7    NM72:   IP      7
1500 06AC 4E8A            LHLI    DDZ1
1501 06AE 57              ST              ;LO DIGIT
1502 06AF 3FC5            IP      5
1503 06B1 4E8B            LHLI    DDZ2
1504 06B3 57              ST              ;MID DIGIT
1505 06B4 3FC6            IP      6
1506 06B6 4E8C            LHLI    DDZ3
1507 06B8 57              ST
1508 06B9 13              LAI     3
```

```
1509 06BA 3FB2              ANL                    ;SURPRESS UPR 2DIGITS
1510 06BC 57                ST                     ;HI DIGIT
1511 06BD 32B8              CALL    DRCOMP         ;DERIVE DD1-3
1512 06BF 3342              CALL    DROUND         ;DERIVE DDR2-3
1513 06C1 EA                CALT    ADISP          ;DIAL DISPLAY
1514 06C2 3F44              SKI     4              ;CHK INT1 RQ FLG
1515 06C4 87                GJMP    NM73           ;NO REQUEST
1516 06C5 30BE              CALL    SUBSEL
1517 06C7 E9       NM73:    CALT    DDISP          ;DIRECTION DATA DISPLAY
1518 06C8 53       NM71:    RT
1519                ;----------------------------------
1520                ;       DIAL DOT ADDR ON RAM
1521                ;----------------------------------
1522                ;INPUT-DDR2/3
1523                ;OUTPUT-WORK5(RAM ADDR OFST)
1524                ;       FLG5 (TARGET BITMAP)
1525 06C9 3888     DADR:    LADR    DDR2
1526 06CB E3                CALT    BS4
1527 06CC 3889              LADR    DDR3
1528 06CE E3                CALT    BS4
1529                ;
1530 06CF 76                SKABT   2
1531 06D0 9D                GJMP    NQ11           ;0-19
1532 06D1 75                SKABT   1              ;20-35
1533 06D2 9A                GJMP    NQ12           ;20-29
1534 06D3 371B              CALL    CMPLMT         ;30-35
1535 06D5 0A                AISC    0AH
1536 06D6 00                NOP
1537 06D7 7E       NQ23:    EXL
1538 06D8 270C              GJMP    BTST2
1539 06DA 371B     NQ12:    CALL    CMPLMT
1540 06DC 97                GJMP    NQ23
1541 06DD 3F63     NQ11:    SKAEI   3
1542 06DF B2                GJMP    NQ14           ;0-17
1543 06E0 4E54              LHLI    WORK5
1544 06E2 18                LAI     8H
1545 06E3 57                ST
1546 06E4 3888              LADR    DDR2           ;18-19
1547 06E6 74                SKABT   0
1548 06E7 AD                GJMP    NQ31
1549 06E8 4E3C              LHLI    FLG5
1550 06EA 12                LAI     2
1551 06EB 57                ST
1552 06EC 53                RT                     ; 19
1553 06ED 4E3C     NQ31:    LHLI    FLG5
1554 06EF 18                LAI     8
1555 06F0 57                ST
1556 06F1 53                RT                     ; 18
1557 06F2 75       NQ14:    SKABT   1
1558 06F3 B9                GJMP    NQ16           ;0-9
1559 06F4 3888              LADR    DDR2           ;10-17
1560 06F6 0A                AISC    0AH
1561 06F7 BD                GJMP    BTST1
1562 06F8 BC                GJMP    BTST3
1563 06F9 3888     NQ16:    LADR    DDR2
1564 06FB BD                GJMP    BTST1
1565                ;
1566 06FC 79       BTST3:   SC
1567 06FD 3FB3     BTST1:   RAR
1568 06FF 4B                XAE
1569 0700 5A                SKC
1570 0701 87                GJMP    NS21
1571 0702 4E3C              LHLI    FLG5
1572 0704 14                LAI     4
1573 0705 57                ST
1574 0706 8B                GJMP    NS22
1575 0707 4E3C     NS21:    LHLI    FLG5
1576 0709 11                LAI     1
1577 070A 57                ST
1578 070B A2       NS22:    GJMP    ADSET
1579                ;
```

```
1580 070C 3FB3     BTST2:  RAR
1581 070E 4B               XAE
1582 070F 5A               SKC
1583 0710 96               GJMP    NS31
1584 0711 4E3C             LHLI    FLG5
1585 0713 18               LAI     8
1586 0714 57               ST
1587 0715 9A               GJMP    NS32
1588 0716 4E3C     NS31:   LHLI    FLG5
1589 0718 12               LAI     2
1590 0719 57               ST
1591 071A A2       NS32:   GJMP    ADSET
1592                       ;
1593 071B 4E54     CMPLMT: LHLI    WORK5
1594 071D 1F               LAI     0FH
1595 071E 57               ST
1596 071F 3888             LADR    DDR2
1597 0721 53               RT
1598                       ;
1599 0722 4B       ADSET:  XAE
1600 0723 4E54             LHLI    WORK5
1601 0725 57               ST
1602 0726 53               RT
1603                       ;
1604 0727 F0       DELAY:  CALT    DPSIO
1605 0728 3F90             EI      0H
1606 072A F5               CALT    TIM5S
1607 072B 3F90     ME7:    EI      0
1608 072D DD               CALT    CFLG3
1609 072E 60               SKMBF   0
1610 072F B1               GJMP    ME6
1611 0730 AB               GJMP    ME7
1612 0731 53       ME6:    RT
1613                       ;------------------------------------
1614                       ;   OUTPUT UTILITY ROUTINE
1615                       ;------------------------------------
1616 0732 D2       OUT2:   CALT    BUZZR   ;BZR+CHDAT+PLL+DISPLAY
1617 0733 E5       OUT3:   CALT    CHDAT   ;      :  + :  + :
1618 0734 E7       OUT4:   CALT    NCOMP   ;         :  + :
1619 0735 E8               CALT    NOUT
1620 0736 E6               CALT    CHDISP
1621 0737 53               RT
1622 0738 E5       OUT5:   CALT    CHDAT
1623 0739 E7       OUT6:   CALT    NCOMP
1624 073A E8               CALT    NOUT
1625 073B 53               RT
1626                       ;------------------------------------
1627                       ;   SPACE SAVING ROUTINES
1628                       ;------------------------------------
1629 073C 3832     SB3:    LADR    DTNUM1
1630 073E 57               ST
1631 073F 3833             LADR    DTNUM2
1632 0741 53               RT
1633 0742 31DF     SB4:    CALL    LA9
1634 0744 394E             XADR    CHFLG
1635 0746 56               XAM     HL
1636 0747 3946             XADR    CHDT3
1637 0749 53               RT
1638 074A 3921     SB5:    XADR    CHN2
1639 074C 56               XAM     HL
1640 074D 3920             XADR    CHN1
1641 074F 53               RT
1642 0750 4E3E     SB6:    LHLI    IVEC
1643 0752 10               LAI     0
1644 0753 57               ST
1645 0754 53               RT
1646 0755 0F       SB7:    AISC    0FH     ;DECREMENT ACC
1647 0756 00               NOP             ;PASS SKIP
1648 0757 4E55             LHLI    WORK11
1649 0759 57               ST
1650 075A 53               RT
```

```
1651 0758 3FE3      SB9E:    OP      KSPB
1652 075D 3FC4               IP      KOP      ;INPUT FROM KEYBOARD
1653 075F 53                 RT
1654 0760 D1        SB10E:   CALT    CHNV
1655 0761 53                 RT
1656 0762 7C        SB11:    ACSC
1657 0763 00                 NOP
1658 0764 57                 ST
1659 0765 53                 RT
1660                ;----------------------------------------------------
1661                ;         7225G DISPLAY TENSO ROUTINE
1662                ;----------------------------------------------------
1663 0766 3E9E      DPSIOE:  PSHHL
1664 0768 3E8E               PSHDE
1665 076A 4D46               ORP     6,4H     ;C/D=1
1666 076C 4C52               ANP     2,5H     ;CS=0
1667 076E 3F80               DI      0H
1668 0770 379E               CALL    LA50     ;BUSY CHECK
1669 0772 1E                 LAI     0EH
1670 0773 4E50               LHLI    WORK1
1671 0775 57                 ST               ;WORK1<--0EH
1672 0776 15                 LAI     5H
1673 0777 EE                 CALT    DCSSB
1674 0778 10                 LAI     0H
1675 0779 57                 ST               ;WORK1<--0
1676 077A 13                 LAI     3H
1677 077B EE                 CALT    DCSSB
1678 077C 14                 LAI     4H
1679 077D 57                 ST
1680 077E 11                 LAI     1H
1681 077F EE                 CALT    DCSSB
1682 0780 4CB6               ANP     6,0BH    ;C/D=0
1683 0782 4EA0               LHLI    0A0H
1684 0784 4FA0               LDEI    0A0H
1685 0786 49                 IES
1686 0787 41                 LAM     DE
1687 0788 EE                 CALT    DCSSB
1688 0789 37AC      LA67:    CALL    LA54     ;DATA TENSO(2-8)
1689 078B 379E               CALL    LA50     ;BUSY CHECK
1690 078D 3E5E               SKLEI   0EH      ;L=0EH?
1691 078F 89                 GJMP    LA67
1692 0790 4D46               ORP     6,4H     ;C/D=1
1693 0792 11                 LAI     1H
1694 0793 4E50               LHLI    WORK1
1695 0795 57                 ST               ;WORK1<--1
1696 0796 EE                 CALT    DCSSB
1697 0797 4D22               ORP     2,2H     ;CS=1
1698 0799 3E8F               POPDE
1699 079B 3E9F               POPHL
1700 079D 53                 RT
1701 079E 1E        LA50:    LAI     0EH      ;DUMMY WAIT
1702 079F 01        LA51:    AISC    1H
1703 07A0 9F                 GJMP    LA51
1704 07A1 18        LA52:    LAI     8H
1705 07A2 3FEF               OP      0FH      ;SFT MODE SET
1706 07A4 3FC0      LA53:    IP      0H
1707 07A6 77                 SKABT   3H       ;BUSY?
1708 07A7 A4                 GJMP    LA53     ;YES
1709 07A8 1E                 LAI     0EH      ;NO
1710 07A9 3FEF               OP      0FH      ;SFT MODE SET
1711 07AB 53                 RT
1712 07AC ED        LA54:    CALT    INCLEA
1713 07AD 41                 LAM     DE
1714 07AE 3F3E               TAMSIO           ;SI DATA SET
1715 07B0 3F33               SIO              ;START SIO
1716 07B2 53                 RT
1717 07B3 2A0A      LA55:    GJMP    LA56
1718 07B5 53        LA57:    RT
1719                ;
```

```
1720 07B6 3F80      FLASH:   DI      0
1721 07B8 32AC               CALL    DSET
1722 07BA 3727               CALL    DELAY
1723 07BC F6                 CALT    DCLR
1724 07BD 3727               CALL    DELAY
1725 07BF 53                 RT
1726                ;
1727 07C0 3899      DMFRST:  LADR    DMF
1728 07C2 4E9D               LHLI    DMFS
1729 07C4 7F                 CMA              ;COMP(DMF)-->ACC
1730 07C5 7D                 ASC
1731 07C6 90                 GJMP    MF1      ;DMF>DMFS
1732 07C7 78                 RC
1733                ;
1734 07C8 3899      MEMFLS:  LADR    DMF
1735 07CA 4E9D               LHLI    DMFS     ;DMF<DMFS
1736 07CC 56                 XAM     HL
1737 07CD 4E99               LHLI    DMF
1738 07CF 57                 ST
1739 07D0 53        MF1:     RT
1740                ;----------------------------------
1741                ;    BUZZAR CONTROL ROUTINES
1742                ;----------------------------------
1743 07D1 4D42      BUZZR2:  ORP     2,4H
1744 07D3 F5                 CALT    TIM5S    ;.5SEC TIMER ON
1745 07D4 53                 RT
1746 07D5 37D9      BUZZR3:  CALL    BUZSTP   ;BUZZAR OFF
1747 07D7 F5                 CALT    TIM5S    ;.5SEC TIMER ON
1748 07D8 53                 RT
1749 07D9 4CB2      BUZSTP:  ANP     2,0BH    ;BUZZAR OFF
1750 07DB 53                 RT
1751                ;----------------------------------
1752                ;    CHANNEL DATA TABLE
1753                ;----------------------------------
1754      0800               ORG     800H
1755 0800 F8                 DB      0F8H
1756 0801 00                 DB      0H
1757 0802 08                 DB      08H
1758 0803 10                 DB      10H
1759 0804 18                 DB      18H
1760 0805 20                 DB      20H
1761 0806 28                 DB      28H
1762 0807 30                 DB      30H
1763 0808 38                 DB      38H
1764 0809 40                 DB      40H
1765 080A 48                 DB      48H
1766 080B 50                 DB      50H
1767 080C 58                 DB      58H
1768 080D 60                 DB      60H
1769 080E 68                 DB      68H
1770 080F 70                 DB      70H
1771 0810 78                 DB      78H
1772 0811 80                 DB      80H
1773 0812 88                 DB      88H
1774 0813 90                 DB      90H
1775 0814 98                 DB      98H
1776 0815 A0                 DB      0A0H
1777 0816 A8                 DB      0A8H
1778 0817 B0                 DB      0B0H
1779 0818 B8                 DB      0B8H
1780 0819 C0                 DB      0C0H
1781 081A C8                 DB      0C8H
1782 081B D0                 DB      0D0H
1783 081C F4                 DB      0F4H
1784 081D FC                 DB      0FCH
1785 081E 04                 DB      04H
1786 081F 0C                 DB      0CH
1787 0820 14                 DB      14H
1788 0821 1C                 DB      1CH
1789 0822 24                 DB      24H
1790 0823 2C                 DB      2CH
```

```
1791 0824 34            DB      34H
1792 0825 3C            DB      3CH
1793 0826 44            DB      44H
1794 0827 4C            DB      4CH
1795 0828 54            DB      54H
1796 0829 5C            DB      5CH
1797 082A 64            DB      64H
1798 082B 6C            DB      6CH
1799 082C 74            DB      74H
1800 082D 7C            DB      7CH
1801 082E 84            DB      84H
1802 082F 8C            DB      8CH
1803 0830 94            DB      94H
1804 0831 9C            DB      9CH
1805 0832 A4            DB      0A4H
1806 0833 AC            DB      0ACH
1807 0834 B4            DB      0B4H
1808 0835 BC            DB      0BCH
1809 0836 C4            DB      0C4H
1810 0837 CC            DB      0CCH
1811 0838 D4            DB      0D4H
1812 0839 F4            DB      0F4H
1813 083A FC            DB      0FCH
1814 083B 04            DB      04H
1815 083C 14            DB      14H
1816 083D 70            DB      70H
1817 083E 70            DB      70H
1818 083F 70            DB      70H
1819                    ;
1820           0840     ORG     840H
1821 0840 46            DB      46H
1822 0841 47            DB      47H
1823 0842 47            DB      47H
1824 0843 47            DB      47H
1825 0844 47            DB      47H
1826 0845 07            DB      7H
1827 0846 47            DB      47H
1828 0847 07            DB      7H
1829 0848 07            DB      7H
1830 0849 07            DB      7H
1831 084A 07            DB      7H
1832 084B 07            DB      7H
1833 084C 07            DB      7H
1834 084D 07            DB      7H
1835 084E 27            DB      27H
1836 084F 07            DB      7H
1837 0850 07            DB      7H
1838 0851 47            DB      47H
1839 0852 47            DB      47H
1840 0853 C7            DB      0C7H
1841 0854 47            DB      47H
1842 0855 47            DB      47H
1843 0856 47            DB      47H
1844 0857 C7            DB      0C7H
1845 0858 C7            DB      0C7H
1846 0859 C7            DB      0C7H
1847 085A C7            DB      0C7H
1848 085B C7            DB      0C7H
1849 085C C6            DB      0C6H
1850 085D C6            DB      0C6H
1851 085E C7            DB      0C7H
1852 085F 47            DB      47H
1853 0860 C7            DB      0C7H
1854 0861 47            DB      47H
1855 0862 47            DB      47H
1856 0863 07            DB      7H
1857 0864 07            DB      7H
1858 0865 07            DB      7H
1859 0866 07            DB      7H
1860 0867 07            DB      7H
1861 0868 07            DB      7H
```

| | | | | | |
|---|---|---|---|---|---|
|1862|0869|07| |DB|7H|
|1863|086A|07| |DB|7H|
|1864|086B|27| |DB|27H|
|1865|086C|27| |DB|27H|
|1866|086D|07| |DB|7H|
|1867|086E|47| |DB|47H|
|1868|086F|47| |DB|47H|
|1869|0870|47| |DB|47H|
|1870|0871|47| |DB|47H|
|1871|0872|47| |DB|47H|
|1872|0873|47| |DB|47H|
|1873|0874|C7| |DB|0C7H|
|1874|0875|C7| |DB|0C7H|
|1875|0876|C7| |DB|0C7H|
|1876|0877|C7| |DB|0C7H|
|1877|0878|47| |DB|47H|
|1878|0879|16| |DB|16H|
|1879|087A|16| |DB|16H|
|1880|087B|17| |DB|17H|
|1881|087C|17| |DB|17H|
|1882|087D|07| |DB|7H|
|1883|087E|07| |DB|7H|
|1884|087F|07| |DB|7H|
|1885| | |;| | |
|1886| |0880| |ORG|880H|
|1887|0880|01| |DB|01H|
|1888|0881|02| |DB|02H|
|1889|0882|03| |DB|03H|
|1890|0883|04| |DB|04H|
|1891|0884|05| |DB|05H|
|1892|0885|06| |DB|06H|
|1893|0886|07| |DB|07H|
|1894|0887|08| |DB|08H|
|1895|0888|09| |DB|09H|
|1896|0889|10| |DB|10H|
|1897|088A|11| |DB|11H|
|1898|088B|12| |DB|12H|
|1899|088C|13| |DB|13H|
|1900|088D|14| |DB|14H|
|1901|088E|15| |DB|15H|
|1902|088F|16| |DB|16H|
|1903|0890|17| |DB|17H|
|1904|0891|18| |DB|18H|
|1905|0892|19| |DB|19H|
|1906|0893|20| |DB|20H|
|1907|0894|21| |DB|21H|
|1908|0895|22| |DB|22H|
|1909|0896|23| |DB|23H|
|1910|0897|24| |DB|24H|
|1911|0898|25| |DB|25H|
|1912|0899|26| |DB|26H|
|1913|089A|27| |DB|27H|
|1914|089B|28| |DB|28H|
|1915|089C|60| |DB|60H|
|1916|089D|61| |DB|61H|
|1917|089E|62| |DB|62H|
|1918|089F|63| |DB|63H|
|1919|08A0|64| |DB|64H|
|1920|08A1|65| |DB|65H|
|1921|08A2|66| |DB|66H|
|1922|08A3|67| |DB|67H|
|1923|08A4|68| |DB|68H|
|1924|08A5|69| |DB|69H|
|1925|08A6|70| |DB|70H|
|1926|08A7|71| |DB|71H|
|1927|08A8|72| |DB|72H|
|1928|08A9|73| |DB|73H|
|1929|08AA|74| |DB|74H|
|1930|08AB|75| |DB|75H|
|1931|08AC|76| |DB|76H|
|1932|08AD|77| |DB|77H|

```
1933  08AE  78              DB      78H
1934  08AF  79              DB      79H
1935  08B0  80              DB      80H
1936  08B1  81              DB      81H
1937  08B2  82              DB      82H
1938  08B3  83              DB      83H
1939  08B4  84              DB      84H
1940  08B5  85              DB      85H
1941  08B6  86              DB      86H
1942  08B7  87              DB      87H
1943  08B8  88              DB      88H
1944  08B9  89              DB      89H
1945  08BA  90              DB      90H
1946  08BB  91              DB      91H
1947  08BC  92              DB      92H
1948  08BD  FF              DB      0FFH
1949  08BE  FF              DB      0FFH
1950  08BF  FF              DB      0FFH
1951                 ;------------------------------------
1952                 ;     WX CHANNEL DATA TABLE
1953                 ;------------------------------------
1954        08C0            ORG     8C0H
1955                 ;
1956  08C0  28              DB      28H     ; DUMMY
1957  08C1  28              DB      28H
1958  08C2  10              DB      10H
1959  08C3  1C              DB      1CH
1960  08C4  98              DB      98H
1961  08C5  14              DB      14H
1962  08C6  18              DB      18H
1963  08C7  20              DB      20H
1964  08C8  24              DB      24H
1965  08C9  AC              DB      0ACH
1966  08CA  A5              DB      0A5H
1967  08CB  AE              DB      0AEH
1968  08CC  AE              DB      0AEH
1969  08CD  AE              DB      0AEH
1970  08CE  AE              DB      0AEH
1971  08CF  AE              DB      0AEH
1972        08D0            ORG     8D0H
1973                 ;
1974  08D0  E8              DB      0E8H    ; DUMMY
1975  08D1  E8              DB      0E8H
1976  08D2  E8              DB      0E8H
1977  08D3  E8              DB      0E8H
1978  08D4  E7              DB      0E7H
1979  08D5  E8              DB      0E8H
1980  08D6  E8              DB      0E8H
1981  08D7  E8              DB      0E8H
1982  08D8  E8              DB      0E8H
1983  08D9  E7              DB      0E7H
1984  08DA  E8              DB      0E8H
1985  08DB  E8              DB      0E8H
1986  08DC  E8              DB      0E8H
1987  08DD  E8              DB      0E8H
1988  08DE  E8              DB      0E8H
1989  08DF  E8              DB      0E8H
1990                 ;
1991        08E0            ORG     8E0H
1992  08E0  FF              DB      0FFH    ; DUMMY
1993  08E1  F1              DB      0F1H
1994  08E2  F2              DB      0F2H
1995  08E3  F3              DB      0F3H
1996  08E4  F4              DB      0F4H
1997  08E5  F5              DB      0F5H
1998  08E6  F6              DB      0F6H
1999  08E7  F7              DB      0F7H
2000  08E8  F8              DB      0F8H
2001  08E9  F9              DB      0F9H
2002  08EA  FF              DB      0FFH
2003  08EB  FF              DB      0FFH
```

```
2004 08EC FF                     DB      0FFH
2005 08ED FF                     DB      0FFH
2006 08EE FF                     DB      0FFH
2007 08EF FF                     DB      0FFH
2008                     ;-----------------------
2009                     ;
2010    .                ;       LOAD A AND MEMORY WITH TABLE DATA
2011                     ;-----------------------
2012           08F0              ORG     8F0H
2013 08F0 3F34  LA32:    LAMTL
2014 08F2 21E1           JMP     LA11
2015                     ;-----------------------------------------
2016                     ;
2017                     ;       BRANCH LIST OF NODE/SUBNODE BRANCH
2018                     ;-----------------------------------------
2019           0900              ORG     900H
2020                     ;BRANCH LIST FOR NODE-VECTOR BRANCH (BR0)
2021 0900 2E0A  JT0:     JMP     NRN     ;N-CH RECEIVE NODE
2022 0902 2E17           JMP     WRN     ;WX-CH RECEIVE NODE
2023 0904 2E24           JMP     ARN     ;A-CH RECEIVE NODE
2024 0906 2E3E           JMP     SRN     ;S-CH RECEIVE NODE
2025 0908 2E60           JMP     PRN     ;16-CH RECEIVE NODE UNDR DUAL WA
CH
2026 090A 2E8A           JMP     DWN     ;DUAL WATCH NODE
2027 090C 2F0F           JMP     ASN     ;A-CH SCAN NODE
2028 090E 2F32           JMP     SSN     ;S-CH SCAN NODE
2029                     ;-----------------------------------------
2030                     ;BRANCH LIST FOR NRN BRANCH (BR1)
2031 0910 2C3A  JT1:     JMP     NUMK1   ;NUMERIC KEY ENTRY
2032 0912 2C41           JMP     CANK1   ;ADF-CANCEL
2033 0914 2C44           JMP     SSK1    ;SS-KEY ENTRY
2034 0916 2E16           JMP     R1      ;NONE
2035 0918 2C93           JMP     MDK1    ;MEM/DEL KEY ENTRY
2036 091A 2C51           JMP     PK1     ;16-KEY ENTRY
2037 091C 2C5B           JMP     ASK1    ;AS-KEY ENTRY
2038 091E 2C9E           JMP     DRMK1   ;ADF-DIRECTION MEM
2039 0920 2CDE  JT1X:    JMP     M1K1    ;ADF-MEM1 KEY
2040 0922 2CE0           JMP     M2K1    ;ADF-MEM2 KEY
2041 0924 2CE2           JMP     M3K1    ;ADF-MEM3 KEY
2042 0926 2C88           JMP     MONK1   ;MON-KEY ENTRY
2043 0928 2C63           JMP     INTK1   ;INT-KEY ENTRY
2044 092A 2E16           JMP     R1      ;NONE
2045 092C 2E16           JMP     R1      ;NONE
2046 092E 2E16           JMP     R1      ;NONE
2047                     ;BRANCH LIST FOR WRN BRANCH (BR2)
2048 0930 2C3A  JT2:     JMP     NUMK1   ;NUMERIC KEY ENTRY
2049 0932 2C41           JMP     CANK1   ;ADF-CANCEL
2050 0934 2D5F           JMP     SSK2    ;SS-KEY ENTRY
2051 0936 2E23           JMP     R2      ;NONE
2052 0938 2E23           JMP     R2      ;NONE
2053 093A 2DC6           JMP     PCHC1   ;16-CH KEY ENTRY
2054 093C 2D70           JMP     ASK2    ;AS-KEY ENTRY
2055 093E 2C9E           JMP     DRMK1   ;ADF-DIRECTION MEM
2056 0940 2CDE  JT2X:    JMP     M1K1    ;ADF-MEM1 KEY
2057 0942 2CE0           JMP     M2K1    ;ADF-MEM2 KEY
2058 0944 2CE2           JMP     M3K1    ;ADF-MEM3 KEY
2059 0946 2E23           JMP     R2      ;NONE
2060 0948 2D78           JMP     INTK2   ;INT-KEY ENTRY
2061 094A 2E23           JMP     R2      ;NONE
2062 094C 2E23           JMP     R2      ;NONE
2063 094E 2E23           JMP     R2      ;NONE
2064                     ;BRANCH LIST FOR ARN BRANCH (BR3)
2065 0950 2E34  JT3:     JMP     R3      ;NONE
2066 0952 2C41           JMP     CANK1   ;ADF-CANCEL
2067 0954 2E34           JMP     R3      ;NONE
2068 0956 2D85           JMP     CONTK3  ;CONT-KEY ENTRY
2069 0958 2E34           JMP     R3      ;NONE
2070 095A 2D89           JMP     PK3     ;16-KEY ENTRY
2071 095C 2D8E           JMP     ASK3    ;RE-ENTRY OF AS-KEY
2072 095E 2C9E           JMP     DRMK1   ;ADF-DIRECTION MEM
2073 0960 2CDE  JT3X:    JMP     M1K1    ;ADF-MEM1 KEY
```

```
2074 0962 2CE0                JMP      M2K1      ;ADF-MEM2 KEY
2075 0964 2CE2                JMP      M3K1      ;ADF-MEM3 KEY
2076 0966 2E34                JMP      R3        ;NONE
2077 0968 2E34                JMP      R3        ;NONE
2078 096A 2E34                JMP      R3        ;NONE
2079 096C 2E34                JMP      R3        ;NONE
2080 096E 2E34                JMP      R3        ;NONE
2081                ;BRANCH LIST FOR SRN BRANCH (BR4)
2082 0970 2E51       JT4:     JMP      R4        ;NONE
2083 0972 2C41                JMP      CANK1     ;ADF-CANCEL
2084 0974 2D94                JMP      SSK4      ;RE-ENTRY OF SS-KEY
2085 0976 2D9A                JMP      CONTK4    ;CONT-KEY ENTRY
2086 0978 2E51                JMP      R4        ;NONE
2087 097A 2D9E                JMP      PK4       ;16-KEY ENTRY
2088 097C 2E51                JMP      R4        ;NONE
2089 097E 2C9E                JMP      DRMK1     ;ADF-DIRECTION MEM
2090 0980 2CDE       JT4X:    JMP      M1K1      ;ADF-MEM1 KEY
2091 0982 2CE0                JMP      M2K1      ;ADF-MEM2 KEY
2092 0984 2CE2                JMP      M3K1      ;ADF-MEM3 KEY
2093 0986 2E51                JMP      R4        ;NONE
2094 0988 2E51                JMP      R4        ;NONE
2095 098A 2E51                JMP      R4        ;NONE
2096 098C 2E51                JMP      R4        ;NONE
2097 098E 2E51                JMP      R4        ;NONE
2098                ;BRANCH LIST FOR PRN BRANCH (BR5)
2099 0990 2E7D       JT5:     JMP      R5        ;NONE
2100 0992 2E7D                JMP      R5        ;NONE
2101 0994 2E7D                JMP      R5        ;NONE
2102 0996 2E7D                JMP      R5        ;NONE
2103 0998 2E7D                JMP      R5        ;NONE
2104 099A 2C51                JMP      PK1       ;16-KEY ENTRY
2105 099C 2E7D                JMP      R5        ;NONE
2106 099E 2C9E                JMP      DRMK1     ;ADF-DIRECTION MEM
2107 09A0 2CDE       JT5X:    JMP      M1K1      ;ADF-MEM1 KEY
2108 09A2 2CE0                JMP      M2K1      ;ADF-MEM2 KEY
2109 09A4 2CE2                JMP      M3K1      ;ADF-MEM3 KEY
2110 09A6 2DA3                JMP      MONK5     ;MON-KEY ENTRY
2111 09A8 2E7D                JMP      R5        ;NONE
2112 09AA 2E7D                JMP      R5        ;NONE
2113 09AC 2E7D                JMP      R5        ;NONE
2114 09AE 2E7D                JMP      R5        ;NONE
2115                ;BRANCH LIST FOR DWN BRANCH (BR6)
2116 09B0 2EC2       JT6:     JMP      R6        ;NONE
2117 09B2 2C41                JMP      CANK1     ;ADF-CANCEL
2118 09B4 2EC2                JMP      R6        ;NONE
2119 09B6 2EC2                JMP      R6        ;NONE
2120 09B8 2EC2                JMP      R6        ;NONE
2121 09BA 2C51                JMP      PK1       ;16-KEY ENTRY
2122 09BC 2EC2                JMP      R6        ;NONE
2123 09BE 2C9E                JMP      DRMK1     ;ADF-DIRECTION MEM
2124 09C0 2EC2       JT6X:    JMP      R6        ;NONE
2125 09C2 2EC2                JMP      R6        ;NONE
2126 09C4 2EC2                JMP      R6        ;NONE
2127 09C6 2DA3                JMP      MONK5     ;MON-KEY ENTRY
2128 09C8 2EC2                JMP      R6        ;NONE
2129 09CA 2EC2                JMP      R6        ;NONE
2130 09CC 2EC2                JMP      R6        ;NONE
2131 09CE 2EC2                JMP      R6        ;NONE
2132                ;BRANCH LIST FOR ASN BRANCH (BR7)
2133 09D0 2F2A       JT7:     JMP      R7        ;NONE
2134 09D2 2F2A                JMP      R7        ;NONE
2135 09D4 2F2A                JMP      R7        ;NONE
2136 09D6 2F2A                JMP      R7        ;NONE
2137 09D8 2F2A                JMP      R7        ;NONE
2138 09DA 2DAD                JMP      PK7       ;16-KEY ENTRY
2139 09DC 2DB2                JMP      ASK7      ;RE-ENTRY OF AS-KEY
2140 09DE 2F2A                JMP      R7        ;NONE
2141                ;BRANCH LIST FOR SSN BRANCH (BR8)
2142 09E0 2F53       JT8:     JMP      R8        ;NONE
2143 09E2 2F53                JMP      R8        ;NONE
2144 09E4 2DB7                JMP      SSK8      ;RE-ENTRY OF SS-KEY
```

```
2145  09E6  2F53                JMP     R8          ;NONE
2146  09E8  2F53                JMP     R8          ;NONE
2147  09EA  2DBC                JMP     PK8         ;16-KEY ENTRY
2148  09EC  2F53                JMP     R8          ;NONE
2149  09EE  2F53                JMP     R8          ;NONE
2150                         ;------------------------
2151                         ;     CHANNEL DISPLAY CODE LIST
2152                         ;------------------------
2153        0A00                ORG     0A00H
2154  0A00  77                  DB      77H         ; 0
2155  0A01  22                  DB      22H         ; 1
2156  0A02  97                  DB      97H         ; 2
2157  0A03  A7                  DB      0A7H        ; 3
2158  0A04  E2                  DB      0E2H        ; 4
2159  0A05  E5                  DB      0E5H        ; 5
2160  0A06  F5                  DB      0F5H        ; 6
2161  0A07  63                  DB      63H         ; 7
2162  0A08  F7                  DB      0F7H        ; 8
2163  0A09  E7                  DB      0E7H        ; 9
2164                         ;------------------------
2165                         ;     LOAD A AND MEMORY WITH TABLE DATA
2166                         ;------------------------
2167        0A0A                ORG     0A0AH
2168  0A0A  3F34        LA56:   LAMTL
2169  0A0C  27B5                JMP     LA57
2170                         ;------------------------
2171                         ;     CHANNEL DISPLAY CODE LIST
2172                         ;------------------------
2173        0A0F                ORG     0A0FH
2174  0A0F  00                  DB      00H         ; BLANK
2175                         ;------------------------
2176                         ;     DIRECTION DISPLAY CODE LIST
2177                         ;------------------------
2178        0A10                ORG     0A10H
2179  0A10  FC                  DB      0FCH        ; 0
2180  0A11  60                  DB      60H         ; 1
2181  0A12  DA                  DB      0DAH        ; 2
2182  0A13  F2                  DB      0F2H        ; 3
2183  0A14  66                  DB      66H         ; 4
2184  0A15  B6                  DB      0B6H        ; 5
2185  0A16  BE                  DB      0BEH        ; 6
2186  0A17  E4                  DB      0E4H        ; 7
2187  0A18  FE                  DB      0FEH        ; 8
2188  0A19  F6                  DB      0F6H        ; 9
2189  0A1A  3A                  DB      3AH         ; 0
2190  0A1B  CE                  DB      0CEH        ; P
2191  0A1C  0A                  DB      0AH         ; R
2192                         ;------------------------
2193                         ;     DIRECTION DISPLAY CODE LIST
2194                         ;------------------------
2195        0A1F                ORG     0A1FH
2196  0A1F  00                  DB      00H         ; BLANK
2197  0A20  3F34        LA60:   LAMTL
2198  0A22  2270                GJMP    LA61
2199                         ;------------------------
2200                         ;     WARM START ENTRY POINT (INCLUDE POWER ON)
2201                         ;------------------------
2202  0A24  3F87        INIT2:  DI      7           ;DISABLE WHOLE INTERRUPTS
2203  0A26  12                  LAI     2
2204  0A27  3FE2                OP      2           ;7225 NONSEL,BUZZR OFF,STROBE OFF
2205  0A29  4E5E                LHLI    TEMPO       ;RESET SPW
2206  0A2B  10                  LAI     0
2207  0A2C  57                  ST
2208  0A2D  3F31                TAMSP
2209  0A2F  4EAE                LHLI    IND1
2210  0A31  57                  ST
2211  0A32  4EAF                LHLI    IND2
2212  0A34  57                  ST
2213  0A35  13                  LAI     3           ;LCD ON ( 3-PHASE MODE)
```

```
2214  0A36  3FEB              OP     11
2215  0A38  10                LAI    0           ;COUNTER CLOCK 1.28MSEC
2216  0A39  3FEC              OP     12
2217  0A3B  1C                LAI    OCH         ;PORT 6 MODE = IN(60/61),OUT(62,63)
2218  0A3C  3FEE              OP     14
2219  0A3E  1E                LAI    OEH         ;PORT #0 (SIO) READY
2220  0A3F  3FEF              OP     15
2221                    ;
2222  0A41  4E5F              LHLI   5FH         ;20H-5FH RAM CLR
2223  0A43  10        ME1:    LAI    0
2224  0A44  54                XAM    HL-
2225  0A45  83                GJMP   ME1
2226  0A46  7A                XAH                ;L=0FH
2227  0A47  0F                AISC   OFH         ;DEC ACC
2228  0A48  00                NOP
2229  0A49  7A                XAH
2230  0A4A  3E71              SKHEI  1           ;H=1?
2231  0A4C  83                GJMP   ME1
2232  0A4D  4E83              LHLI   DDR2
2233  0A4F  10                LAI    0
2234  0A50  57        ME11:   ST
2235  0A51  59                ILS
2236  0A52  90                GJMP   ME11        ;CLR DDR2-DD3
2237                    ;
2238  0A53  338C              CALL   SBT0        ;INITIALIZE CH TO 16
2239  0A55  3739              CALL   OUT6
2240                    ;
2241  0A57  18                LAI    8
2242  0A58  3FE3              OP     KSPB        ;CHK DIP SW
2243  0A5A  3FC4              IP     KOP-
2244  0A5C  4E9B              LHLI   SPC         ;SPEC.MEMORY
2245  0A5E  57                ST
2246  0A5F  63                SKMBF  3           ;CHK MSB OF D.I.P SW
2247  0A60  3603              CALL   IFLG0       ;INTERNATIONAL BAND ONLY
2248  0A62  3334              CALL   CMPDAT      ;INTAKE COMPENSATION DATA
2249                    ;
2250  0A64  4EFF              LHLI   0FFH        ;FILL 3 ON RAM 80-FFH
2251  0A66  13        ME2:    LAI    3
2252  0A67  54                XAM    HL-
2253  0A68  A6                GJMP   ME2
2254  0A69  7A                XAH
2255  0A6A  0F                AISC   OFH
2256  0A6B  00                NOP
2257  0A6C  7A                XAH
2258  0A6D  3E7A              SKHEI  0AH
2259  0A6F  A6                GJMP   ME2
2260                    ;
2261  0A70  10                LAI    0
2262  0A71  4E99              LHLI   DMF         ;DIRECTION MEM CLR
2263  0A73  57                ST
2264  0A74  3F87              DI     7
2265  0A76  3F95              EI     5
2266  0A78  1A                LAI    0AH         ;INTT CLOCK MODULO=10
2267  0A79  4E58              LHLI   TZ
2268  0A7B  57                ST
2269  0A7C  10                LAI    0
2270  0A7D  3F3F              TAMMOD             ;TIMER MODULO SET
2271  0A7F  3F32              TIMER              ;INTT STARTS
2272                    ;
2273  0A81  3F80      INIT3:  DI     0
2274  0A83  DE                CALT   CFLG4
2275  0A84  6F                SMB    3           ;SET CANFLG
2276  0A85  37B6              CALL   FLASH
2277  0A87  37B6              CALL   FLASH
2278  0A89  3F45              SKI    5           ;CLR INT RQ FLGS
2279  0A8B  00                NOP
2280  0A8C  DF                CALT   CFLG6
2281  0A8D  68                RMB    0           ;CLR EFLG
2282  0A8E  30A0              CALL   INITAD
2283  0A90  14        ME8:    LAI    4
```

```
2284 0A91 F3              CALT    SB9
2285 0A92 3F6F            SKAEI   OFH        ;CHK ENTRYS
2286 0A94 9D              GJMP    ME90       ;DONT MEET
2287 0A95 3378            CALL    CPYRGT     ;COPYRIGHT DEMO
2288 0A97 14      ME9:    LAI     4
2289 0A98 F3              CALT    SB9
2290 0A99 3F6F            SKAEI   OFH
2291 0A9B 9D              GJMP    ME90
2292 0A9C 97              GJMP    ME9
2293 0A9D 30B2    ME90:   CALL    OPRSGN
2294 0A9F E9              CALT    DDISP      ;
2295 0AA0 DA              CALT    KFLGX
2296 0AA1 F6              CALT    DCLR
2297 0AA2 F0              CALT    DPSIO
2298 0AA3 DE              CALT    CFLG4
2299 0AA4 6B              RMB     3          ;RESET CANFLG
2300 0AA5 3F90            EI      0
2301 0AA7 2E00    ME4:    GJMP    DRCTY
2302                      ;ADVANCE SCAN CHANNEL FOR A-SCAN
2303 0AA9 E4      ADS:    CALT    ADSUB
2304 0AAA D2              CALT    BUZZR
2305 0AAB 2F16            GJMP    PT3
2306                      ;ADVANCE SELECTED SCAN CHANNEL
2307 0AAD E4      ADS2:   CALT    ADSUB
2308 0AAE D2              CALT    BUZZR
2309 0AAF 2F39            GJMP    PF4
2310                      ;----------------------------------
2311                      ;       KEY CODE LIST
2312                      ;----------------------------------
2313                      ;FUNCTION KEY CODES
2314                      ;----------------------
2315                      ;       KEY INPUT CODE
2316                      ;  1     2   (3)    4    (5)   (6)    (7)    8
2317                      ;----------------------
2318                      ;16    M/D  (16)  CAN   (16)  (16)   (16)   AS
2319                      ;CONT  INT  (16)  MON   (16)  (16)   (16)   SS
2320                      ;(16)  (16) (16)  (16)  (16)  (16)   (16)   (16)
2321                      ;M1    M2   (16)  M3    (16)  (16)   (16)   DRM
2322                      ;----------------------
2323                      ;  * DIRECT DEFINED INPUT=
2324                      ;       ROTARY SELECTOR INPUT---  IVEC=0
2325                      ;       D.I.P SW INPUT--- INDEPENDENT PROCESS
2326                      ;
2327            0AD0      ORG     0AD0H
2328                      ;
2329 0AD0 05              DB      5          ;16-CH KEY
2330 0AD1 04              DB      4          ;M/D KEY
2331 0AD2 05              DB      5
2332 0AD3 01              DB      1          ;CAN KEY
2333 0AD4 05              DB      5
2334 0AD5 04              DB      4
2335 0AD6 01              DB      1
2336 0AD7 06              DB      6          ;AS KEY
2337 0AD8 03              DB      3          ;CONT KEY
2338 0AD9 0C              DB      0CH        ;INT KEY
2339 0ADA 03              DB      3
2340 0ADB 0B              DB      0BH        ;MON KEY
2341 0ADC 03              DB      3
2342 0ADD 0C              DB      0CH
2343 0ADE 0B              DB      0BH
2344 0ADF 02              DB      2          ;SS KEY
2345 0AE0 05              DB      5
2346 0AE1 05              DB      5
2347 0AE2 05              DB      5
2348 0AE3 05              DB      5
2349 0AE4 05              DB      5
2350 0AE5 05              DB      5
2351 0AE6 05              DB      5
2352 0AE7 05              DB      5
2353 0AE8 08              DB      8          ;MEM1 KEY
2354 0AE9 09              DB      9          ;MEM2 KEY
```

```
2355 0AEA 08                    DB      8
2356 0AEB 0A                    DB      0AH         ;MEM3 KEY
2357 0AEC 08                    DB      8
2358 0AED 09                    DB      9
2359 0AEE 0A                    DB      0AH
2360 0AEF 07                    DB      7           ;DR MEMORY KEY
2361                      ;------------------------------------------
2362                      ;     KEY CODE LIST ACCESS ROUTINE FROM KZR,KZR1
2363                      ;------------------------------------------
2364 0AF0 3F34    RKL:    LAMTL
2365 0AF2 52              LAM     HL
2366 0AF3 23F5            GJMP    MT1
2367                      ;------------------------------------------
2368                      ;     MAIN FLOW ROUTINES
2369                      ;------------------------------------------
2370       0B00           ORG     0B00H
2371                      ;------------------------------------------
2372                      ;     HOLD MODE SETTING ROUTINE
2373                      ;------------------------------------------
2374 0B00 3F87    HOLD:   DI      7H          ;CLR INT ENB REG
2375 0B02 3F80            DI      0H          ;CLR INT MST ENB F/F
2376 0B04 1F              LAI     0FH
2377 0B05 4E20            LHLI    CHN1
2378 0B07 57              ST
2379 0B08 4E21            LHLI    CHN2
2380 0B0A 57              ST
2381 0B0B E6              CALT    CHDISP      ;PREPARE CH DATA FOR SEND
2382 0B0C 10              LAI     0
2383 0B0D 4EAE            LHLI    IND1
2384 0B0F 57              ST
2385 0B10 4EAF            LHLI    IND2
2386 0B12 57              ST
2387 0B13 4E99            LHLI    DMF
2388 0B15 57              ST
2389 0B16 F6              CALT    DCLR
2390 0B17 F0              CALT    DPSIO       ;SEND DATA TO 7225
2391 0B18 4E8D            LHLI    DD1
2392 0B1A 1F              LAI     0FH
2393 0B1B 57              ST
2394 0B1C 59              ILS
2395 0B1D 57              ST
2396 0B1E 59              ILS
2397 0B1F 57              ST
2398 0B20 E9              CALT    DDISP       ;SEND BLANC TO DATA DISPLAY
2399 0B21 18              LAI     8H
2400 0B22 3FEF            OP      0FH         ;SFT MODE REG=8
2401                                          ;INTO SELECTED
2402                                          ;PORT 1/2/3 HI-IMP
2403 0B24 10              LAI     0H
2404 0B25 3FE2            OP      2H
2405 0B27 3FE3            OP      3H
2406 0B29 3FE6            OP      6H
2407 0B2B 71              IP1
2408 0B2C 3FC4            IP      4H
2409 0B2E 3FC5            IP      5H
2410 0B30 3FC7            IP      7H
2411 0B32 3F42            SKI     2H          ;INTO/S ROF RST
2412 0B34 00              NOP
2413 0B35 3F37            STOP                ;SET STOP MODE
2414 0B37 2A24            JMP     INIT2
2415                      ;------------------------------------------
2416                      ;
2417                      ;     INTERRUPT HANDLER
2418                      ;
2419                      ;------------------------------------------
2420                      ;------------------------------------------
2421                      ;     INTT INITIALIZE
2422                      ;------------------------------------------
2423 0B39 3F32    WATCH:  TIMER               ;INTT TIMER RESTART
2424                      ;
2425 0B3B 3E9E            PSHHL
```

```
2426 0B3D 3E8E              PSHDE
2427 0B3F 4E5D              LHLI    ACCZ
2428 0B41 57                ST
2429                ;HOLD PORT CHK FOR POWER DOWN
2430 0B42 3FC0              IP      PORT0       ;INTAKE PORT#0 DATA
2431 0B44 74                SKABT   0
2432 0B45 2B00              JMP     HOLD        ;POWER IS DOWN!!
2433                ;------------------------------------
2434 0B47 DD                CALT    CFLG3
2435 0B48 63                SKMBF   3
2436 0B49 8D                GJMP    NX2         ;HANDLE
2437 0B4A 6F                SMB     3           ;PASS
2438 0B4B 2C30              GJMP    NX1         ;EXIT
2439 0B4D 6B      NX2:      RMB     3
2440                ;------------------------------------
2441                ;       TIMER#1-#6 ADVANCE ROUTINE
2442                ;------------------------------------
2443 0B4E DF                CALT    CFLG6
2444 0B4F 60                SKMBF   0           ;CHK EFLG
2445 0B50 A3                GJMP    NB1A
2446                ;4-BIT TIMER INCREMENT (TIMER#0)
2447 0B51 DD                CALT    CFLG3
2448 0B52 62                SKMBF   2           ;CHK TIM0 FLG
2449 0B53 A3                GJMP    NB1A        ;TIM0 FLG OVER
2450 0B54 11                LAI     1
2451 0B55 4E26              LHLI    TIM0
2452 0B57 7D                ASC                 ;INC TIM0
2453 0B58 A2                GJMP    NB0         ;YET
2454 0B59 DD                CALT    CFLG3
2455 0B5A 6E                SMB     2           ;TIM0 FLG SET
2456 0B5B DF                CALT    CFLG6
2457 0B5C 61                SKMBF   1           ;CHK SFLG
2458 0B5D A0                GJMP    NB0A        ;SFLG IS ON
2459 0B5E 30A0              CALL    INITAD
2460 0B60 4E26    NB0A:     LHLI    TIM0
2461 0B62 57      NB0:      ST
2462                ;4-BIT TIMER INCREMENT (TIMER#1)
2463 0B63 11      NB1A:     LAI     1
2464 0B64 4E27              LHLI    TIM1        ;TIMER LOCATION START ADDR.
2465 0B66 7D                ASC                 ;INC TIMER#0
2466 0B67 AC                GJMP    NB1         ;YET
2467 0B68 DC                CALT    CFLG2       ;TIMER#1 FLAG ON
2468 0B69 6C                SMB     0
2469 0B6A 4E27              LHLI    TIM1
2470 0B6C 57      NB1:      ST
2471                ;4-BIT TIMER INCREMENT (TIMER#2)
2472 0B6D 11                LAI     1
2473 0B6E 4E28              LHLI    TIM2        ;ACCESS TIMER#2
2474 0B70 7D                ASC                 ;INC TIMER#2
2475 0B71 B6                GJMP    NB2         ;YET
2476 0B72 DC                CALT    CFLG2       ;TIMER#2 FLAG ON
2477 0B73 6D                SMB     1
2478 0B74 4E28              LHLI    TIM2
2479 0B76 57      NB2:      ST
2480                ;4-BIT TIMER INCREMENT (TIMER#3)
2481 0B77 DC                CALT    CFLG2
2482 0B78 62                SKMBF   2           ;TIMER#3 FLAG CHK
2483 0B79 2B86              GJMP    NB4A        ;ALREADY ON
2484 0B7B 11                LAI     1
2485 0B7C 4E29              LHLI    TIM3        ;ACCESS TIMER#3
2486 0B7E 7D                ASC                 ;INC TIMER#3
2487 0B7F 85                GJMP    NB3         ;YET
2488 0B80 4CB2              ANP     2,0BH       ;BUZZR OFF
2489 0B82 DC                CALT    CFLG2       ;
2490 0B83 6E                SMB     2           ;SET TIMER#3 FLAG
2491 0B84 86                GJMP    NB4A
2492 0B85 57      NB3:      ST
2493                ;4-BIT TIMER INCREMENT (TIMER#4)
2494 0B86 11      NB4A:     LAI     1
2495 0B87 4E2A              LHLI    TIM4        ;ACCESS TIMER#4
2496 0B89 7D                ASC                 ;INC TIMER#4
```

```
2497 0B8A 91                GJMP    NB4         ;YET
2498 0B8B 4C76              ANP     6,7         ;MUTE OFF
2499 0B8D DC                CALT    CFLG2       ;TIMER#4 FLAG ON
2500 0B8E 6F                SMB     3
2501 0B8F 4E2A              LHLI    TIM4
2502 0B91 57        NB4:    ST
2503                ;8-BIT TIMER INCREMENT (TIMER#5)
2504 0B92 11                LAI     1
2505 0B93 4E2B              LHLI    TIM5        ;ACCESS TIMER#5
2506 0B95 7D                ASC                 ;INC TIMER#5
2507 0B96 A1                GJMP    NB5         ;YET
2508 0B97 57                ST
2509 0B98 11                LAI     1
2510 0B99 4E2C              LHLI    TIM5A       ;ACCESS TIMER#5A
2511 0B9B 7D                ASC                 ;INC TIMER#5A
2512 0B9C A1                GJMP    NB5         ;YET
2513 0B9D DD                CALT    CFLG3       ;TIMER#5 FLAG ON
2514 0B9E 6C                SMB     0
2515 0B9F 4E2C              LHLI    TIM5A
2516 0BA1 57        NB5:    ST
2517                ;12-BIT TIMER INCREMENT
2518 0BA2 11                LAI     1
2519 0BA3 4E2D              LHLI    TIM6        ;ACCESS TIMER#6
2520 0BA5 7D                ASC                 ;INC TIMER#6
2521 0BA6 B7                GJMP    NB6         ;YET
2522 0BA7 57                ST
2523 0BA8 11                LAI     1
2524 0BA9 4E2E              LHLI    TIM6A       ;ACCESS TIMER#6A
2525 0BAB 7D                ASC                 ;INC TIMER#6A
2526 0BAC B7                GJMP    NB6         ;YET
2527 0BAD 57                ST
2528 0BAE 11                LAI     1
2529 0BAF 4E2F              LHLI    TIM6B       ;ACCESS TIMER#6B
2530 0BB1 7D                ASC                 ;INC TIMER#6B
2531 0BB2 B7                GJMP    NB6         ;YET
2532 0BB3 DD                CALT    CFLG3       ;TIMER#6 FLAG ON
2533 0BB4 6D                SMB     1
2534 0BB5 4E2F              LHLI    TIM6B
2535 0BB7 57        NB6:    ST
2536                ;---------------------------------
2537 0BB8 D9                CALT    CFLG1
2538 0BB9 60                SKMBF   0
2539 0BBA 2C10              GJMP    SOC         ;KFLG ALREADY SET
2540 0BBC 4E3D              LHLI    FLG6        ;CHK NFLG
2541 0BBE 63                SKMBF   3
2542 0BBF 2C10              GJMP    SOC         ;NFLG=1 THEN BI-PASS
2543                ;---------------------------------
2544                ;       KEY BOARD CHK & ENCODE < INPUT VECTOR >
2545                ;---------------------------------
2546 0BC1 17        KBD:    LAI     7           ;TOTAL KEY CHK CODE
2547 0BC2 F3                CALT    SB9
2548 0BC3 3F60              SKAEI   0           ;CHK SIGNAL FROM KEYBOARD
2549 0BC5 87                GJMP    NA25
2550 0BC6 8C                GJMP    NA20
2551 0BC7 384D     NA25:    LADR    KSS
2552 0BC9 79                SC
2553 0BCA E0                CALT    BS1
2554 0BCB 90                GJMP    NA50
2555 0BCC 384D     NA20:    LADR    KSS         ;NO ENTRY
2556 0BCE 78                RC
2557 0BCF E0                CALT    BS1
2558 0BD0 4E4D     NA50:    LHLI    KSS
2559 0BD2 57                ST
2560                ;
2561 0BD3 3F60     NA21:    SKAEI   0           ;CHK KSS=0
2562 0BD5 98                GJMP    NA22        ;KSS NOT 0
2563 0BD6 DA                CALT    KFLGX       ;RESET KFLG
2564 0BD7 A0                GJMP    NA23
2565 0BD8 3F6E     NA22:    SKAEI   0EH         ;CHK KSS=0EH
2566 0BDA A0                GJMP    NA23        ;KSS NOT 0EH
2567 0BDB 3838              LADR    FLG1
```

```
2568 0BDD 74              SKABT   0           ;CHK KFLG
2569 0BDE A2              GJMP    NA24        ;KFLG=0
2570 0BDF A0              GJMP    NA23        ;KFLG=1
2571                 ;
2572 0BE0 2C10    NA23:   GJMP    SQC
2573                 ;
2574 0BE2 DB      NA24:   CALT    KFLG0       ;SET KFLG
2575 0BE3 11      NA10:   LAI     1           ;CHK ENTRY 16,MW,RCL OR AS
2576 0BE4 F3              CALT    SB9
2577 0BE5 3F60            SKAEI   0
2578 0BE7 B5              GJMP    NA12        ;ENTRY !
2579 0BE8 12              LAI     2           ;CHK ENTRY WX,INT,MON OR SS
2580 0BE9 F3              CALT    SB9
2581 0BEA 3F60            SKAEI   0
2582 0BEC B8              GJMP    NA13        ;ENTRY !
2583 0BED 14              LAI     4           ;CHK ENTRY RST,E OR DEL
2584 0BEE F3              CALT    SB9
2585 0BEF 3F60            SKAEI   0
2586 0BF1 2C00            GJMP    NA14        ;ENTRY !
2587 0BF3 2C10            GJMP    SQC         ;KEY TOUTCH DISAPPEARED
2588 0BF5 33EC    NA12:   CALL    KCALR1      ;KEYCODE ADDR LO SET
2589 0BF7 BE              GJMP    NA41
2590 0BF8 33EC    NA13:   CALL    KCALR1      ;KEYCODE ADDR LO DERIVE
2591 0BFA 18              LAI     8
2592 0BFB 3FB6            ORL
2593 0BFD 57              ST
2594 0BFE 1D      NA41:   LAI     KCAM+1
2595 0BFF 87              GJMP    NA42
2596 0C00 33EC    NA14:   CALL    KCALR1      ;KEYCODE ADDR  LO DERIVE
2597 0C02 18              LAI     8           ;CODE FOR RST,E OR DEL
2598 0C03 3FB6            ORL
2599 0C05 57              ST
2600 0C06 1E              LAI     KCAM+2
2601 0C07 33F3    NA42:   CALL    KZR         ;WRITE KEYCODE ONTO KZ
2602 0C09 4E3E    NA19:   LHLI    IVEC        ;STORE KEYCODE TO INPUT VECTOR
2603 0C0B 57              ST
2604 0C0C 384F            LADR    KZ
2605 0C0E DB              CALT    KFLG0       ;SET KEY ENTRY FLAG
2606 0C0F 90              GJMP    SQC
2607                 ;----------------------------------------
2608                 ;       SQUELTI CHECK ROUTINE
2609                 ;----------------------------------------
2610 0C10 4EF0    SQC:    LHLI    SQTIM       ;SET CHK PERIODE
2611 0C12 3FC1    MS1:    IP      1           ;SQ PORT ACCESS
2612 0C14 76              SKABT   2           ;SQ SIGNAL CHK
2613 0C15 A6              GJMP    MS3         ;NO SQ SIGNAL
2614 0C16 59              ILS                 ;SQ SIGNAL IS THERE
2615 0C17 92              GJMP    MS1         ;LREG IS NOT 0 & RETRY
2616 0C18 7A              XAH                 ;LREG EXPIRED
2617 0C19 78              RC
2618 0C1A 01              AISC    1
2619 0C1B A4              GJMP    MS2         ;HREG (I.E ACC) IS NOT 0 & RETRY
2620 0C1C D9              CALT    CFLG1
2621 0C1D 6D              SMB     1           ;SET Q1 FLG
2622 0C1E DF              CALT    CFLG6
2623 0C1F 60              SKMBF   0           ;CHK EFLG
2624 0C20 AB              GJMP    MS4
2625 0C21 DE              CALT    CFLG4
2626 0C22 6C              SMB     0           ;SET DDFLG
2627 0C23 A9              GJMP    MS5
2628 0C24 7A      MS2:    XAH                 ;ACC >> HREG
2629 0C25 92              GJMP    MS1
2630 0C26 D9      MS3:    CALT    CFLG1       ;RESET Q1 FLAG
2631 0C27 69              RMB     1
2632 0C28 AB              GJMP    MS4
2633 0C29 36A0    MS5:    CALL    ADF         ;SQ THERE
2634 0C2B 00      MS4:    NOP
2635                 ;----------------------------------------
2636                 ;       FLG CHECK ROUTINE
2637                 ;----------------------------------------
2638 0C2C 3565            CALL    MCHK
```

```
2639 0C2E 35E4           CALL    EFLGC
2640                  ;----------------------------------------
2641                  ;       RETURN FROM INTERRUPT
2642                  ;----------------------------------------
2643                  ;
2644 0C30 4E5D  NX1:   LHLI    ACCZ
2645 0C32 52           LAM     HL
2646 0C33 3E8F         POPDE
2647 0C35 3E9F         POPHL
2648 0C37 3F90         EI      0
2649 0C39 43           RTPSW
2650                  ;----------------------------------------
2651                  ;
2652                  ;          FUNCTION ROUTINES
2653                  ;
2654                  ;----------------------------------------
2655 0C3A 3733  NUMK1: CALL    OUT3
2656 0C3C 4E3D         LHLI    FLG6        ;NFLG OFF
2657 0C3E 6B           RMB     3
2658 0C3F 2E00         GJMP    DRCTY
2659 0C41 D2   CANK1:  CALT    BUZZR
2660 0C42 2A81         GJMP    INIT3       ;ADF INITIALIZE
2661                  ;
2662 0C44 4E3B  SSK1:  LHLI    FLG4        ; HL<--FLG4
2663 0C46 65           SKMBT   1H          ; MFLG=1?
2664 0C47 2E16         GJMP    R1          ; MFLG=0
2665 0C49 4EAE         LHLI    IND1        ; HL<--IND1
2666 0C4B 6C           SMB     0H          ; SET SS
2667 0C4C 17           LAI     7H          ; A<--7H
2668 0C4D D1           CALT    CHNV        ; NVEC<--7H
2669 0C4E D6           CALT    PFLGX
2670 0C4F 2DED         GJMP    CHC2
2671 0C51 4EAF  PK1:   LHLI    IND2
2672 0C53 67           SKMBT   3
2673 0C54 99           GJMP    PK1A        ;ENTRY OF INSTANT 16CH
2674 0C55 D6           CALT    PFLGX       ;ALREADY INST.16CH
2675 0C56 D2           CALT    BUZZR
2676 0C57 2DF1         GJMP    CHRC        ;CH RECALL
2677 0C59 2DC0  PK1A:  GJMP    PCHC2
2678 0C5B 4EAF  ASK1:  LHLI    IND2        ; HL<--IND2
2679 0C5D 6E           SMB     2H          ; SET AS
2680 0C5E 16           LAI     6H          ; A<--6H
2681 0C5F D1           CALT    CHNV        ; NVEC<--6H
2682 0C60 D6           CALT    PFLGX
2683 0C61 2DED         GJMP    CHC2
2684 0C63 10   INTK1:  LAI     0
2685 0C64 4E99         LHLI    DMF         ;CLR DRCTION MEMORY
2686 0C66 57           ST
2687 0C67 D7           CALT    WFLGX
2688 0C68 4E3D         LHLI    FLG6
2689 0C6A 66           SKMBT   2H          ; IFLG=1?
2690 0C6B B3           GJMP    LA28        ; IFLG=0
2691 0C6C 4E4E         LHLI    CHFLG       ; HL<--CHFLG
2692 0C6E 64           SKMBT   0H          ; CHFLG(BIT0)=1?
2693                                        ; 1---USA KINSHI
2694 0C6F 2C80         GJMP    LA29        ; CHFLG(BIT0)=0
2695 0C71 4EAE         LHLI    IND1        ; HL<--IND1
2696 0C73 69           RMB     1H          ; RESET INT
2697 0C74 DF           CALT    CFLG6       ; IFLG<--0
2698 0C75 6A           RMB     2
2699 0C76 2DC6         GJMP    PCHC1
2700 0C78 4EAE  LA28:  LHLI    IND1        ; HL<--IND1
2701 0C7A 6D           SMB     1H          ; SET INT
2702 0C7B DF           CALT    CFLG6       ; IFLG<--1
2703 0C7C 6E           SMB     2
2704 0C7D D2           CALT    BUZZR
2705 0C7E 2DC3         GJMP    CHC1
2706 0C80 4EAE  LA29:  LHLI    IND1        ; HL<--IND1
2707 0C82 69           RMB     1H          ; RESET INT
2708 0C83 DF           CALT    CFLG6       ; IFLG<--0
2709 0C84 6A           RMB     2
```

```
2710  0C85  D2              CALT    BUZZR
2711  0C86  2DC3            GJMP    CHC1
2712  0C88  4EAE    MONK1:  LHLI    IND1        ; HL<--IND1
2713  0C8A  6F              SMB     3H          ; SET MON
2714  0C8B  15              LAI     5H          ; A<--5H
2715  0C8C  D1              CALT    CHNV        ; NVEC<--5H
2716  0C8D  E5              CALT    CHDAT
2717  0C8E  E6              CALT    CHDISP
2718  0C8F  F0              CALT    DPSIO
2719  0C90  D6              CALT    PFLGX
2720  0C91  2DED            GJMP    CHC2
2721  0C93  3459    MDK1:   CALL    CCHK
2722  0C95  5A              SKC
2723  0C96  9A              GJMP    NH1         ;CH NOT SELECTED
2724  0C97  3443            CALL    CDEL        ;CH SELECTED THEN DELETE
2725  0C99  9C              GJMP    NH2         ;
2726  0C9A  342A    NH1:    CALL    CMEM        ;THEN MEMORIZE
2727  0C9C  2DC3    NH2:    GJMP    CHC1
2728  0C9E  DE      DRMK1:  CALT    CFLG4       ;CHK DDFLG
2729  0C9F  64              SKMBT   0           ;
2730  0CA0  B5              GJMP    NM67        ;DDFLG OFF
2731  0CA1  A2              GJMP    NM60        ;DDFLG ON
2732  0CA2  D2      NM60:   CALT    BUZZR
2733  0CA3  4E99            LHLI    DMF
2734  0CA5  6F              SMB     3           ;DMEM INDICATOR ON
2735  0CA6  D9              CALT    CFLG1
2736  0CA7  6E              SMB     2           ;SET WFLG
2737  0CA8  4F15            LDEI    15H
2738  0CAA  3257            CALL    LA66        ;DISPLAY MEM INDICATER ONLY
2739  0CAC  F4              CALT    TIM6S       ;5SEC TIMER STARTS
2740  0CAD  D9      NM61:   CALT    CFLG1
2741  0CAE  60              SKMBF   0           ;CHK KFLG
2742  0CAF  2CC0            GJMP    NM64        ;KEY ENTRY THERE
2743  0CB1  DD              CALT    CFLG3
2744  0CB2  65              SKMBT   1           ;CHK TIMER#6
2745  0CB3  AD              GJMP    NM61        ;YET
2746  0CB4  D2      NM63:   CALT    BUZZR       ;NO SUBSEQUENT ENTRY
2747  0CB5  DA      NM67:   CALT    KFLGX
2748  0CB6  4E99            LHLI    DMF
2749  0CB8  6B              RMB     3           ;DMEM INDICATOR OFF
2750  0CB9  D7              CALT    WFLGX
2751  0CBA  4F15            LDEI    15H
2752  0CBC  3257            CALL    LA66        ;DISPLAY DMF ONLY
2753  0CBE  2E00            GJMP    DRCTY
2754  0CC0  DA      NM64:   CALT    KFLGX
2755  0CC1  383E            LADR    IVEC
2756  0CC3  3F68            SKAEI   8
2757  0CC5  88              GJMP    NM66
2758  0CC6  11              LAI     1           ;M1 KEY ENTRY
2759  0CC7  91              GJMP    NM62
2760  0CC8  3F69    NM66:   SKAEI   9
2761  0CCA  8D              GJMP    NM65
2762  0CCB  12              LAI     2           ;M2 KEY ENTRY
2763  0CCC  91              GJMP    NM62
2764  0CCD  3F6A    NM65:   SKAEI   0AH
2765  0CCF  98              GJMP    NM68        ;NOENTRY ON M1,M2,M3
2766  0CD0  14              LAI     4           ;M3 KEY ENTRY
2767  0CD1  4E9A    NM62:   LHLI    SWF
2768  0CD3  57              ST
2769  0CD4  3606            CALL    DRMEM
2770  0CD6  2CB4            GJMP    NM63
2771  0CD8  3F67    NM68:   SKAEI   7
2772  0CDA  2CAD            GJMP    NM61        ;NOT EFFECTIVE KEY
2773  0CDC  2CB4            GJMP    NM63        ;REENTRY OF MW
2774                        ;
2775  0CDE  11      M1K1:   LAI     1
2776  0CDF  A4              GJMP    NM51
2777  0CE0  12      M2K1:   LAI     2
2778  0CE1  A4              GJMP    NM51
2779  0CE2  14      M3K1:   LAI     4
2780  0CE3  A4              GJMP    NM51
```

| | | | | | |
|---|---|---|---|---|---|
|2781|0CE4 DA|NM51:|CALT|KFLGX| |
|2782|0CE5 4E3D| |LHLI|FLG6| |
|2783|0CE7 6D| |SMB|1|;SFLG ON|
|2784|0CE8 4E9A| |LHLI|SWF| |
|2785|0CEA 63| |SKMBF|3| |
|2786|0CEB 2D5A| |GJMP|NM52|;ALREADY SWAPPED|
|2787|0CED 57| |ST| |;CHANGE SWAPP FLAG|
|2788|0CEE 17| |LAI|7| |
|2789|0CEF 4E99| |LHLI|DMF|;CHK DIREC.MEMORY THERE|
|2790|0CF1 3FB2| |ANL| | |
|2791|0CF3 4E9A| |LHLI|SWF| |
|2792|0CF5 3FB2| |ANL| | |
|2793|0CF7 3F60| |SKAEI|0| |
|2794|0CF9 BC| |GJMP|NM50|;MEMORY THERE|
|2795|0CFA 2D5A| |GJMP|NM52| |
|2796|0CFC 363D|NM50:|CALL|SWAP| |
|2797|0CFE 389A| |LADR|SWF| |
|2798|0D00 4E99| |LHLI|DMF| |
|2799|0D02 7E| |EXL| | |
|2800|0D03 4E9D| |LHLI|DMFS| |
|2801|0D05 57| |ST| | |
|2802|0D06 17| |LAI|7| |
|2803|0D07 3FB2| |ANL| | |
|2804|0D09 57| |ST| | |
|2805|0D0A 4E9A| |LHLI|SWF| |
|2806|0D0C 6F| |SMB|3|;DECLARE SWAP|
|2807|0D0D D2| |CALT|BUZZR| |
|2808|0D0E E9| |CALT|DDISP| |
|2809|0D0F E6| |CALT|CHDISP| |
|2810|0D10 3342| |CALL|DROUND| |
|2811|0D12 EA| |CALT|ADISP| |
|2812|0D13 F0| |CALT|DPSIO| |
|2813|0D14 F4| |CALT|TIM6S|;5SEC TIMER STARTS|
|2814|0D15 F5| |CALT|TIM5S|;|
|2815|0D16 37C8| |CALL|MEMFLS| |
|2816|0D18 E9| |CALT|DDISP| |
|2817|0D19 3F90|NM53:|EI|0| |
|2818|0D1B DD| |CALT|CFLG3| |
|2819|0D1C 64| |SKMBT|0|;CHK TIMER#5|
|2820|0D1D A2| |GJMP|NM55|;YET|
|2821|0D1E 37C8| |CALL|MEMFLS| |
|2822|0D20 E9| |CALT|DDISP| |
|2823|0D21 F5| |CALT|TIM5S|;START TIM5 AGAIN|
|2824|0D22 D9|NM55:|CALT|CFLG1| |
|2825|0D23 60| |SKMBF|0|;CHK KFLG|
|2826|0D24 AA| |GJMP|NM54|;KEY ENTRY|
|2827|0D25 DD|NM56:|CALT|CFLG3| |
|2828|0D26 65| |SKMBT|1|;CHK TIMER#6|
|2829|0D27 99| |GJMP|NM53|;YET|
|2330|0D28 2D4A| |GJMP|NM58|;TIM#6 OVER|
|2831|0D2A 383E|NM54:|LADR|IVEC| |
|2832|0D2C 77| |SKABT|3| |
|2833|0D2D 2D47| |GJMP|NM59|;IVEC<8|
|2834|0D2F 3F6B| |SKAEI|0BH| |
|2835|0D31 B4| |GJMP|NM80|;IVEC IS NOT 0BH|
|2836|0D32 2D47| |GJMP|NM59|; IS 0BH|
|2837|0D34 3F6C|NM80:|SKAEI|0CH| |
|2838|0D36 B9| |GJMP|NM81|;IVEC IS NOT 0CH|
|2839|0D37 2D47| |GJMP|NM59|; IS 0CH|
|2840|0D39 09|NM81:|AISC|9| |
|2841|0D3A 00| |NOP| | |
|2842|0D3B 3F63| |SKAEI|3| |
|2843|0D3D 2D40| |GJMP|NM57| |
|2844|0D3F 01| |AISC|1| |
|2845|0D40 4E99|NM57:|LHLI|DMF|;CHK MEMORY|
|2846|0D42 3FB2| |ANL| | |
|2847|0D44 3F60| |SKAEI|0| |
|2848|0D46 8A| |GJMP|NM58|;MEMORY IS THERE|
|2849|0D47 DA|NM59:|CALT|KFLGX|;MEMORY NOT THERE|
|2850|0D48 2D25| |GJMP|NM56| |
|2851|0D4A 364A|NM58:|CALL|NM40|;RESTORE MEM|

```
2852 0D4C 4E9A            LHLI    SWF
2853 0D4E 6B              RMB     3        ;DECLARE END OF SWAP
2854 0D4F 37C0            CALL    DMFRST   ;DMF RESTORE
2855 0D51 D2              CALT    BUZZR
2856 0D52 E9              CALT    DDISP
2857 0D53 E6              CALT    CHDISP
2858 0D54 3342            CALL    DROUND
2859 0D56 EA              CALT    ADISP
2860 0D57 F0              CALT    DPSIO
2361 0D58 DD              CALT    CFLG3
2862 0D59 6D              SMB     1        ;TIM6 FIX
2863 0D5A 4E3D    NM52:   LHLI    FLG6
2864 0D5C 69              RMB     1        ;SFLG OFF
2865 0D5D 2E00            GJMP    DRCTY
2866                 ;WRN WRN WRN WRN WRN WRN WRN WRN WRN
2867 0D5F 4E3B    SSK2:   LHLI    FLG4
2868 0D61 61              SKMBF   1        ;MFLG CHK
2869 0D62 A5              GJMP    PC1      ;MFLG = 1
2870 0D63 2E00            GJMP    DRCTY    ;MFLG = 0
2871 0D65 4EAE    PC1:    LHLI    IND1     ;
2872 0D67 11              LAI     1        ;
2873 0D68 3FB6            ORL              ;SS IND ON
2874 0D6A 57              ST
2875 0D6B 17              LAI     7
2876 0D6C F2              CALT    SB10
2877 0D6D D4              CALT    SBT4
2878 0D6E 2DED            GJMP    CHC2     ;COMMON ROUTINE
2379                     ;
2880 0D70 4EAF    ASK2:   LHLI    IND2     ; HL<--IND2
2881 0D72 6E              SMB     2H       ; SET AS
2882 0D73 16              LAI     6H       ; A<--6H
2883 0D74 D1              CALT    CHNV     ; NVEC<--6H
2884 0D75 D4              CALT    SBT4
2885 0D76 2DED            GJMP    CHC2
2886 0D78 10      INTK2:  LAI     0
2887 0D79 4E99            LHLI    DMF      ;CLR DRECTION MEMORY
2888 0D7B 57              ST
2889 0D7C D7              CALT    WFLGX
2890 0D7D D1              CALT    CHNV     ;RETURN TO NRN
2891 0D7E 4EAE            LHLI    IND1
2892 0D80 6D              SMB     1        ;INT ON
2893 0D81 DF              CALT    CFLG6
2894 0D82 6E              SMB     2        ;INTFLG ON
2895 0D83 2DC6            GJMP    PCHC1
2896                 ;ARN ARN ARN ARN ARN ARN ARN ARN ARN
2397 0D85 16      CONTK3: LAI     6
2898 0D86 D1              CALT    CHNV     ;NODE VECTOR = 6
2899 0D87 2AA9            JMP     ADS      ;SCAN ADVANCE
2900                     ;
2901 0D89 4EAF    PK3:    LHLI    IND2     ; HL<--IND2
2902 0D8B 6A              RMB     2H       ; RESET AS
2903 0D8C 2DC6            GJMP    PCHC1
2904 0D8E D2      ASK3:   CALT    BUZZR
2905 0D8F 4EAF            LHLI    IND2     ; HL<--IND2
2906 0D91 6A              RMB     2H       ; RESET AS
2907 0D92 2DF2            GJMP    CHRC2
2908                 ;SRN SRN SRN SRN SRN SRN SRN SRN SRN
2909 0D94 D2      SSK4:   CALT    BUZZR
2910 0D95 4EAE            LHLI    IND1     ; HL<--IND1
2911 0D97 63              RMB     0H       ; RESET SS
2912 0D98 2DF2            GJMP    CHRC2
2913 0D9A 17      CONTK4: LAI     7
2914 0D9B D1              CALT    CHNV     ;NODE VECTOR = 7
2915 0D9C 2AAD            GJMP    ADS2     ;SCAN ADVANCE
2916                     ;
2917 0D9E 4EAE    PK4:    LHLI    IND1     ; HL<--IND1
2918 0DA0 63              RMB     0H       ; RESET SS
2919 0DA1 2DC6            GJMP    PCHC1
2920                 ;PRN PRN PRN PRN PRN PRN PRN PRN PRN
2921 0DA3 4EAE    MONK5:  LHLI    IND1     ; HL<--IND1
2922 0DA5 6B              RMB     3H       ; RESET MON
```

```
2923 0DA6 10              LAI     0H        ; A<--0H
2924 0DA7 D1              CALT    CHNV      ; NVEC<--0H
2925 0DA8 D4              CALT    SBT4
2926 0DA9 3732            CALL    OUT2
2927 0DAB 2E00            GJMP    DRCTY
2928                  ;
2929                  ;DWN DWN DWN DWN DWN DWN DWN DWN DWN
2930                  ;ASN ASN ASN ASN ASN ASN ASN ASN
2931 0DAD 4EAF    PK7:    LHLI    IND2      ; HL<--IND2
2932 0DAF 6A              RMB     2H        ; RESET AS
2933 0DB0 2DC6            GJMP    PCHC1
2934 0DB2 4EAF    ASK7:   LHLI    IND2      ; HL<--IND2
2935 0DB4 6A              RMB     2H        ; RESET AS
2936 0DB5 2DF1            GJMP    CHRC
2937                  ;SSN SSN SSN SSN SSN SSN SSN SSN
2938 0DB7 4EAE    SSK8:   LHLI    IND1
2939 0DB9 68              RMB     0H        ; RESET SS
2940 0DBA 2DF1            GJMP    CHRC
2941 0DBC 4EAE    PK8:    LHLI    IND1
2942 0DBE 68              RMB     0H        ; RESET SS
2943 0DBF 86              GJMP    PCHC1
2944                  ;-----------------------
2945                  ;     BRANCH HANDLER COMMON ROUTINE
2946                  ;-----------------------
2947 0DC0 D5      PCHC2:  CALT    SBT6
W 2948 0DC1 2DD4          JMP     LA26
2949 0DC3 D5      CHC1:   CALT    SBT6
W 2950 0DC4 2DE6          JMP     LA27
2951 0DC6 1F      PCHC1:  LAI     0FH       ; A<--0FH
2952 0DC7 4E24            LHLI    CHN1L     ; HL<--CHN1L
2953 0DC9 57              ST                ; CHN1L<--0FH
2954 0DCA 4E34            LHLI    CHN2L     ; HL<--CHN2L
2955 0DCC 57              ST                ; CHN2L<--0FH
2956 0DCD 10              LAI     0H        ; A<--0H
2957 0DCE 4E25            LHLI    CHN1H     ; HL<--CHN1H
2958 0DD0 57              ST                ; CHN1H<--0H
2959 0DD1 4E35            LHLI    CHN2H     ; HL<--CHN2H
2960 0DD3 57              ST                ; CHN2H<--0H
2961 0DD4 1F      LA26:   LAI     0FH       ; A<--0FH
2962 0DD5 4E32            LHLI    DTNUM1    ; HL<--DTNUM1
2963 0DD7 57              ST                ; DTNUM1<--0FH
2964 0DD8 10              LAI     0H        ; A<--0H
2965 0DD9 4E33            LHLI    DTNUM2    ; HL<--DTNUM2
2966 0DDB 57              ST                ; DTNUM2<--0H
2967 0DDC 4EAE            LHLI    IND1
2968 0DDE 68              RMB     0         ;SS OFF
2969 0DDF 6B              RMB     3         ;MON OFF
2970 0DE0 4EAF            LHLI    IND2
2971 0DE2 6A              RMB     2         ;AS OFF
2972 0DE3 4EAF            LHLI    IND2
2973 0DE5 6F              SMB     3         ;SET    PFLG
2974 0DE6 3733    LA27:   CALL    OUT3
2975 0DE8 10              LAI     0H        ; A<--0H
2976 0DE9 D1              CALT    CHNV      ; NVEC<--0H
2977 0DEA D2              CALT    BUZZR
2978 0DEB 2E00            JMP     DRCTY
2979 0DED D5      CHC2:   CALT    SBT6
2980 0DEE D2              CALT    BUZZR
2981 0DEF 2E00            JMP     DRCTY
2982 0DF1 D4      CHRC:   CALT    SBT4
2983 0DF2 D8      CHRC2:  CALT    SB04
2984 0DF3 3734            CALL    OUT4
2985 0DF5 3833            LADR    DTNUM2    ;CHK WEATHER?
2986 0DF7 3F6C            SKAEI   0CH
2987 0DF9 BC              GJMP    MX11      ;NOT WEATHER
2988 0DFA 11              LAI     1H        ;WEATHER
2989 0DFB BD              GJMP    MX12
2990 0DFC 10      MX11:   LAI     0H        ; A<--0H
2991 0DFD D1      MX12:   CALT    CHNV      ; NVEC<--0H
2992 0DFE D2              CALT    BUZZR
2993 0DFF 80              GJMP    DRCTY
```

```
2994                    ;----------------------------------------
2995                    ;        DIRECTORY ROUTINE
2996                    ;----------------------------------------
2997  0E00  3F90   DRCTY:   EI      0
2998  0E02  DF              CALT    CFLG6
2999  0E03  60              SKMBF   0              ;CHK EFLG
3000  0E04  2F5B            GJMP    SN4            ;EFLG ON
3001  0E06  3398            CALL    BR0            ;BRANCH ADDR SETTING
3002  0E08  3F19            JAM     BASE1          ;THEN BRANCH!
3003                    ;----------------------------------------
3004                    ;        NODE KEEP ROUTINES
3005                    ;----------------------------------------
3006  0E0A  F0     NRN:     CALT    DPSIO
3007  0E0B  3F90            EI      0
3008  0E0D  3838            LADR    FLG1
3009  0E0F  74              SKABT   0              ;CHK KEY ENTRY
3010  0E10  96              GJMP    R1             ;NO ENTRY
3011  0E11  DA              CALT    KFLGX          ;ENTRY
3012  0E12  339D            CALL    BR1            ;BRANCH ADDR SETTING
3013  0E14  3F19            JAM     BASE1          ;THEN BRANCH!
3014  0E16  8A     R1:      GJMP    NRN
3015                    ;WX-CH RECEIVE NODE
3016  0E17  F0     WRN:     CALT    DPSIO
3017  0E18  3F90            EI      0
3018  0E1A  3838            LADR    FLG1
3019  0E1C  74              SKABT   0
3020  0E1D  A3              GJMP    R2
3021  0E1E  DA              CALT    KFLGX
3022  0E1F  33A7            CALL    BR2
3023  0E21  3F19            JAM     BASE1
3024  0E23  97     R2:      GJMP    WRN
3025                    ;AS CH RECEIVE NODE
3026  0E24  F0     ARN:     CALT    DPSIO
3027  0E25  3F90            EI      0
3028  0E27  3838            LADR    FLG1
3029  0E29  74              SKABT   0
3030  0E2A  B4              GJMP    R3
3031  0E2B  DA              CALT    KFLGX
3032  0E2C  DF              CALT    CFLG6
3033  0E2D  60              SKMBF   0              ;CHK EFLG
3034  0E2E  2F5B            GJMP    SN4            ;EFLG IS ON
3035  0E30  33B1            CALL    BR3
3036  0E32  3F19            JAM     BASE1
3037  0E34  3838   R3:      LADR    FLG1
3038  0E36  75              SKABT   1              ;CHK SQUELTIFLG
3039  0E37  B9              GJMP    R31            ;SQUELTI OFF
3040  0E38  A4              GJMP    ARN            ;SQUELTI ON
3041  0E39  16     R31:     LAI     6
3042  0E3A  F2              CALT    SB10
3043  0E3B  E4              CALT    ADSUB
3044  0E3C  2F16            GJMP    PT3
3045                    ;SELECTED CH RECEIVE NODE
3046  0E3E  3F90   SRN:     EI      0
3047  0E40  F4              CALT    TIM6S          ;5SEC TIMER STARTS
3048  0E41  F0     R42:     CALT    DPSIO
3049  0E42  3F90            EI      0
3050  0E44  3838            LADR    FLG1
3051  0E46  74              SKABT   0
3052  0E47  91              GJMP    R4
3053  0E48  DA              CALT    KFLGX
3054  0E49  DF              CALT    CFLG6
3055  0E4A  60              SKMBF   0              ;CHK EFLG
3056  0E4B  2F5B            GJMP    SN4            ;EFLG IS ON
3057  0E4D  33BC            CALL    BR4
3058  0E4F  3F19            JAM     BASE1
3059  0E51  4E38   R4:      LHLI    FLG1
3060  0E53  65              SKMBT   1
3061  0E54  97              GJMP    R41            ;SQUELTI OFF
3062  0E55  2E3E            GJMP    SRN            ;SQUELTI ON
3063  0E57  4E3A   R41:     LHLI    FLG3
3064  0E59  65              SKMBT   1              ;CHK TIM6 T/O
```

```
3065 0E5A 81                    GJMP    R42
3066 0E5B E4                    CALT    ADSUB
3067 0E5C 17                    LAI     7
3068 0E5D F2                    CALT    SB10
3069 0E5E 2F39                  GJMP    PF4
3070              ;16-CH RECEIVE NODE FROM DUAL WATCH NODE
3071 0E60 F4      PRN:  CALT    TIM6S
3072 0E61 E6            CALT    CHDISP
3073 0E62 F0      R51:  CALT    DPSIO
3074 0E63 3F90          EI      0
3075 0E65 4E38          LHLI    FLG1
3076 0E67 65            SKMBT   1
3077 0E68 AB            GJMP    R56
3078 0E69 F4            CALT    TIM6S
3079 0E6A B0            GJMP    R52
3080 0E6B 4E3A    R56:  LHLI    FLG3
3081 0E6D 61            SKMBF   1
3082 0E6E 2E86          GJMP    R57
3083 0E70 3838    R52:  LADR    FLG1
3084 0E72 74            SKABT   0
3085 0E73 BD            GJMP    R5
3086 0E74 DA            CALT    KFLGX
3087 0E75 DF            CALT    CFLG6
3088 0E76 60            SKMBF   0         ;CHK EFLG
3089 0E77 2F5B          GJMP    SN4       ;EFLG IS ON
3090 0E79 33C6          CALL    BR5
3091 0E7B 3F19          JAM     BASE1
3092 0E7D A2      R5:   GJMP    R51
3093 0E7E 15      R55:  LAI     5
3094 0E7F F2            CALT    SB10
3095 0E80 D4            CALT    SBT4
3096 0E81 E5            CALT    CHDAT
3097 0E82 E6            CALT    CHDISP
3098 0E83 F0            CALT    DPSIO
3099 0E84 2E00          GJMP    DRCTY
3100 0E86 30A0    R57:  CALL    INITAD
3101 0E88 2E7E          GJMP    R55
3102              ;DUAL WATCHING NODE
3103 0E8A 3F90    DWN:  EI      0
3104 0E8C D5            CALT    SBT6
3105 0E8D 10            LAI     0
3106 0E8E 4E33          LHLI    DTNUM2
3107 0E90 57            ST
3108 0E91 1F            LAI     0FH
3109 0E92 4E32          LHLI    DTNUM1
3110 0E94 57            ST                ;DTNUM1/2 <-- 16CH
3111 0E95 352A          CALL    PLTST2
3112 0E97 3F90    PE2:  EI      0
3113 0E99 3838          LADR    FLG1      ;KEY CHK
3114 0E9B 74            SKABT   0
3115 0E9C A4            GJMP    PE3       ;NO ENTRY
3116 0E9D DA            CALT    KFLGX
3117 0E9E 35D6          CALL    BPS1      ;CHK IVEC
3118 0EA0 5A            SKC
3119 0EA1 A4            GJMP    PE3       ;NOT EFFECTIVE KEY
3120 0EA2 2F09          GJMP    PE9       ;ENTRY
3121 0EA4 3839    PE3:  LADR    FLG2      ;T1 CHK
3122 0EA6 74            SKABT   0
3123 0EA7 97            GJMP    PE2       ;YET
3124 0EA8 3F90    PE4:  EI      0
3125 0EAA 3838          LADR    FLG1      ;KEY CHK
3126 0EAC 74            SKABT   0
3127 0EAD B5            GJMP    PE5       ;NO ENTRY
3128 0EAE DA            CALT    KFLGX
3129 0EAF 35D6          CALL    BPS1      ;CHK IVEC
3130 0EB1 5A            SKC
3131 0EB2 B5            GJMP    PE5       ;
3132 0EB3 2F09          GJMP    PE9       ;ENTRY
3133 0EB5 3838    PE5:  LADR    FLG1      ;SQUELCH CHK
3134 0EB7 75            SKABT   1
3135 0EB8 BD            GJMP    PE6       ;Q1FLG OFF
```

```
3136  0EB9  14              LAI     4
3137  0EBA  F2              CALT    SB10
3138  0EBB  2E00             GJMP    DRCTY     ;EXIT ON 16CH SQUELCH
3139  0EBD  3839     PE6:    LADR    FLG2      ;T2 CHK
3140  0EBF  75              SKABT   1
3141  0EC0  2EA8            GJMP    PE4       ;YET
3142                ;
3143  0EC2  D4       R6:     CALT    SBT4      ;RECALL LAST CH DATA
3144  0EC3  352A            CALL    PLTST2    ;PLL TEST SIGNAL OUT
3145  0EC5  3F90     PE7:    EI      0
3146  0EC7  3838            LADR    FLG1      ;KEY CHK
3147  0EC9  74              SKABT   0
3148  0ECA  91              GJMP    PE8       ;NO ENTRY
3149  0ECB  35D6            CALL    BPS1      ;CHK IVEC
3150  0ECD  5A              SKC
3151  0ECE  91              GJMP    PE8       ;
3152  0ECF  2F09            GJMP    PE9       ;ENTRY
3153  0ED1  3839     PE8:    LADR    FLG2      ;T1 CHK
3154  0ED3  74              SKABT   0
3155  0ED4  85              GJMP    PE7       ;YET
3156  0ED5  3F90     PE11:   EI      0
3157  0ED7  3838            LADR    FLG1      ;KEY CHK
3158  0ED9  74              SKABT   0
3159  0EDA  A1              GJMP    PE12      ;NO ENTRY
3160  0EDB  35D6            CALL    BPS1      ;CHK IVEC
3161  0EDD  5A              SKC
3162  0EDE  A1              GJMP    PE12      ;
3163  0EDF  2F09            GJMP    PE9
3164  0EE1  3838     PE12:   LADR    FLG1      ;O1 FLG CHK
3165  0EE3  75              SKABT   1
3166  0EE4  A6              GJMP    PE13      ;O1 FLG OFF
3167  0EE5  AC              GJMP    PE14      ;O1 FLG ON
3168  0EE6  3839     PE13:   LADR    FLG2      ;T2 CHK
3169  0EE8  75              SKABT   1
3170  0EE9  95              GJMP    PE11      ;YET
3171  0EEA  2E8A            GJMP    DWN       ;RETRY TESTS
3172  0EEC  F4       PE14:   CALT    TIM6S     ;5SEC TIMER STARTS
3173  0EED  F0       PE15:   CALT    DPSIO
3174  0EEE  3F90            EI      0
3175  0EF0  D9              CALT    CFLG1
3176  0EF1  65              SKMBT   1         ;CHK QFLG
3177  0EF2  2F06            GJMP    PE18
3178  0EF4  3838            LADR    FLG1      ;KEY CHK
3179  0EF6  74              SKABT   0
3180  0EF7  2F01            GJMP    PE16      ;NO ENTRY
3181  0EF9  35D6            CALL    BPS1      ;CHK IVEC
3182  0EFB  5A              SKC
3183  0EFC  2F00            GJMP    PE17      ;
3184  0EFE  2F09            GJMP    PE9       ;ENTRY
3185  0F00  DA       PE17:   CALT    KFLGX
3186  0F01  383A     PE16:   LADR    FLG3      ;T6 CHK
3187  0F03  75              SKABT   1
3188  0F04  2EED            GJMP    PE15      ;YET
3189  0F06  DA       PE18:   CALT    KFLGX
3190  0F07  2E8A            GJMP    DWN       ;EXPIRED
3191  0F09  D4       PE9:    CALT    SBT4
3192  0F0A  DA              CALT    KFLGX
3193  0F0B  33D0            CALL    BR6
3194  0F0D  3F19            JAM     BASE1     ;BRANCH
3195                ;ALL-CH SCAN NODE
3196  0F0F  10       ASN:    LAI     0
3197  0F10  4E32            LHLI    DTNUM1
3198  0F12  57              ST
3199  0F13  4E33            LHLI    DTNUM2
3200  0F15  57              ST
3201  0F16  351D     PT3:    CALL    PLLTST    ;SEND TEST DATA OF PLL
3202  0F18  F0              CALT    DPSIO
3203  0F19  3F90     PT1:    EI      0
3204  0F1B  3838            LADR    FLG1
3205  0F1D  74              SKABT   0
3206  0F1E  A4              GJMP    PT2
```

```
3207 0F1F DA              CALT    KFLGX
3208 0F20 33DA             CALL    BR7
3209 0F22 3F19             JAM     BASE1
3210 0F24 4E39    PT2:     LHLI    FLG2
3211 0F26 65              SKMBT    1              ;CHK TIM2FLG  (150MS)
3212 0F27 AA              GJMP     R7             ;YET
3213 0F28 E4     PT11:    CALT    ADSUB           ;SCAN CH ADVANCE
3214 0F29 96              GJMP     PT3
3215 0F2A 4E38   R7:      LHLI    FLG1
3216 0F2C 65             SKMBT    1               ;CHK SQUELCH FLG
3217 0F2D 99             GJMP     PT1             ;SQ1 OFF
3218 0F2E 12             LAI      2               ;SQ1 ON
3219 0F2F F2             CALT    SB10
3220 0F30 2E00           GJMP     DRCTY
3221                    ;SELECTED CH SCAN NODE
3222 0F32 10     SSN:     LAI     0
3223 0F33 4E32           LHLI     DTNUM1
3224 0F35 57             ST
3225 0F36 4E33           LHLI     DTNUM2
3226 0F38 57             ST
3227 0F39 3459   PF4:     CALL    CCHK
3228 0F3B 5A             SKC
3229 0F3C 2F50           GJMP     PF1             ;CH NOT SELECTED
3230 0F3E 351D           CALL    PLLTST           ;CH SELECTED
3231 0F40 F0             CALT    DPSIO
3232 0F41 3F90   PF3:    EI       0
3233 0F43 3838           LADR     FLG1
3234 0F45 74            SKABT     0
3235 0F46 8C            GJMP      PF2
3236 0F47 DA            CALT     KFLGX
3237 0F48 33E3           CALL    BR8
3238 0F4A 3F19           JAM     BASE1
3239 0F4C 4E39   PF2:    LHLI    FLG2
3240 0F4E 65            SKMBT     1              ;CHK TIM2 FLG
3241 0F4F 93            GJMP     R8              ;YET
3242 0F50 E4    PF1:     CALT    ADSUB
3243 0F51 2F39           GJMP    PF4
3244 0F53 4E38  R8:      LHLI    FLG1            ;
3245 0F55 65            SKMBT    1               ;CHK SQ FLG
3246 0F56 81            GJMP    PF3              ;SQFLG OFF
3247 0F57 13            LAI     3
3248 0F58 F2            CALT    SB10
3249 0F59 2E00          GJMP    DRCTY
3250                    ;-----------------------------------
3251                    ;     EPIRB TRAP (SUB NODE)
3252                    ;-----------------------------------
3253 0F5B 10   SN4:     LAI      0              ;NRN VECTOR SET
3254 0F5C D1           CALT     CHNV
3255 0F5D 4EAE         LHLI     IND1
3256 0F5F 6B           RMB      3
3257 0F60 68           RMB      0
3258 0F61 4EAF         LHLI     IND2
3259 0F63 6A           RMB      2
3260 0F64 6B           RMB      3
3261 0F65 F0  SN4X:    CALT     DPSIO
3262 0F66 3F90         EI       0
3263 0F68 DD           CALT     CFLG3
3264 0F69 64          SKMBT     0
3265 0F6A B5          GJMP      NU2             ;YET
3266 0F6B DE          CALT      CFLG4
3267 0F6C 62          SKMBF     2
3268 0F6D B2          GJMP      NU1             ;EWFLG ON
3269 0F6E 6E          SMB       2               ;EWFLG OFF >>SET
3270 0F6F 37D1        CALL      BUZZR2          ;BUZZAR ON
3271 0F71 B5          GJMP      NU2
3272 0F72 6A  NU1:    RMB       2               ;RESET EWFLG
3273 0F73 37D5        CALL      BUZZR3          ;BUZZAR OFF
3274 0F75 3F90 NU2:   EI        0
3275 0F77 DF          CALT      CFLG6
3276 0F78 64          SKMBT     0               ;CHK EFLG
3277 0F79 2F87        GJMP      NT1             ;EFLG IS OFF
```

```
3278 0F7B D9              CALT    CFLG1
3279 0F7C 64              SKMBT   0           ;CHK KFLG
3280 0F7D A5              GJMP    SN4X        ;KFLG IS OFF
3281 0F7E DA              CALT    KFLGX
3282 0F7F 383E            LADR    IVEC
3283 0F81 3F61            SKAEI   1           ;CHK <CAN> ENTRY
3284 0F83 2F65            GJMP    SN4X        ;NO
3285 0F85 D2              CALT    BUZZR
3286 0F86 8B              GJMP    NT2         ;ADF SYSTEM INITIALIZE
3287 0F87 4CB2    NT1:    ANP     2,08H       ;BUZZR OFF
3288 0F89 2E00            GJMP    DRCTY
3289 0F8B 2A81    NT2:    GJMP    INIT3       ;ADF SYSTEM INITIALIZE
3290                      ;------------------------------------
3291                      ;       INT1 HANDLER ( CHANNEL SELECT )
3292                      ;------------------------------------
3293 0F8D 3F80    SELECT: DI      0
3294 0F8F 3E9E            PSHHL
3295 0F91 3E8E            PSHDE
3296 0F93 4E5C            LHLI    ACCY
3297 0F95 57              ST
3298 0F96 D9              CALT    CFLG1
3299 0F97 62              SKMBF   2           ;CHK WFLG
3300 0F98 2FD3            GJMP    ND6         ;DR MEM KEY WAS IN
3301 0F9A DE              CALT    CFLG4
3302 0F9B 63              SKMBF   3           ;CHK CANFLG
3303 0F9C 2FD3            GJMP    ND6         ;UNDER CANCELING
3304 0F9E 4E3D            LHLI    FLG6
3305 0FA0 60              SKMBF   0
3306 0FA1 2FD3            GJMP    ND6
3307 0FA3 DF              CALT    CFLG6
3308 0FA4 61              SKMBF   1           ;CHK SFLG
3309 0FA5 2FD3            GJMP    ND6
3310                      ;
3311                      ;ACCEPTION CHECK
3312 0FA7 4E3F            LHLI    NVEC
3313 0FA9 61              SKMBF   1
3314 0FAA 2FD3            GJMP    ND6
3315 0FAC 62              SKMBF   2
3316 0FAD 2FD3            GJMP    ND6
3317 0FAF 63              SKMBF   3
3318 0FB0 2FD3            GJMP    ND6
3319                      ;       RECEIVED
3320 0FB2 D6              CALT    PFLGX
3321 0FB3 4E3D            LHLI    FLG6        ;NFLG ON
3322 0FB5 6F              SMB     3
3323 0FB6 DB              CALT    KFLG0       ;KEY FLAG ON
3324 0FB7 4E3E            LHLI    IVEC
3325 0FB9 10              LAI     0
3326 0FBA 57              ST                  ;TREAT AS NUMK ENTRY
3327 0FBB 3FC1            IP      PORT1
3328 0FBD 74              SKABT   0           ;CHECK UP/DW SHIFT
3329 0FBE 2FC3            GJMP    ND1         ;UP SHIFT
3330 0FC0 34E2            CALL    DNSFT
3331 0FC2 85              GJMP    ND2
3332 0FC3 34B7    ND1:    CALL    UPSFT
3333 0FC5 3833    ND2:    LADR    DTNUM2      ;CHECK NRN/WX
3334 0FC7 77              SKABT   3
3335 0FC8 8E              GJMP    ND3         ;NRN
3336 0FC9 11              LAI     1           ;WRN
3337 0FCA 4E3F            LHLI    NVEC
3338 0FCC 57              ST
3339 0FCD 92              GJMP    ND4
3340 0FCE 10      ND3:    LAI     0
3341 0FCF 4E3F            LHLI    NVEC
3342 0FD1 57              ST
3343 0FD2 00      ND4:    NOP
3344                      ;------------------------------------
3345                      ;       RETURN FROM INTERRUPT
3346                      ;------------------------------------
3347 0FD3 4E5C    ND6:    LHLI    ACCY
3348 0FD5 52              LAM     HL
```

```
3349 0FD6 3E8F          POPDE
3350 0FD8 3E9F          POPHL
3351 0FDA 3F90          EI       0
3352 0FDC 43            RTPSW
3353                ;----------------------------
3354                ;     CH DATA SET ROUTINE
3355                ;----------------------------
3356 0FDD 35CA    CHDSPE: CALL   DOTCON
3357 0FDF 3820          LADR     CHN1
3358 0FE1 4E51          LHLI     WORK2
3359 0FE3 57            ST                      ;
3360 0FE4 10            LAI      0H
3361 0FE5 37B3          CALL     LA55           ;FETCH TABLE DATA
3362 0FE7 39AB          XADR     0ABH           ;1(GFCE)
3363 0FE9 52            LAM      HL
3364 0FEA 39AA          XADR     0AAH           ;1(?DBA)
3365 0FEC 3821          LADR     CHN2
3366 0FEE 57            ST                      ;WORK2<--(CHN2)
3367 0FEF 10            LAI      0H
3368 0FF0 37B3          CALL     LA55           ;FETCH TABLE DATA
3369 0FF2 39AD          XADR     0ADH           ;10(GFCE)
3370 0FF4 52            LAM      HL
3371 0FF5 39AC          XADR     0ACH           ;10(?DBA)
3372 0FF7 53            RT
3373                    END
```

ERROR = 0
OPTIMIZATION COMPLETED, TIMES = 9

| SYMBOL | ADRS | SYMBOL | ADRS | SYMBOL | ADRS | SYMBOL | ADRS | SYMBOL | ADRS |
|---|---|---|---|---|---|---|---|---|---|
| ACCY | 005C | ACCZ | 005D | ADF | 06A0 | ADISP | 00EA | ADISPE | 029D |
| ADS | 0AA9 | ADS2 | 0AAD | ADSET | 0722 | ADSUB | 00E4 | ADSUBE | 048B |
| ARN | 0E24 | ASK1 | 0C5B | ASK2 | 0D70 | ASK3 | 0D8E | ASK7 | 0DB2 |
| ASN | 0F0F | BASE1 | 0009 | BASE2 | 0000 | BPS1 | 05D6 | BR0 | 0398 |
| BR1 | 039D | BR2 | 03A7 | BR3 | 03B1 | BR4 | 03BC | BR5 | 03C6 |
| BR6 | 03D0 | BR7 | 03DA | BR8 | 03E3 | BROFST | 005F | BRSUB | 00D0 |
| BS1 | 00E0 | BS2 | 00E1 | BS3 | 00E2 | BS4 | 00E3 | BTST1 | 06FD |
| BTST2 | 070C | BTST3 | 06FC | BUZSTP | 07D9 | BUZZR | 00D2 | BUZZR2 | 07D1 |
| BUZZR3 | 07D5 | C | 009C | CANK1 | 0C41 | CCHK | 0459 | CDEL | 0443 |
| CFLG1 | 00D9 | CFLG2 | 00DC | CFLG3 | 00DD | CFLG4 | 00DE | CFLG6 | 00DF |
| CHC1 | 0DC3 | CHC2 | 0DED | CHDAT | 00E5 | CHDATE | 01AC | CHDISP | 00E6 |
| CHDSPE | 0FDD | CHDT1 | 0044 | CHDT2 | 0045 | CHDT3 | 0046 | CHFLG | 004E |
| CHN1 | 0020 | CHN1H | 0025 | CHN1L | 0024 | CHN2 | 0021 | CHN2H | 0035 |
| CHN2L | 0034 | CHNV | 00D1 | CHRC | 0DF1 | CHRC2 | 0DF2 | CLT0 | 011F |
| CLT10 | 0186 | CLT103 | 018C | CLT11 | 0189 | CLT20 | 0199 | CLT201 | 0193 |
| CLT202 | 0192 | CLT203 | 0191 | CLT204 | 0190 | CLT25 | 010D | CLT3 | 0100 |
| CLT30 | 0110 | CLT301 | 0200 | CLT302 | 0202 | CLT303 | 0204 | CLT306 | 0206 |
| CLT307 | 0208 | CLT31 | 0117 | CLT4 | 0104 | CLT401 | 020A | CLT402 | 020B |
| CLT501 | 0082 | CLT502 | 0087 | CLT503 | 0088 | CLT504 | 008E | CLT505 | 0096 |
| CLT506 | 0098 | CLT507 | 009A | CLT508 | 009C | CLT509 | 009E | CLT510 | 0113 |
| CLT511 | 0115 | CLT6 | 019F | CLT601 | 019C | CLT71 | 020D | CLT72 | 021A |
| CLT73 | 0196 | CLT8 | 0180 | CLT9 | 0183 | CMEM | 042A | CMPDAT | 0334 |
| CMPLMT | 071B | CONTK3 | 0D85 | CONTK4 | 0D9A | CPYRGT | 0378 | DADR | 06C9 |
| DCDDZ | 02FD | DCH11 | 0080 | DCH12 | 0081 | DCH21 | 0082 | DCH22 | 0083 |
| DCH31 | 0084 | DCH32 | 0085 | DCLR | 00F6 | DCLRE | 02AA | DCSSB | 00EE |
| DD1 | 008D | DD2 | 008E | DD3 | 008F | DDFIX | 0326 | DDISP | 00E9 |
| DDISPE | 0227 | DDM11 | 0090 | DDM12 | 0091 | DDM13 | 0092 | DDM21 | 0093 |
| DDM22 | 0094 | DDM23 | 0095 | DDM31 | 0096 | DDM32 | 0097 | DDM33 | 0098 |
| DDR2 | 0088 | DDR3 | 0089 | DDSET | 00EB | DDZ1 | 008A | DDZ2 | 008B |
| DDZ3 | 008C | DELAY | 0727 | DMF | 0099 | DMFRST | 07C0 | DMFS | 009D |
| DNSFT | 04E2 | DOTCON | 05CA | DPSID | 00F0 | DPSIDE | 0766 | DRCOMP | 02B8 |
| DRCTY | 0E00 | DRMEM | 0606 | DRMK1 | 0C9E | DROUND | 0342 | DSET | 02AC |
| DTNUM1 | 0032 | DTNUM2 | 0033 | DWN | 0E8A | EFLGC | 05E4 | FLASH | 07B6 |
| FLG1 | 0038 | FLG2 | 0039 | FLG3 | 003A | FLG4 | 003B | FLG5 | 003C |
| FLG6 | 003D | HOLD | 0B00 | IFLG0 | 0603 | INCLE | 00EC | INCLEA | 00ED |
| IND1 | 00AE | IND2 | 00AF | INDDZ | 02D2 | INIT1 | 0000 | INIT2 | 0A24 |
| INIT3 | 0A81 | INITAD | 00A0 | INTK1 | 0C63 | INTK2 | 0D78 | INTSCN | 00EF |
| IVEC | 003E | JT0 | 0900 | JT1 | 0910 | JT1X | 0920 | JT2 | 0930 |
| JT2X | 0940 | JT3 | 0950 | JT3X | 0960 | JT4 | 0970 | JT4X | 0980 |
| JT5 | 0990 | JT5X | 09A0 | JT6 | 09B0 | JT6X | 09C0 | JT7 | 09D0 |
| JT8 | 09E0 | KBD | 0BC1 | KCALR1 | 03EC | KCAM | 000C | KFLG0 | 00DB |

| SYMBOL | ADRS | SYMBOL | ADRS | SYMBOL | ADRS | SYMBOL | ADRS | SYMBOL | ADRS |
|---|---|---|---|---|---|---|---|---|---|
| KFLGX | 00DA | KOP | 0004 | KSPB | 0003 | KSS | 004D | KZ | 004F |
| KZR | 03F3 | LA10 | 01D0 | LA11 | 01E1 | LA2 | 059F | LA26 | 0DD4 |
| LA27 | 0DE6 | LA28 | 0C78 | LA29 | 0C80 | LA3 | 05B9 | LA301 | 0318 |
| LA32 | 08F0 | LA34 | 001F | LA37 | 0570 | LA38 | 0576 | LA39 | 057A |
| LA4 | 05C0 | LA40 | 057D | LA5 | 05C3 | LA50 | 079E | LA51 | 079F |
| LA52 | 07A1 | LA53 | 07A4 | LA54 | 07AC | LA55 | 07B3 | LA56 | 0A0A |
| LA57 | 07B5 | LA58 | 0264 | LA59 | 026E | LA6 | 0032 | LA60 | 0A20 |
| LA61 | 0270 | LA62 | 0271 | LA63 | 00F1 | LA63E | 0297 | LA64 | 0243 |
| LA65 | 0251 | LA66 | 0257 | LA67 | 0789 | LA7 | 0071 | LA8 | 002D |
| LA9 | 01DF | LAX1 | 0242 | LAX2 | 024B | LAX3 | 0263 | M1K1 | 0CDE |
| M2K1 | 0CE0 | M3K1 | 0CE2 | MCHK | 0565 | MD1 | 0004 | MDK1 | 0C93 |
| ME1 | 0A43 | ME11 | 0A50 | ME2 | 0A66 | ME4 | 0AA7 | ME5 | 00A3 |
| ME6 | 0731 | ME7 | 072B | ME8 | 0A90 | ME9 | 0A97 | ME90 | 0A9D |
| MEMFLS | 07C8 | MF1 | 07D0 | MFACC | 03F9 | MONK1 | 0C88 | MONK5 | 0DA3 |
| MS1 | 0C12 | MS2 | 0C24 | MS3 | 0C26 | MS4 | 0C2B | MS5 | 0C29 |
| MT1 | 03F5 | MX11 | 0DFC | MX12 | 0DFD | NA10 | 0BE3 | NA12 | 0BF5 |
| NA13 | 0BF8 | NA14 | 0C00 | NA19 | 0C09 | NA20 | 0BCC | NA21 | 0BD3 |
| NA22 | 0BD8 | NA23 | 0BE0 | NA24 | 0BE2 | NA25 | 0BC7 | NA41 | 0BFE |
| NA42 | 0C07 | NA50 | 0BD0 | NA6 | 05E2 | NA61 | 05DC | NA64 | 05E0 |
| NA65 | 05E3 | NB0 | 0B62 | NB0A | 0B60 | NB1 | 0B6C | NB1A | 0B63 |
| NB2 | 0B76 | NB3 | 0B85 | NB4 | 0B91 | NB4A | 0B86 | NB5 | 0BA1 |
| NB6 | 0BB7 | NC11 | 03A4 | NC12 | 03A6 | NC21 | 03AE | NC22 | 03B0 |
| NC31 | 03B8 | NC32 | 03BB | NC41 | 03C3 | NC42 | 03C5 | NC51 | 03CD |
| NC52 | 03CF | NC61 | 03D7 | NC62 | 03D9 | NC71 | 03E0 | NC81 | 03E9 |
| NCOMP | 00E7 | NCOMPE | 0580 | ND1 | 0FC3 | ND2 | 0FC5 | ND3 | 0FCE |
| ND4 | 0FD2 | ND6 | 0FD3 | NE1 | 04CF | NE2 | 04D1 | NE3 | 04D0 |
| NF1 | 04F3 | NF2 | 04F5 | NF3 | 050F | NF4 | 04F2 | NF5 | 04F1 |
| NF6 | 04FD | NH1 | 0C9A | NH2 | 0C9C | NL1 | 05D2 | NL2 | 05D5 |
| NM11 | 05F8 | NM12 | 05F7 | NM31 | 061E | NM32 | 0618 | NM33 | 0612 |
| NM34 | 061F | NM40 | 064A | NM41 | 0662 | NM42 | 065C | NM43 | 0656 |
| NM44 | 0663 | NM45 | 069A | NM50 | 0CFC | NM51 | 0CE4 | NM52 | 0D5A |
| NM53 | 0D19 | NM54 | 0D2A | NM55 | 0D22 | NM56 | 0D25 | NM57 | 0D40 |
| NM58 | 0D4A | NM59 | 0D47 | NM60 | 0CA2 | NM61 | 0CAD | NM62 | 0CD1 |
| NM63 | 0CB4 | NM64 | 0CC0 | NM65 | 0CCD | NM66 | 0CC8 | NM67 | 0CB5 |
| NM68 | 0CD8 | NM71 | 06C8 | NM72 | 06AA | NM73 | 06C7 | NM80 | 0D34 |
| NM81 | 0D39 | NOUT | 00E8 | NOUTE | 0012 | NP11 | 02C9 | NP12 | 02BF |
| NP13 | 02D1 | NP14 | 02CD | NP21 | 033D | NP31 | 02FC | NP32 | 02EA |
| NP41 | 0325 | NP51 | 0354 | NP52 | 0353 | NP53 | 035A | NP54 | 036D |
| NQ11 | 06DD | NQ12 | 06DA | NQ14 | 06F2 | NQ16 | 06F9 | NQ23 | 06D7 |
| NQ31 | 06ED | NRN | 0E0A | NS11 | 02AD | NS12 | 02B1 | NS21 | 0707 |
| NS22 | 070B | NS31 | 0716 | NS32 | 071A | NT1 | 0F87 | NT2 | 0F8B |
| NU1 | 0F72 | NU2 | 0F75 | NUMK1 | 0C3A | NVEC | 003F | NX1 | 0C30 |
| NX2 | 0B4D | OPRSGN | 00B2 | OUT2 | 0732 | OUT3 | 0733 | OUT4 | 0734 |
| OUT5 | 0738 | OUT6 | 0739 | PB1 | 0498 | PB2 | 04AB | PB3 | 04A9 |
| PB4 | 04AA | PB5 | 049F | PC1 | 0D65 | PCHC1 | 0DC6 | PCHC2 | 0DC0 |
| PE11 | 0ED5 | PE12 | 0EE1 | PE13 | 0EE6 | PE14 | 0EEC | PE15 | 0EED |
| PE16 | 0F01 | PE17 | 0F00 | PE18 | 0F06 | PE2 | 0E97 | PE3 | 0EA4 |
| PE4 | 0EA8 | PE5 | 0EB5 | PE6 | 0EBD | PE7 | 0EC5 | PE8 | 0ED1 |
| PE9 | 0F09 | PF1 | 0F50 | PF2 | 0F4C | PF3 | 0F41 | PF4 | 0F39 |
| PFLGX | 00D6 | PK1 | 0C51 | PK1A | 0C59 | PK3 | 0D89 | PK4 | 0D9E |
| PK7 | 0DAD | PK8 | 0DBC | PLL1 | 0048 | PLL2 | 0049 | PLL3 | 004A |
| PLL4 | 004B | PLLTST | 051D | PLTST2 | 052A | PORT0 | 0000 | PORT1 | 0001 |
| PRN | 0E60 | PS1 | 0523 | PS2 | 051F | PT1 | 0F19 | PT11 | 0F28 |
| PT2 | 0F24 | PT3 | 0F16 | R1 | 0E16 | R2 | 0E23 | R3 | 0E34 |
| R31 | 0E39 | R4 | 0E51 | R41 | 0E57 | R42 | 0E41 | R5 | 0E7D |
| R51 | 0E62 | R52 | 0E70 | R55 | 0E7E | R56 | 0E6B | R57 | 0E86 |
| R6 | 0EC2 | R7 | 0F2A | R8 | 0F53 | RKL | 0AF0 | SB10 | 00F2 |
| SB10E | 0760 | SB11 | 0762 | SB3 | 073C | SB4 | 0742 | SB5 | 074A |
| SB6 | 0750 | SB7 | 0755 | SB9 | 00F3 | SB9E | 075B | SB04 | 00D3 |
| SBT0 | 038C | SBT1 | 00D3 | SBT4 | 00D4 | SBT6 | 00D5 | SEG2C | 0009 |
| SEG2F | 000C | SELECT | 0F8D | SHFLG | 004C | SL1 | 0401 | SL2 | 0403 |
| SL3 | 0411 | SL4 | 0413 | SL5 | 0418 | SL6 | 041A | SN4 | 0F5B |
| SN4X | 0F65 | SP1 | 043A | SP2 | 0437 | SP3 | 0442 | SP4 | 0440 |
| SPC | 009B | SQ1 | 0451 | SQ2 | 044F | SQ3 | 0458 | SQ4 | 0456 |
| SQC | 0C10 | SQTIM | 00F0 | SR1 | 0479 | SR10 | 0483 | SR11 | 0488 |
| SR12 | 0489 | SR2 | 0472 | SR21 | 0461 | SR3 | 048A | SR4 | 0484 |
| SR5 | 046F | SR6 | 0470 | SR7 | 0476 | SR8 | 0477 | SR9 | 0482 |
| SRN | 0E3E | SSK1 | 0C44 | SSK2 | 0D5F | SSK4 | 0D94 | SSK8 | 0DB7 |
| SSN | 0F32 | SUBSEL | 00BE | SWAP | 063D | SWF | 009A | TEMPO | 005E |
| TIM0 | 0026 | TIM0S | 052F | TIM1 | 0027 | TIM1S | 0536 | TIM2 | 0028 |
| TIM2S | 053D | TIM3 | 0029 | TIM4 | 002A | TIM4S | 0544 | TIM5 | 002B |

| SYMBOL | ADRS | SYMBOL | ADRS | SYMBOL | ADRS | SYMBOL | ADRS | SYMBOL | ADRS |
|---|---|---|---|---|---|---|---|---|---|
| TIM5A | 002C | TIM5S | 00F5 | TIM5SE | 0546 | TIM6 | 002D | TIM6A | 002E |
| TIM6B | 002F | TIM6S | 00F4 | TIM6SE | 0556 | TIMLOC | 0026 | TZ | 005S |
| UPSFT | 04B7 | WATCH | 0B39 | WFLGX | 00D7 | WORK1 | 0050 | WORK11 | 0055 |
| WORK2 | 0051 | WORK3 | 0052 | WORK4 | 0053 | WORK5 | 0054 | WORK6 | 0056 |
| WRN | 0E17 | | | | | | | | |

The invention is claimed as follows:

1. A radio direction finding system for receiving radio signals and for determining the direction of the source of received radio signals at the time of transmission thereof by determining the direction of arrival of said radio signals at the location of said system, comprising: means for receiving a radio signal; direction determining means coupled to said receiving means for developing a direction signal corresponding to the direction of arrival of a radio signal received by said receiving means relative to a predetermined reference direction and to the location of said receiving means; memory means having a capacity for storing direction data corresponding to the directions of arrival of a plurality of received radio signals; said memory means being responsive to predetermined control signals for storing direction data corresponding to each of a plurality of directions of arrival of received radio signals for later display and for selecting and producing for display previously stored data corresponding to any one of said directions of arrival of a received radio signal; and control circuit means coupled intermediate said direction determining means and said memory means for producing both said control signals and said direction data corresponding to each said direction signal for storage by said memory means.

2. The system according to claim 1 and further including indicator means selectively energizable for producing an observable direction corresponding to the direction of arrival of said received radio signal; said control circuit means being coupled with said indicator means and further responsive to said direction signal for energizing said indicator means to produce a corresponding direction indication.

3. The system according to claim 1 wherein said control circuit means further includes selectively actuatable write control means for causing said memory means to store said direction data.

4. The combination according to claim 2 wherein said control circuit means further includes selectively actuatable read control means for reading out stored direction data from said memory means, and for causing said indicator means to produce a direction indication corresponding to the direction data which is read out.

5. The system according to claim 4 wherein said control circuit means comprises microcomputer means.

6. The system according to claim 5 wherein said microcomputer means includes said memory means.

7. The system according to claim 2 and further including EPIRB detection means for developing an EPIRB reception signal in response to the reception of an EPIRB signal; and wherein said control means is responsive to said EPIRB reception signal for energizing said indicator means to produce an indication of the direction of arrival of said EPIRB signal, in place of any other direction indication.

8. The system according to claim 7 and further including EPIRB indicator means selectively energizable for producing an observable EPIRB indication corresponding to the reception of an EPIRB signal; said control circuit means being further responsive to reception of an EPIRB signal for energizing said indicator means for producing said EPIRB indication.

9. The system according to claim 8 and further including operator control means for selectively disabling response of said control circuit means to said received EPIRB signal.

10. A system according to claim 1 wherein said indicator means comprises both analog display means and digital display means for simultaneously displaying both analog and digital observable direction indications corresponding to the direction of arrival of the received radio signal.

11. A system according to claim 10 wherein said analog display means comprises a plurality of selectively energizable display elements arranged in a circular array to indicate compass directions, and a plurality of indicia about said circular array for indicating compass headings.

12. A system according to claim 10 wherein said digital display means comprises a plurality of alphanumeric display characters for displaying compass headings of from 0 degrees to 359 degrees.

13. A system according to claim 1 wherein said receiving means comprises Adcock antenna means.

14. A system according to claim 13 wherein said Adcock antenna means comprises four substantially vertically oriented antenna elements arranged in orthogonally disposed Adcock pairs.

15. A radio direction finding system for receiving radio signal and for determining the direction of the source of received radio signals at the time of transmission thereof by determinng the direction of arrival of said radio signal at the location of said system, comprising: means for receiving a radio signal; direction determining means coupled to said receiving means for developing a direction signal corresponding to the direction of arrival of a radio signal received by said receiving means relative to a predetermined reference direction and to the location of said receiving means; memory means having a capacity for storing direction data corresponding to the directions of arrival of a plurality of received radio signals; said memory means being responsive to predetermined control signals for storing direction data corresponding to each of a plurality of directions of arrival of received radio signals for later display and for selecting and producing for display previously stored data corresponding to any one of said directions of arrival of a received radio signal; indicator means selectively energizable for producing an observable direction indication corresponding to the direction of arrival of said received radio signal; and control circuit means coupled with said direction determining means, with said indicator means and with said memory means, and responsive to said direction signal for producing both said control signals and said direction data corresponding to each said direction signal for storage by said memory means and for simultaneously energizing said indicator means to produce a corresponding direction indication.

* * * * *